(12) United States Patent
Nakamura et al.

(10) Patent No.: US 12,041,350 B2
(45) Date of Patent: Jul. 16, 2024

(54) IMAGING APPARATUS AND CONTROL METHOD THEREOF

(71) Applicant: CANON KABUSHIKI KAISHA, Tokyo (JP)

(72) Inventors: Shun Nakamura, Kanagawa (JP); Minoru Hirose, Kanagawa (JP); Miyako Shibutani, Tokyo (JP); Satoshi Yamada, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 18/063,183

(22) Filed: Dec. 8, 2022

(65) Prior Publication Data

US 2023/0188846 A1 Jun. 15, 2023

(30) Foreign Application Priority Data

Dec. 14, 2021 (JP) ................. 2021-202941

(51) Int. Cl.
| | |
|---|---|
| *H04N 23/67* | (2023.01) |
| *H04N 23/56* | (2023.01) |
| *H04N 23/61* | (2023.01) |
| *H04N 23/74* | (2023.01) |
| *H04N 23/84* | (2023.01) |

(52) U.S. Cl.
CPC ........... *H04N 23/672* (2023.01); *H04N 23/56* (2023.01); *H04N 23/61* (2023.01); *H04N 23/74* (2023.01); *H04N 23/84* (2023.01)

(58) Field of Classification Search
CPC ...... H04N 23/672; H04N 23/56; H04N 23/61; H04N 23/74; H04N 23/84; H04N 23/663; H04N 23/675; H04N 25/704
See application file for complete search history.

(56) References Cited

U.S. PATENT DOCUMENTS

| 4,410,804 A | 10/1983 | Stauffer | |
|---|---|---|---|
| 8,754,976 B2* | 6/2014 | Oikawa | ................ H04N 23/672 348/294 |

FOREIGN PATENT DOCUMENTS

| JP | 2006-145632 A | 6/2006 |
|---|---|---|
| JP | 2020-141122 A | 9/2020 |

* cited by examiner

*Primary Examiner* — Twyler L Haskins
*Assistant Examiner* — Angel L Garces-Rivera
(74) *Attorney, Agent, or Firm* — Cowan, Liebowitz & Latman, P.C.

(57) ABSTRACT

An imaging apparatus includes an image sensor, an acquiring unit, and at least one processor. The image sensor is capable of acquiring, from an imaging surface that captures an object image formed by an optical system, first and second paired signals which are respectively acquired by pupil division in first and second directions different from each other. The acquiring unit acquires first and second defocus amounts from phase differences between the first paired signals and between the second paired signals, respectively. The at least one processor functions as a detecting unit and a deciding unit. The detecting unit detects an imaging object in an imaging frame. The deciding unit decides, based on the detected imaging object, at least one defocus amount to be used in focus control for the optical system from the first and second defocus amounts.

17 Claims, 38 Drawing Sheets

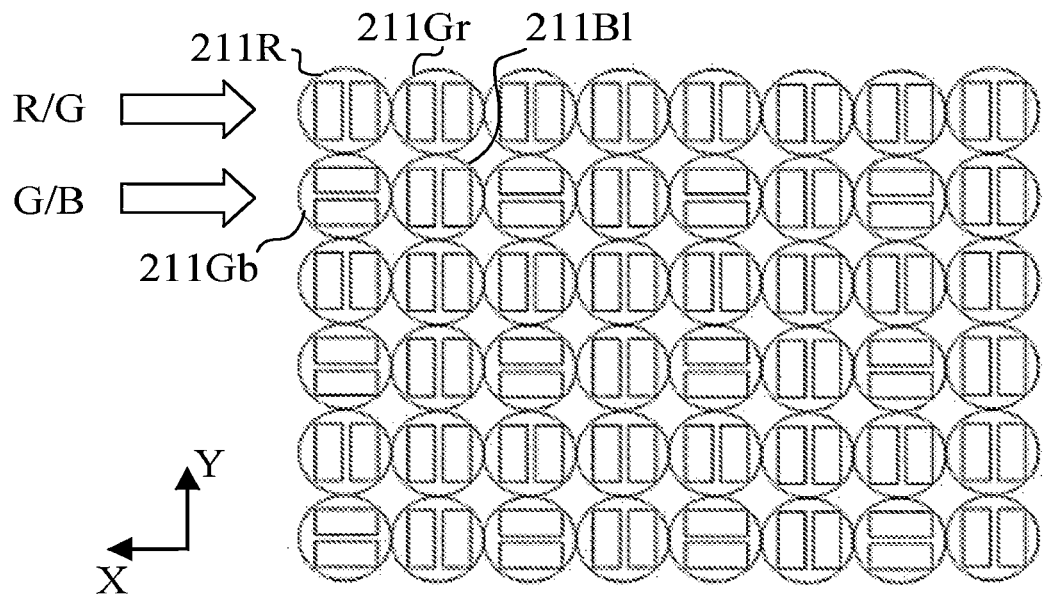
FIG. 2A
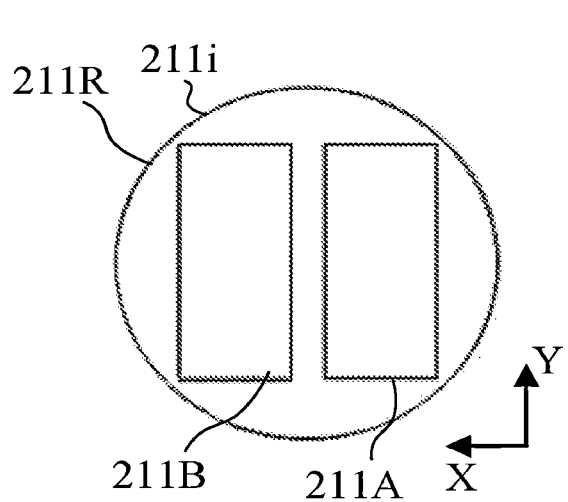 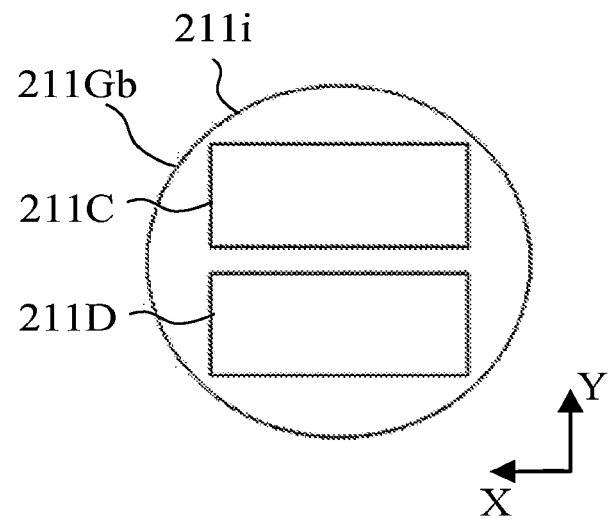
FIG. 2B     FIG. 2C

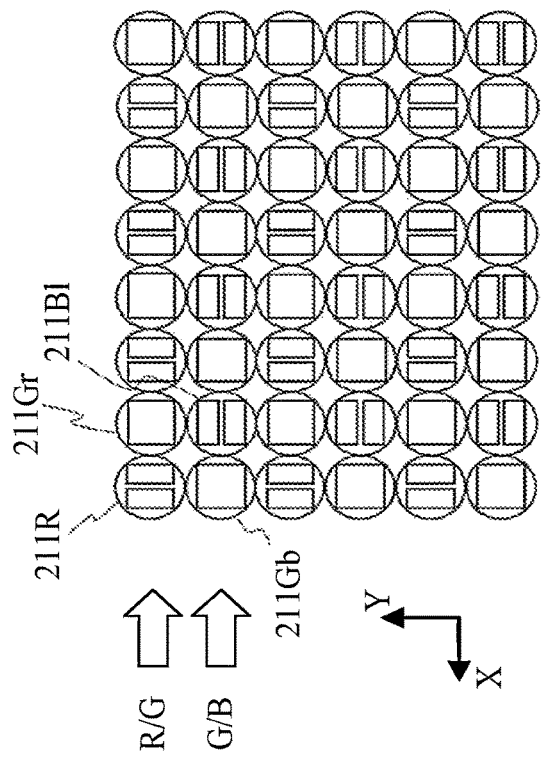
FIG. 22A
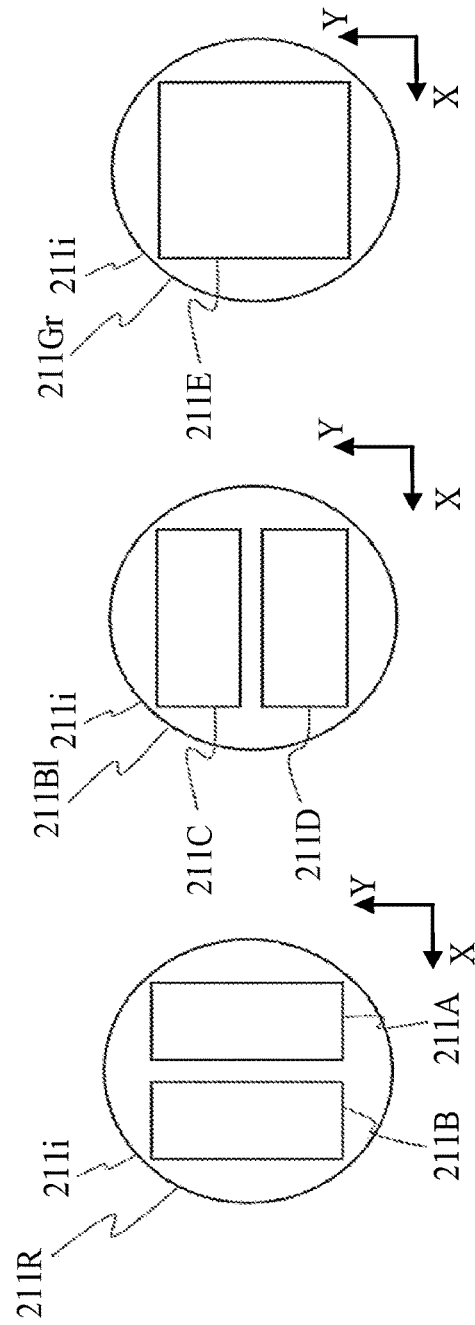
FIG. 22B
FIG. 22C
FIG. 22D

IMAGING APPARATUS AND CONTROL METHOD THEREOF

BACKGROUND OF THE INVENTION

Field of the Invention

The aspect of the embodiments of the present disclosure relates to focus control in an imaging apparatus such as a digital camera.

Description of the Related Art

As a focus detection method, as disclosed in U.S. Pat. No. 4,410,804, there is an imaging surface phase difference detection method that performs pupil division by using one microlens and a pair of photoelectric converters which are provided for each pixel of an image sensor, and acquires a focus state (defocus amount) from a phase difference between paired image signals acquired from the pair of photoelectric converters.

Japanese Patent Laid-Open No. ("JP") 2020-141122 discloses an imaging apparatus that acquires defocus amounts in a horizontal direction and a vertical direction by performing pupil division in a horizontal direction in pixels in each of which paired photoelectric converters are arranged in the horizontal direction, and performing pupil division in the vertical direction is performed in pixels in each of which paired photoelectric converters are arranged in the vertical direction. JP 2006-145632 discloses an imaging apparatus that includes a focus detection area in a horizontal direction and a focus detection area in a vertical direction that intersect with each other, and performs focus control by selecting a defocus amount with a smaller absolute value from defocus amounts respectively detected in the focus detection areas.

However, in the imaging apparatus disclosed in JP 2006-145632, in a case where the defocus amount with the smaller absolute value is a result of erroneous phase difference detection, a delay in focus control may occur, and a blurred state may be determined as an in-focus state. Further, information used in selecting the defocus amount is limited to the defocus amount itself and reliability of a signal relating to phase difference detection, and it is not possible to perform with higher accuracy defocus amount selection using information other than those.

SUMMARY OF THE INVENTION

The present disclosure provides an imaging apparatus that can stably perform highly accurate focus control using an image sensor.

An imaging apparatus according to one aspect of embodiments of the present disclosure includes an image sensor, an acquiring unit, and at least one processor. The image sensor is configured to be capable of acquiring, from an imaging surface that captures an object image formed by an optical system, first paired signals acquired by pupil division in a first direction and second paired signals acquired by pupil division in a second direction different from the first direction. The acquiring unit is configured to acquire a first defocus amount from a phase difference between the first paired signals and to acquire a second defocus amount from a phase difference between the second paired signals. The at least one processor is configured to function as a detecting unit and a deciding unit. The detecting unit is configured to detect an imaging object in an imaging frame. The deciding unit is configured to decide, based on the detected imaging object, at least one defocus amount to be used in focus control for the optical system from the first and second defocus amounts.

An imaging apparatus according to one aspect of embodiments of the present disclosure includes an image sensor, an acquiring unit, and at least one processor. The image sensor is configured to be capable of acquiring first paired signals acquired by pupil division in a first direction from a pixel of a first color and second paired signals acquired by pupil division in a second direction from a pixel of a second color different from the first color. The second direction is different from the first direction. The pixel of the first color and the pixel of the second color are included in an imaging surface that captures an imaging object image formed by an optical system. The acquiring unit is configured to acquire a first defocus amount from a phase difference between the first paired signals and to acquire a second defocus amount from a phase difference between the second paired signals. The at least one processor is configured to function as a selecting unit and a deciding unit. The selecting unit is configured to select one color from the first color and the second colors. The deciding unit is configured to decide, based on the selected color, at least one defocus amount to be used in focus control for the optical system from the first and second defocus amounts.

Control methods respectively corresponding to the above imaging apparatuses also constitute the other aspects of the embodiments of the present disclosure.

Further features of the present disclosure will become apparent from the following description of exemplary embodiments with reference to the attached drawings.

BRIEF DESCRIPTION OF THE DRAWINGS

FIGS. 2A to 2C are diagrams illustrating an image sensor according to first to third embodiments and fifth to seventh embodiments.

FIGS. 22A and 22D are diagrams illustrating the light-receiving pixels according to the fourth embodiment.

DESCRIPTION OF THE EMBODIMENTS

Referring now to the accompanying drawings, a description is given of embodiments according to the present disclosure.

First Embodiment

Configuration of Imaging Apparatus

Figure 1:
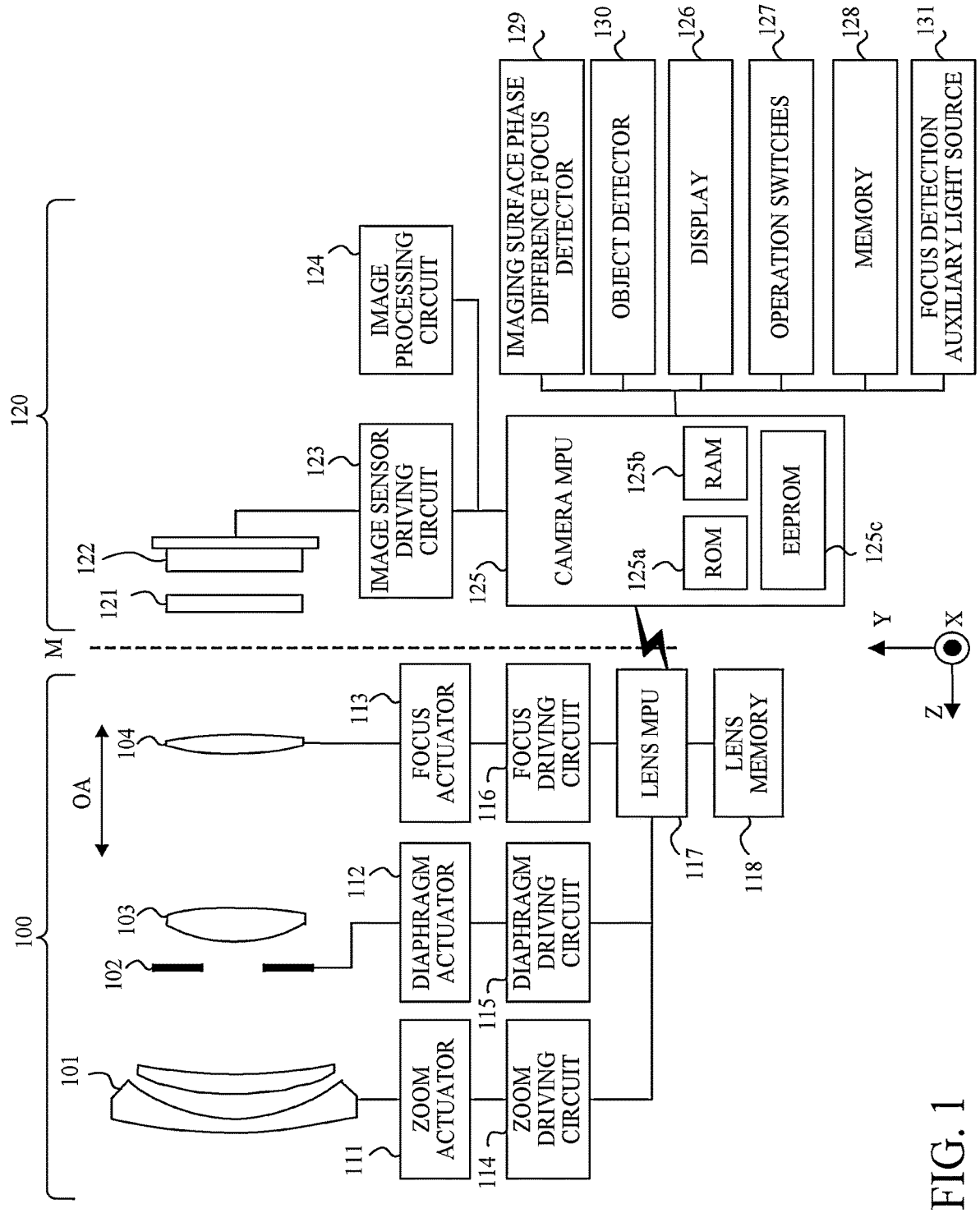
FIG. 1 is a block diagram illustrating a configuration of the imaging apparatus according to a first embodiment.

FIG. 1 illustrates a configuration of a digital camera as an imaging apparatus according to the first embodiment. The digital camera in this embodiment is an interchangeable-lens single-lens reflex camera, and includes a lens unit 100, which is an imaging optical system, and a camera body 120. The lens unit 100 is attached to the camera body 120 via a mount M illustrated as a dotted line in the drawing.

The lens unit 100 includes an optical system (including a first lens unit 101, a diaphragm shutter 102, a second lens unit 103, and a focus lens unit (hereinafter simply referred to as "focus lens") 104) and a driving control system. The optical system forms an optical image of an object (imaging object image).

The first lens unit 101 is disposed at a position closest to an object side in the optical system and held so that the first lens unit 101 is movable in an optical axis direction. The diaphragm shutter 102 has a diaphragm function for adjusting a light amount and a shutter function for controlling an exposure time of an image sensor, which is described below, during still imaging. The diaphragm shutter 102 and the second lens unit 103 are movable as a whole in the optical axis direction, and perform magnification variation (zooming) by moving in cooperation with the first lens unit 101. The focus lens 104 adjusts focus (performs focusing) by moving in the optical axis direction.

The driving control system includes a zoom actuator 111, a diaphragm actuator 112, and a focus actuator 113. The driving control system further includes a zoom driving circuit 114, a diaphragm driving circuit 115, a focus driving circuit 116, a lens MPU 117, and a lens memory 118. The zoom driving circuit 114 performs zooming by driving the zoom actuator 111 to move the first lens unit 101 and the second lens unit 103 in the optical axis direction. The diaphragm driving circuit 115 drives the diaphragm actuator 112 to cause the diaphragm shutter 102 to operate so that the light amount and the exposure time are controlled. The focus driving circuit 116 performs focusing by driving the focus actuator 113 to move the focus lens 104 in the optical axis direction. The focus driving circuit 116 detects a position of the focus lens 104 based on a driving amount of the focus actuator 113.

The lens MPU 117 is a computer that performs calculations and processes in the lens unit 100 and controls the zoom driving circuit 114, the diaphragm driving circuit 115, and the focus driving circuit 116. The lens MPU 117 is electrically connected to a camera MPU 125 via the mount M, and transmits and receives commands and data to and from the camera MPU 125. For example, the lens MPU 117 transmits information on the detected position of the focus lens 104 (focus lens position information) to the camera MPU 125 in response to a request from the camera MPU 125. The focus lens position information includes not only the position of the focus lens 104 in the optical axis direction, but also information such as a position in the optical axis direction and a diameter of an exit pupil in a state where the optical system is not driven, and a position in the optical axis direction and a diameter of a lens frame that limits a light beam of the exit pupil. The lens MPU 117 controls the zoom driving circuit 114, the diaphragm driving circuit 115, and the focus driving circuit 116 in response to requests from the camera MPU 125.

The lens memory 118 stores in advance optical information to be used in detecting a focus state (defocus amount). The camera MPU 125 performs processes and control in the lens unit 100 by executing programs stored in a built-in non-volatile memory and the lens memory 118.

The camera body 120 includes an optical system (including an optical low-pass filter 121 and an image sensor 122) and a driving control system. The optical low-pass filter 121 is disposed at a position immediately in front of the image sensor 122 so that false color and moiré are reduced in a captured image.

The image sensor 122 includes a two-dimensional CMOS area sensor and its peripheral circuits. In an imaging surface of the image sensor (area sensor) 122, a plurality of pixels are arranged in each of lateral and longitudinal directions. The image sensor 122 has a function of performing pupil division in a horizontal direction and a vertical direction, and can perform focus detection by an imaging surface phase difference detection method. A description is given below of a detailed configuration of the image sensor 122.

The driving control system includes an image sensor driving circuit 123, an image processing circuit 124, the camera MPU 125, a display 126, operation switches 127, a memory 128, an imaging surface phase difference focus detector 129, and an object detector 130. The image sensor driving circuit 123 controls driving of the image sensor 122, performs A/D conversion on an analog signal output from the image sensor 122, and transmits a digital signal to the camera MPU 125 and the image processing circuit 124.

The image processing circuit 124 generates a pair of image signals for phase difference detection and various image data from the digital signal received from the image sensor driving circuit 123. The image processing circuit 124 performs image processing such as gamma conversion, white balance adjustment, color interpolation, and compression encoding on image data to be displayed/recorded.

The camera MPU 125 as a computer performs calculations and processing in the camera body 120, and controls the image sensor driving circuit 123, the image processing circuit 124, the display 126, the operation switches 127, the memory 128, the imaging surface phase difference focus detector 129, and the object detector 130. The camera MPU 125 is electrically connected to the lens MPU 117 via the mount M, and transmits and receives commands and data to and from the lens MPU 117. The camera MPU 125 requests the focus lens position information, driving of diaphragm, focus, and zoom, optical information on the lens unit 100, and the like from the lens MPU 117. The camera MPU 125 functions as a controlling unit and a deciding unit.

The camera MPU 125 incorporates a ROM 125a, a RAM 125b, and an EEPROM 125c. The ROM 125a stores programs for controlling operation of the camera body 120. The RAM 125b stores various variables. The EEPROM 125c stores various parameters, various setting information set by a user, and the like.

The display 126 includes an LCD, an organic EL element, or the like, and displays information on an imaging mode, a preview image before imaging, an image for a check after imaging, an in-focus state at a time of focus detection, and the like. The display 126 includes a touch sensor, and the user can input and select settings or the like by touching the display 126.

The operation switches 127 include a power switch, an autofocus (AF) start switch, a release (still imaging trigger) switch, a zoom operation switch, an imaging mode selection switch, a motion imaging switch, and the like. The memory 128 is a flash memory detachably attachable to the camera body 120 and records captured images.

The imaging surface phase difference focus detector (acquiring unit) 129 performs a focus detection process by a phase difference detection method using a pair or a plurality of pairs of image signals (paired image signals) acquired from the image processing circuit 124. Specifically, the image processing circuit 124 generates a pair of image signals from a plurality of pairs of photoelectric conversion signals acquired from a plurality of pixels that perform pupil division in the horizontal (lateral) direction, and generates a pair of image signals from a plurality of pairs of photoelectric conversion signals acquired from a plurality of pixels that perform pupil division in the vertical (longitudinal) direction. The imaging surface phase difference focus detector 129 detects a phase difference (focus shift amount) between paired image signals, which is generated by the image processing circuit 124, for each pair, and calculates (acquires) a defocus amount of the optical system from the phase difference. A detailed description is given below of a process performed by the imaging surface phase difference focus detector 129.

An object detector (detecting unit) 130 detects an object (imaging object) in an imaging frame from the image data to be displayed/recorded acquired from the image processing circuit 124. Specifically, the object detector 130 uses a convolutional neural network (CNN) to perform a process of estimating at which position in the image data the object to be detected exists. Any CNN machine learning method may be used. For example, there is an object detection process that uses a trained learning model, which is an example of a neural network computational model. For example, the object detector 130 reads the image data from the memory 128, inputs it to the trained learning model, and acquires, as an output result of the trained model, an object position such as a contour of the object and an area of the object image. At this time, for example, a method may be used in which a computer such as a server makes the CNN perform machine learning and the camera body 120 acquires the trained CNN from the computer. The computer performs supervised learning using image data for learning as input and an object position, etc. corresponding to the image data for learning as training data, and thereby the CNN of the object detector 130 is trained. The object detection result from the object detector 130 is used in selection of the focus detection result by the imaging surface phase difference focus detector 129, and the result of the selection is used by the camera MPU 125 to drive the focus lens 104 via the lens MPU 117.

A focus detection auxiliary light source 131 irradiates the object with auxiliary light (for example, red light) and increases an amount of light entering the image sensor 122 so that the accuracy of focus detection by the imaging surface phase difference focus detector 129 is improved. The camera MPU 125 causes the focus detection auxiliary light source 131 to emit light in response to an AF start switch in the operation switches 127 or according to a setting stored in the EEPROM 125c.

Operation of Imaging Surface Phase Difference Focus Detector 129

FIG. 2A illustrates a pixel array in a range of lateral (x direction: first direction) 8-pixel rows×longitudinal (y direction: second direction) 6-pixel rows on the imaging surface of the image sensor 122 viewed from the lens unit 100 side. The imaging surface is provided with a Bayer array of color filters, and red (R) and green (G) color filters are alternately arranged from left to right for pixels on odd rows, and green (G) and blue (B) color filters are alternately arranged from left to right for pixels on even rows.

FIG. 2B illustrates a pixel 211R. A reference numeral 211i denotes an on-chip microlens. Inside the on-chip microlens 211i, paired photoelectric converters (first paired photoelectric converters) 211A and 211B divided in the x direction are arranged. A pixel 211Gr and a pixel 211Bl are similarly configured. FIG. 2C illustrates a pixel 211Gb. Inside the on-chip microlens 211i, paired photoelectric converters (second paired photoelectric converters) 211C and 211D divided in the y direction are arranged. In this way, the image sensor 122 in this embodiment includes the pixels 211R, 211Gr, and 211Bl each including the two photoelectric converters divided in the x direction, and the pixels 211Gb each including the two photoelectric converters divided in the y direction. Parallax image data as image data to be displayed/recorded for 3D image observation and a pair of image signals are generated by using photoelectric conversion signals output from each of paired photoelectric converters in each of a plurality of pixels. Further, luminance determination image data and normal image data to be displayed/recorded are generated using an imaging signal output by adding a pair of photoelectric conversion signals from each of a plurality of pixels.

Here, a description is given of the focus detection in the imaging surface phase difference detection method. In the pixel 211R (211Gr or 211Bl) illustrated in FIG. 2B, the microlens 211i performs pupil division in the x direction by forming, on the photoelectric converters 211A and 211B, images of light beams from areas that are different from each other in the x direction and that are included in the exit pupil of the optical system. In the pixel 211Gb illustrated in FIG. 2C, the microlens 211i performs pupil division in the y direction by forming, on the photoelectric converters 211C and 211D, images of light beams from areas that are different from each other in the y direction and that are included in the exit pupil of the optical system.

An A-image signal is generated by combining photoelectric conversion signals each of which is acquired from one of the paired photoelectric converters 211A and 211B in each of the plurality of pixels 211R within a predetermined range included in the same pixel row, and a B-image signal is generated by combining photoelectric conversion signals each of which is acquired from the other. The imaging surface phase difference focus detector 129 calculates a phase difference (image shift amount), which is a relative shift amount between the A-image and B-image signals, which are paired image signals, by using a correlation calculation, and calculates (acquires), from the phase difference, a defocus amount in the x direction (x-direction defocus amount) in the predetermined range.

Similarly, a C-image signal is generated by combining photoelectric conversion signals each of which is acquired from one of the paired photoelectric converters 211C and 211D in each of the plurality of pixels 211Gb within a predetermined range included in the same pixel row, and a D-image signal is generated by combining photoelectric conversion signals each of which is acquired from the other. The imaging surface phase difference focus detector 129 calculates the phase difference between the paired image signals (C-image and D-image signals), and calculates a defocus amount in the y direction (y-direction defocus amount) in a predetermined range from the phase difference. Each of a signal acquired by adding the photoelectric conversion signals from the photoelectric converters 211A and 211B and a signal acquired by adding the photoelectric conversion signals from the photoelectric converters 211C and 211D forms one pixel of image data to be displayed/recorded.

Figure 3A:
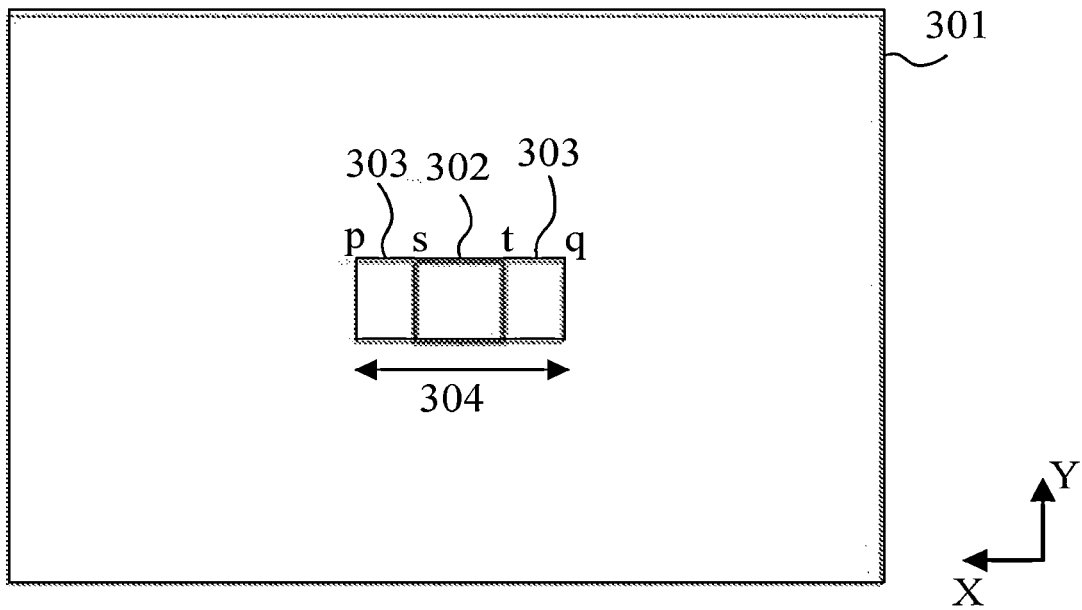
FIGS. 3A and 3B are diagrams illustrating an AF area used in a focus detection process.
Figure 3B:
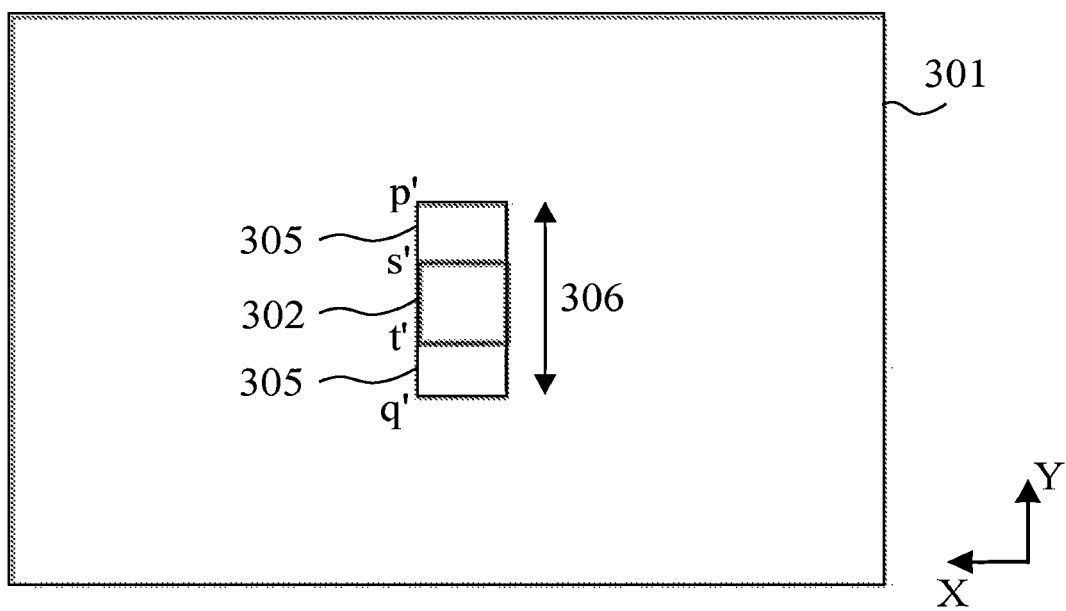

FIGS. 3A and 3B illustrate an example of a focus detection area (hereinafter referred to as "AF area") 302 set on the imaging surface 301 of the image sensor 122. FIG. 3A illustrates an example of correlation calculation in the x direction. On the left and right sides of the AF area 302, shift areas 303 are set to which the paired image signals are shifted during the correlation calculation. Therefore, a pixel area 304 acquired by combining the AF area 302 and the left and right shift areas 303 is a pixel area to be used in the correlation calculation in the x direction. In the drawing, p and q denote x coordinates of start and end points of the pixel area 304, respectively, and s and t denote x coordinates of start and end points of the AF area 302, respectively.

FIG. 3B illustrates an example of correlation calculation in the y direction. Shift areas 305 are set above and below the AF area 302. Therefore, a pixel area 306 acquired by combining the AF area 302 and the upper and lower shift areas 305 is a pixel area to be used in the correlation calculation in the y direction. In the drawing, p' and q' denote y coordinates of start and end points of the pixel area 364, respectively, and s' and t' denote y coordinates of start and end points of the AF area 302, respectively. In the following, a description is given of the correlation calculation in the x direction using the x coordinates p, q, s, and t, but the correlation calculation in the y direction can be performed by replacing the x coordinates with the y coordinates p', q', s', and t' and replacing the A-image and B-image signals with the C-image and D-image signals.

Figure 4A:
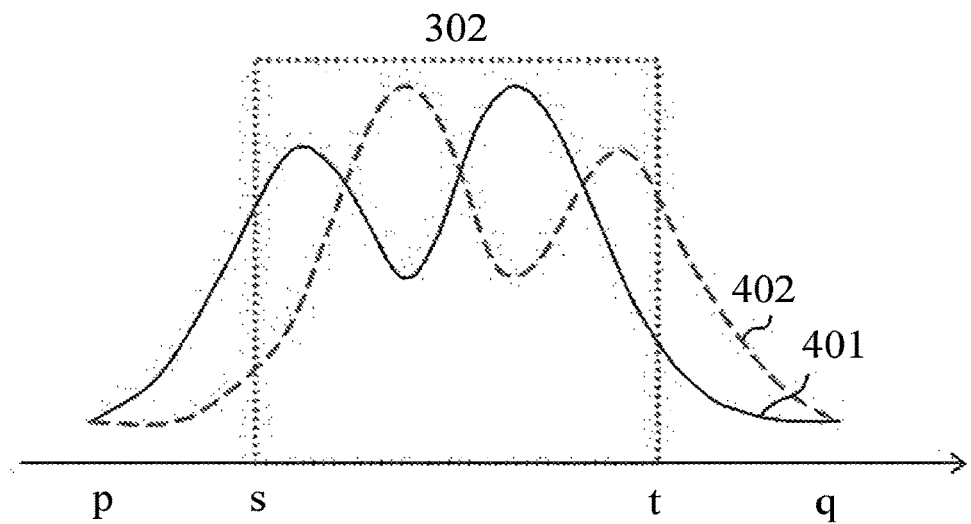
FIGS. 4A to 4C are diagrams illustrating a pair of image signals acquired from an AF area.
Figure 4B:
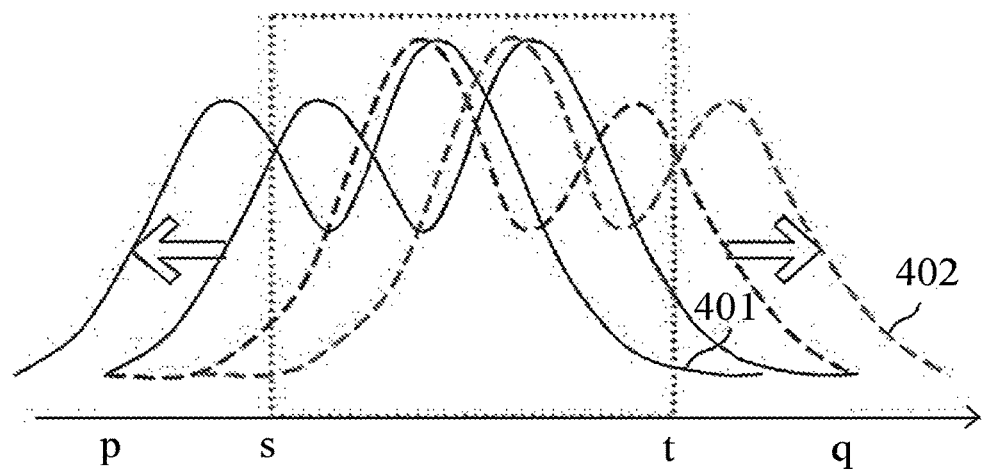
Figure 4C:
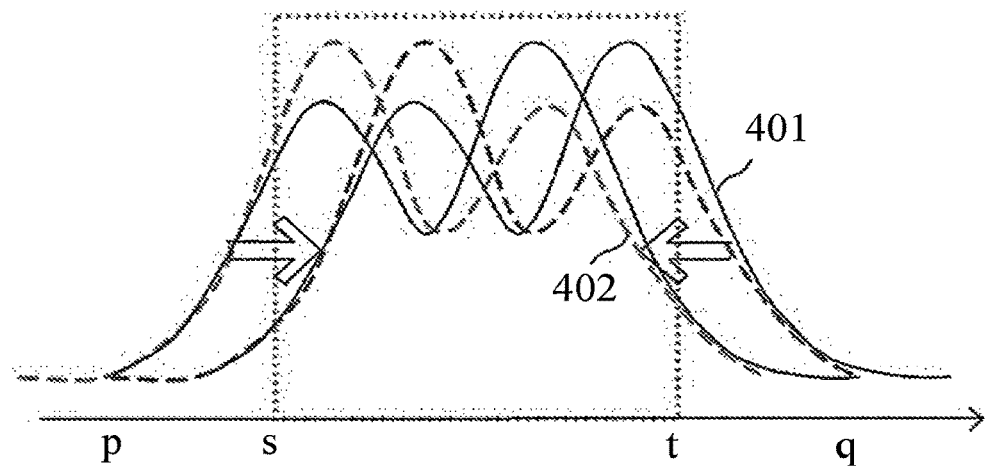

FIG. 4A illustrates an A-image signal 401 and a B-image signal 402 generated by using photoelectric conversion signals acquired from a plurality of pixels (photoelectric converters 211A and 211B) included in the AF area 302 illustrated in FIG. 3A. FIGS. 4B and 4C respectively illustrate states in which the A-image and B-image signals 401 and 402 are shifted in the positive and negative directions from the state in FIG. 4A. When a correlation amount between the A-image and B-image signals 401 and 402 are to be calculated, the A-image and B-image signals 401 and 402 are respectively shifted in directions of arrows bit by bit.

Then, the sum of absolute values of the differences between the A-image and B-image signals 401 and 402 is calculated for each shift. A correlation amount COR can be calculated by the following equation (1) where i represents the shift amount, p-s represents a maximum shift amount in the negative direction, q-t represents a maximum shift amount in the positive direction, x represents the start coordinate of the AF area 302, and y represents the end coordinate of the AF area 302.

$$COR[i] = \sum_{k=x}^{y} |A[k+i] - B[k-i]| \quad (1)$$

$$\{(p-s) < i < (q-t)\}$$

Figure 5A:
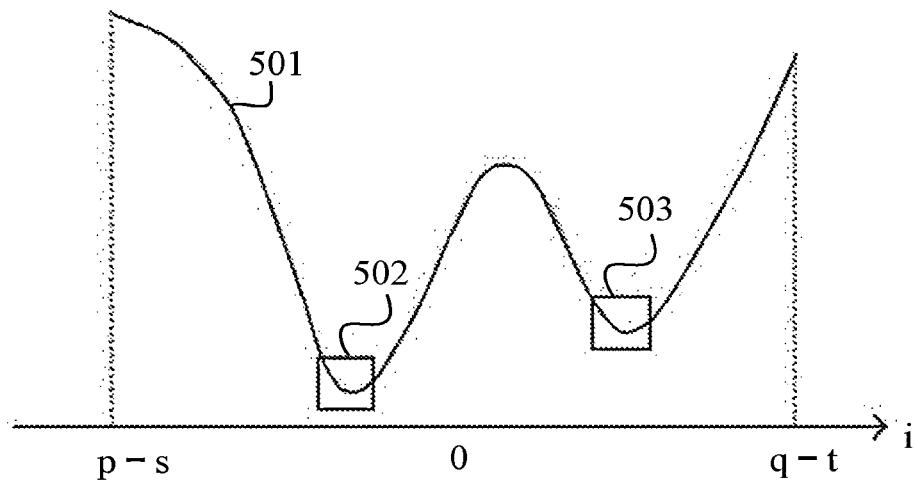
FIGS. 5A and 5B are diagrams illustrating a relation between a shift amount and a correlation amount of the pair of image signals.

FIG. 5A illustrates an example of a relation between the shift amount and the correlation amount COR. A horizontal axis represents the shift amount, and a vertical axis represents the correlation amount COR. A matching level between the A-image and B-image signals becomes highest at a shift amount in an area corresponding to the smaller correlation amount among areas 502 and 503 near extreme values of a correlation amount 501 that changes with the shift amount.

Next, a difference in the correlation amount for every other shift in a waveform of the correlation amount 501 illustrated in FIG. 5A is calculated as a correlation variation amount. A correlation variation amount ΔCOR can be calculated by the following equation (2) where i represents the shift amount, p-s represents the maximum shift amount in the negative direction, and q-t represents the maximum shift amount in the positive direction.

$$\Delta COR[i]=COR[i-1]-COR[i+1]$$

$$\{(p-s+1)\leq i\leq (q-t-1)\} \quad (2)$$

Figure 6A:
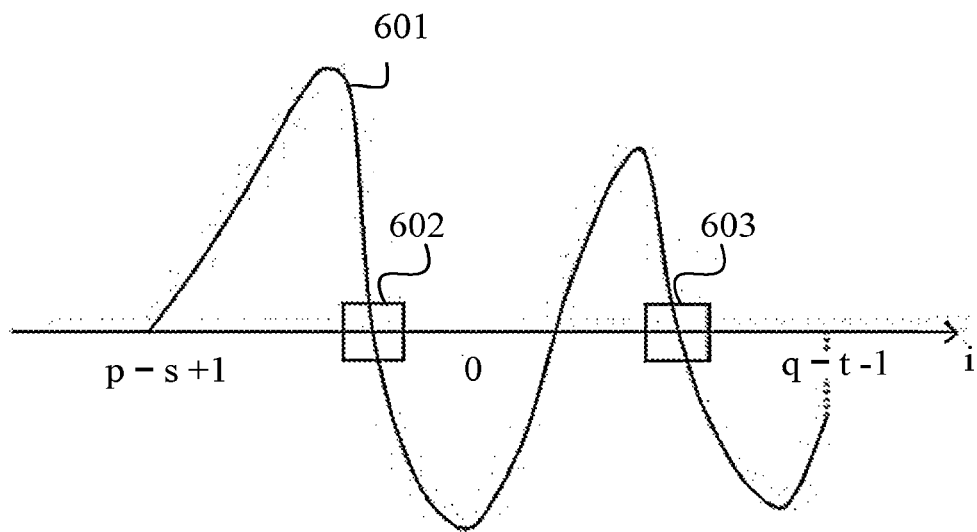
FIGS. 6A and 6B are diagrams illustrating a relation between the shift amount and the correlation variation amount of the pair of image signals.

FIG. 6A illustrates an example of a relation between the shift amount and the correlation variation amount ΔCOR. A horizontal axis represents the shift amount, and a vertical axis represents the correlation variation amount ΔCOR. A correlation variation amount 601 that changes with the shift amount changes from positive to negative in areas 602 and 603. A point where the correlation variation amount takes 0 is referred to as a "zero cross", and the matching level between the A-image and B-image signals is the highest at the zero cross. Therefore, a shift amount that causes a zero cross is an image shift amount.

Figure 6B:
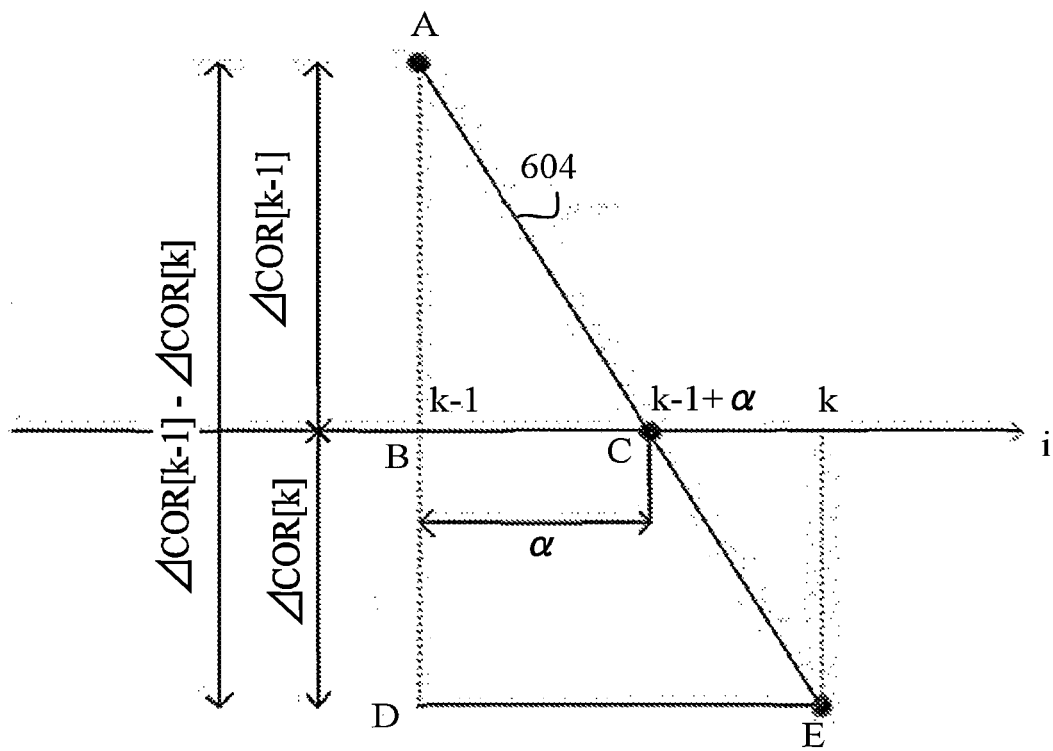

FIG. 6B illustrates an enlarged view of the area 602 illustrated in FIG. 6A. A diagonal line 604 is part of the correlation variation amount 601. A shift amount (k−1+α) that causes a zero cross is divided into an integer part β (=k−1) and a decimal part α. The decimal part α can be calculated by the following equations (3) from a relationship of a similarity between a triangle ABC and a triangle ADE in the drawing.

$$AB:AD = BC:DE \quad (3)$$
$$\Delta COR[k-1]:\Delta COR[k-1]-\Delta COR[k] = \alpha:k-(k-1)$$
$$\alpha = \frac{\Delta COR[k-1]}{\Delta COR[k-1]-\Delta COR[k]}$$

The integer part β can be calculated from FIG. 6B by the following equation (4).

$$\beta=k-1 \quad (4)$$

Then, the image shift amount (prediction) can be acquired from the sum of α and β. When there are a plurality of zero crosses of the correlation variation amount ΔCOR as illustrated in FIG. 6A, one with the greater steepness of the change in the correlation variation amount ΔCOR in the vicinity thereof is referred to as a "first zero cross". The steepness is an index that indicates the ease of performing AF, and the larger the value of the steepness, the easier it is to perform AF with higher accuracy. A steepness maxder can be calculated by the following equation (5).

$$maxder=|\Delta COR[k-1]|+|\Delta COR[k]| \quad (5)$$

Thus, in this embodiment, when there are a plurality of zero crosses of the correlation variation amount, the first zero cross is determined based on the steepness, and the shift amount that causes the first zero cross is set to the image shift amount.

Reliability of the image shift amount (hereinafter also referred to as "reliability") can be defined by the matching level between the A-image signal and the B-image signal (hereinafter referred to as "two-image matching level") fnclvl and the steepness of the correlation variation amount described above. The two-image matching level is an index representing accuracy of the image shift amount, and in the correlation calculation method in this embodiment, the smaller the value of the two-image matching level, the higher the accuracy of the image shift amount.

Figure 5B:
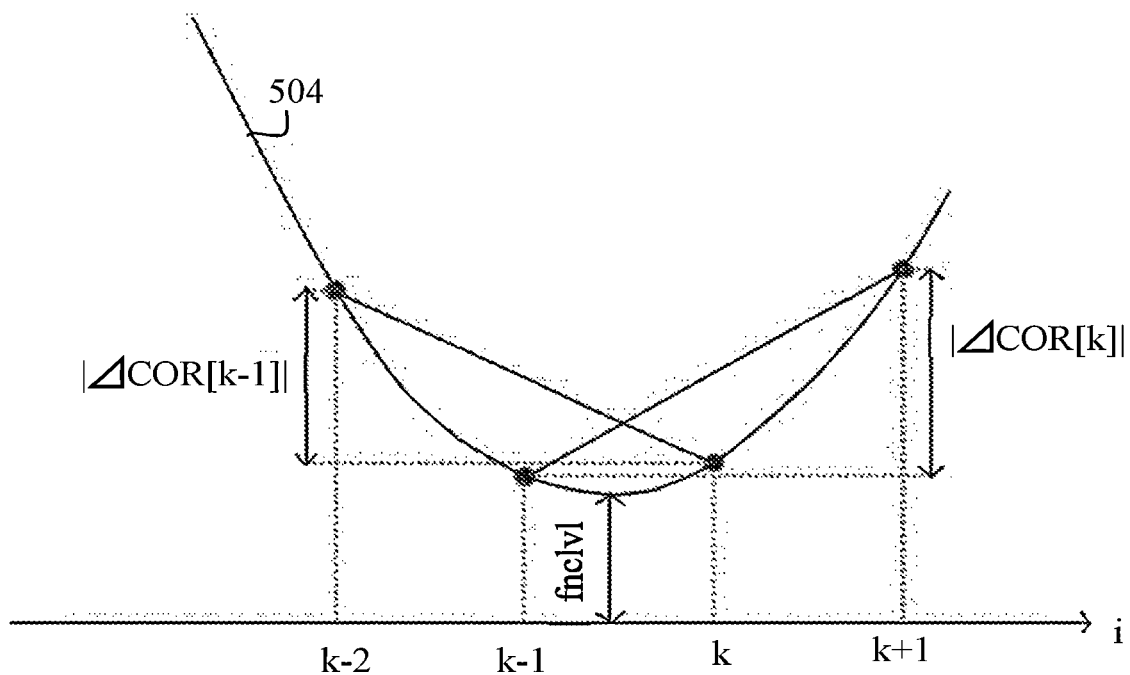

FIG. 5B is an enlarged view of the area 502 in FIG. 5A. A curved line 504 is part of the correlation amount 501. The two-image matching level fnclvl can be calculated by the following equations (6).

(i) when $|\Delta COR[k-1]|\times 2\leq maxder$, $$fnclvl=COR[k-1]+\Delta COR[k-1]/4$$

(ii) when $|\Delta COR[k-1]|\times 2>maxder$, $$fnclvl=COR[k]+\Delta COR[k]/4 \quad (6)$$

Process in Camera Body 120

Figure 7A:
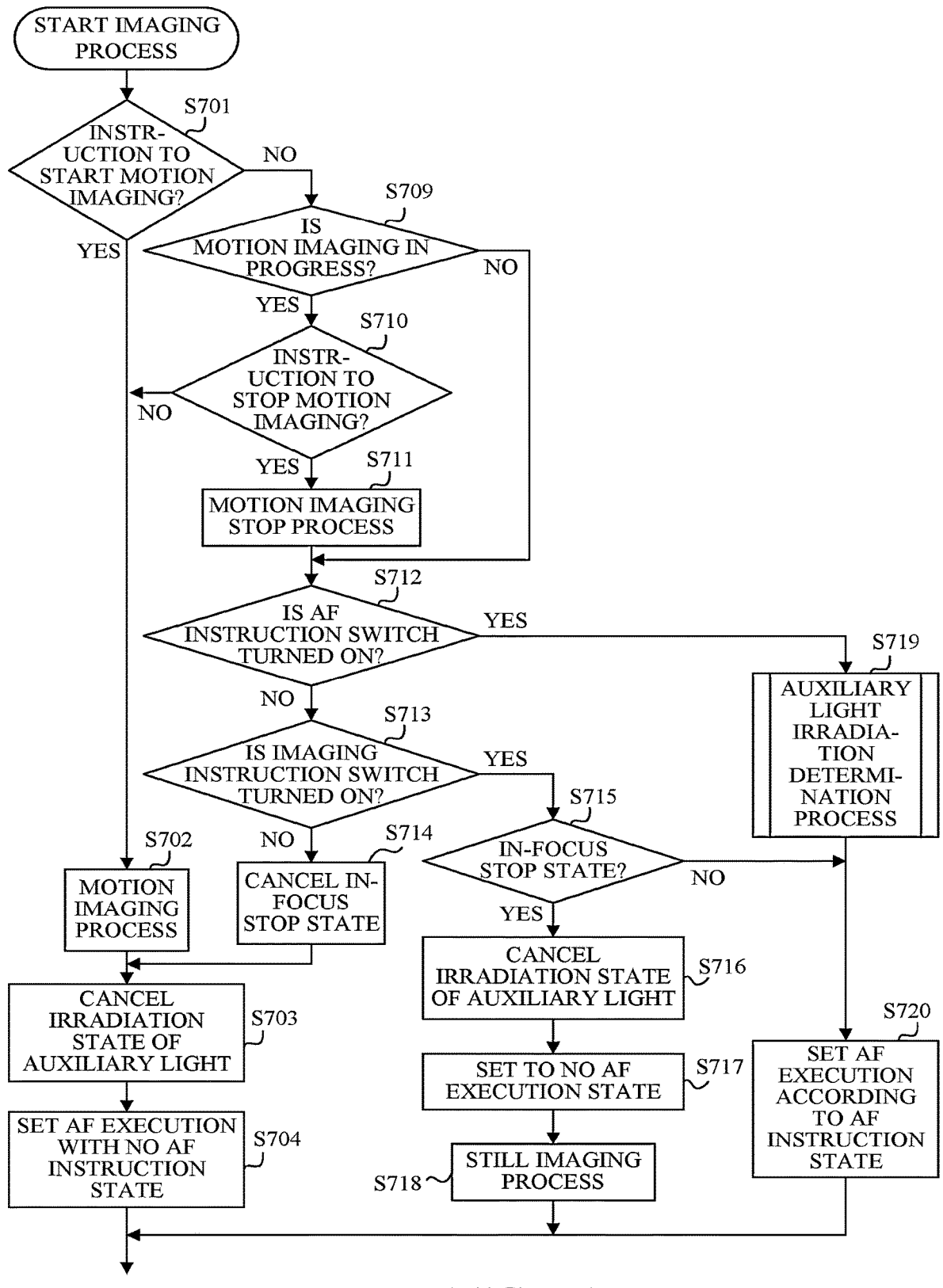
FIGS. 7A and 7B are flowcharts illustrating an imaging process according to the first to seventh embodiments.
Figure 7B:
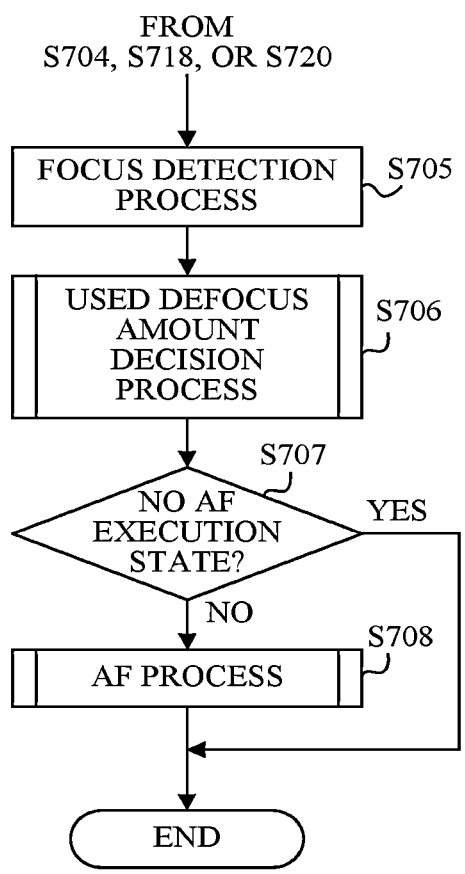

The camera MPU 125 performs the following processes according to a program. First, flowcharts in FIGS. 7A and 7B illustrate an imaging process. S represents a step.

In S701, the camera MPU 125 determines whether or not an instruction to start motion imaging is input from the operation switches 127. The camera MPU 125 is notified of the instruction to start motion imaging when the motion imaging switch of the operation switches 127 is pressed in a state where motion imaging is not in progress. If the camera MPU 125 is notified of the instruction to start motion imaging, the process proceeds to S702, and if the camera MPU 125 is not notified of the instruction to start motion imaging, the process proceeds to S709.

In S702, the camera MPU 125 performs a motion imaging process and records motion image data as image data to be recorded in the memory 128, and the process proceeds to S703.

In S703, the camera MPU 125 cancels irradiation of the object with the auxiliary light emitted from the focus detection auxiliary light source 131. This is because in S719, which is described below, the auxiliary light is to be emitted only when an AF instruction (focus control instruction) is given, and the auxiliary light is not to be emitted when the AF instruction is not given or during motion imaging.

Next, in S704, the camera MPU 125 makes a setting of a state in which AF is executed when no AF instruction is given (hereinafter referred to as "AF execution with no AF instruction state"), and the process proceeds to S705.

In S705, the camera MPU 125 causes the imaging surface phase difference focus detector 129 to perform the focus detection process described with reference to FIGS. 3A to 6B, and acquires the x-direction and y-direction defocus amounts and reliability of each defocus amount (reliability of the image shift amount), and the process proceeds to S706.

In S706, the camera MPU 125 performs a process to decide a defocus amount to be used in AF from the x-direction and y-direction defocus amounts (hereinafter, referred to as "used defocus amount decision process"). A detailed description is given below of this used defocus amount decision process.

Next, in S707, the camera MPU 125 determines whether or not the state is a no AF execution state. If the state is not the no AF execution state, that is, if the AF execution with no AF instruction state is set in S704, or if an "AF execution according to an AF instruction state" is set in S720, which is described below, the process proceeds to S708. In a case where the no AF execution state has been set in S717, which is described below, the imaging process ends.

In S708, the camera MPU 125 executes the AF process for performing focus control for the optical system, and ends the imaging process. A detailed description of the AF process is described below. In the focus control for the optical system, not only the focus lens 104 is moved in the optical axis direction, but also the image sensor 122 may be moved in the optical axis direction.

On the other hand, in S709, the camera MPU 125 determines whether motion imaging is in progress. If the motion imaging is in progress, the process proceeds to S710, and if the motion imaging is not in progress, the process proceeds to S712.

In S710, the camera MPU 125 determines whether or not an instruction to stop the motion imaging is input from the operation switches 127. The camera MPU 125 is notified of the instruction to stop the motion imaging when the motion imaging switch of the operation switches 127 is pressed during the motion imaging. If the camera MPU 125 is notified of the instruction to stop the motion imaging, the process proceeds to S711, and if the camera MPU 125 is not notified of the instruction to stop the motion imaging, the process proceeds to S702 and the motion imaging process is continued.

In S711, the camera MPU 125 performs a motion imaging stop process and stops recording moving image data in the memory 128, and then the process proceeds to S712.

In S712, the camera MPU 125 determines whether or not an AF instruction, which is an instruction to start the AF process, is input from the operation switches 127. The AF instruction is input in response to a half-pressing operation on a release switch of the operation switches 127 or pressing on the AF start switch. If the AF instruction is not input, the camera MPU 125 causes the process to proceed to S713, and if the AF instruction is input, the camera MPU 125 causes the process to proceed to S719.

In S713, the camera MPU 125 determines whether or not an imaging instruction is input from the operation switches 127. The camera MPU 125 is notified of the imaging instruction when the release switch of the operation switches 127 is fully pressed. If the camera MPU 125 is not notified of the imaging instruction, the process proceeds to S714, and if the camera MPU 125 is notified of the imaging instruction, the process proceeds to S715.

In S714, the camera MPU 125 cancels an in-focus stop state. The in-focus stop state is a state for controlling AF in the AF process in S708. In a case where the imaging instruction is input in S713, if the state is the in-focus stop state in S715, which is described below, a still imaging process is performed in S718, but in a case where the imaging instruction has not yet been input in S713, the in-focus stop state is canceled for next imaging. Then, the process proceeds to S703.

In S715, the camera MPU 125 determines whether or not the state is the in-focus stop state, and if the state is the in-focus stop state, the process proceeds to S716, and if the state is not the in-focus stop state, the process proceeds to S720.

In S716, the camera MPU 125 cancels an irradiation state of the auxiliary light and the process proceeds to S717. The still imaging process is executed in S718, which is described below, and therefore the auxiliary light is not to irradiate the object in the still imaging process.

In S717, the camera MPU 125 sets the state to the no AF execution state and causes the process to proceed to S718.

In S718, the camera MPU 125 performs the still imaging process, records image data to be recorded in the memory 128, and causes the process to proceed to S705.

In S719, the camera MPU 125 performs a process to determine whether or not to emit the auxiliary light from the focus detection auxiliary light source 131. A detailed description is given below of this auxiliary light irradiation determination process.

Next, in S720, the camera MPU 125 sets the state to the AF execution according to the AF instruction state, and causes the process to proceed to S705.

Figure 8:
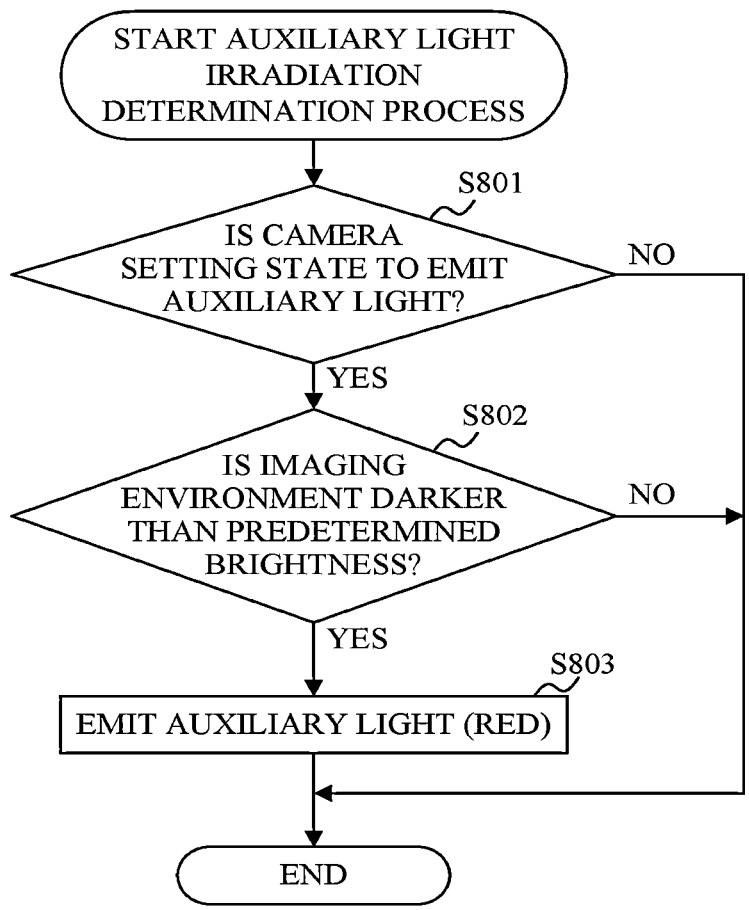
FIG. 8 is a flowchart illustrating an auxiliary light irradiation determination process according to the first, second, and fifth to seventh embodiments.

A flowchart in FIG. 8 illustrates the auxiliary light irradiation determination process performed by the camera MPU 125 in S719 in FIG. 7A.

In S801, the camera MPU 125 determines whether or not the camera body 120 is in a state of being set to irradiate the object with the auxiliary light from the focus detection auxiliary light source 131. Specifically, the camera MPU 125 determines whether or not the user has selected a setting for emitting the auxiliary light provided as a user-selectable menu. If the state is the setting state to emit the auxiliary light, the process proceeds to S802, and if the state is not the setting state, the camera MPU 125 ends the auxiliary light irradiation determination process.

In S802, based on the luminance information acquired from luminance determination image data generated by the image processing circuit 124, the camera MPU 125 determines whether or not brightness of an imaging environment is darker than predetermined brightness. A determination criterion for determining whether or not the imaging environment is in a dark state may include whether or not AF is difficult without the auxiliary light emitted. If the imaging environment is in the dark state, the process proceeds to S803, and if the imaging environment is not in the dark state, the camera MPU 125 ends the auxiliary light irradiation determination process.

In S803, the camera MPU 125 causes the focus detection auxiliary light source 131 to irradiate the object with the auxiliary light. Here, the focus detection auxiliary light source 131 emits red auxiliary light. Then, the camera MPU 125 ends the auxiliary light irradiation determination process.

Figure 9A:
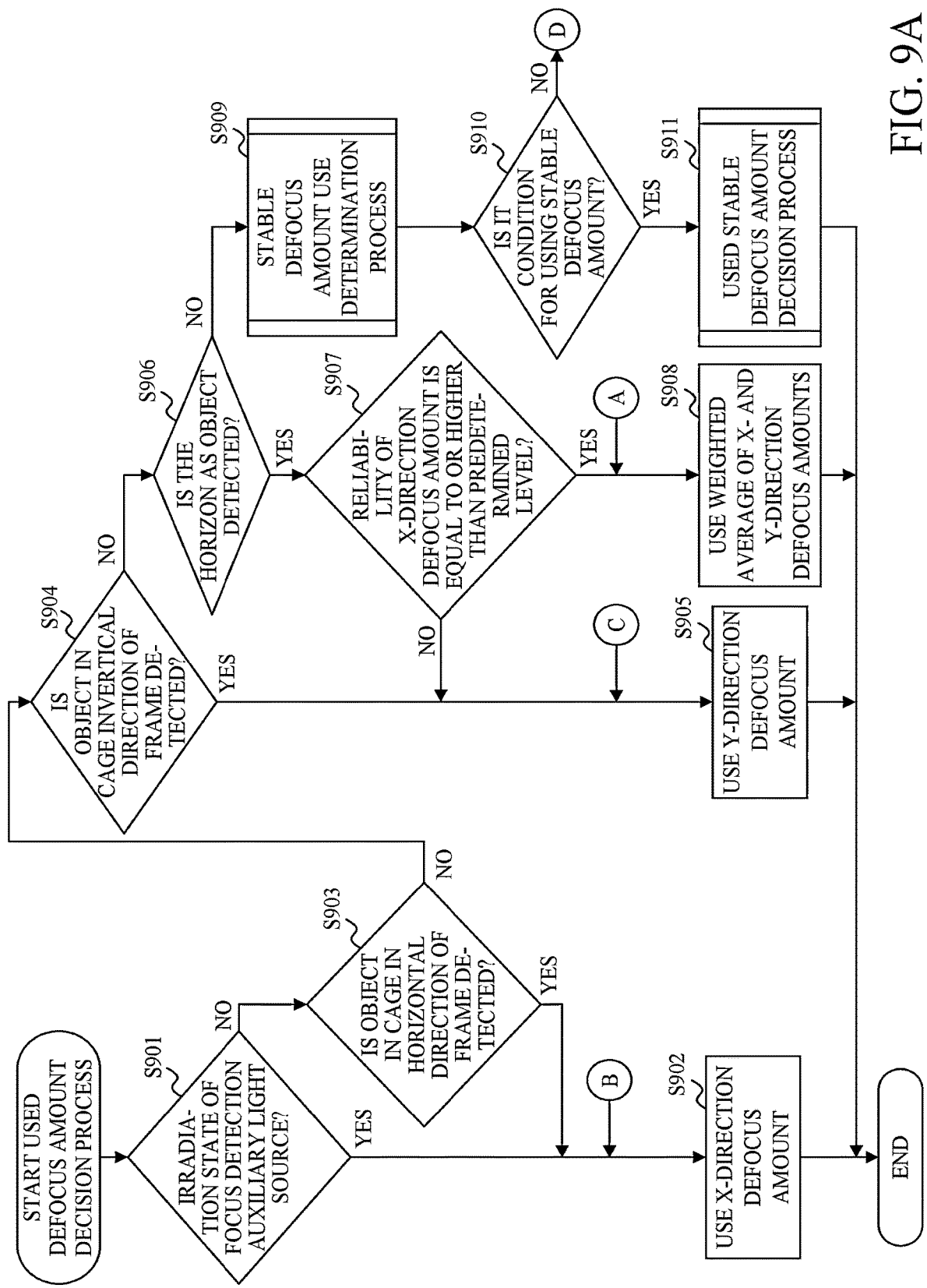
FIGS. 9A and 9B are flowcharts illustrating a used defocus amount decision process according to the first, sixth, and seventh embodiments.
Figure 9B:
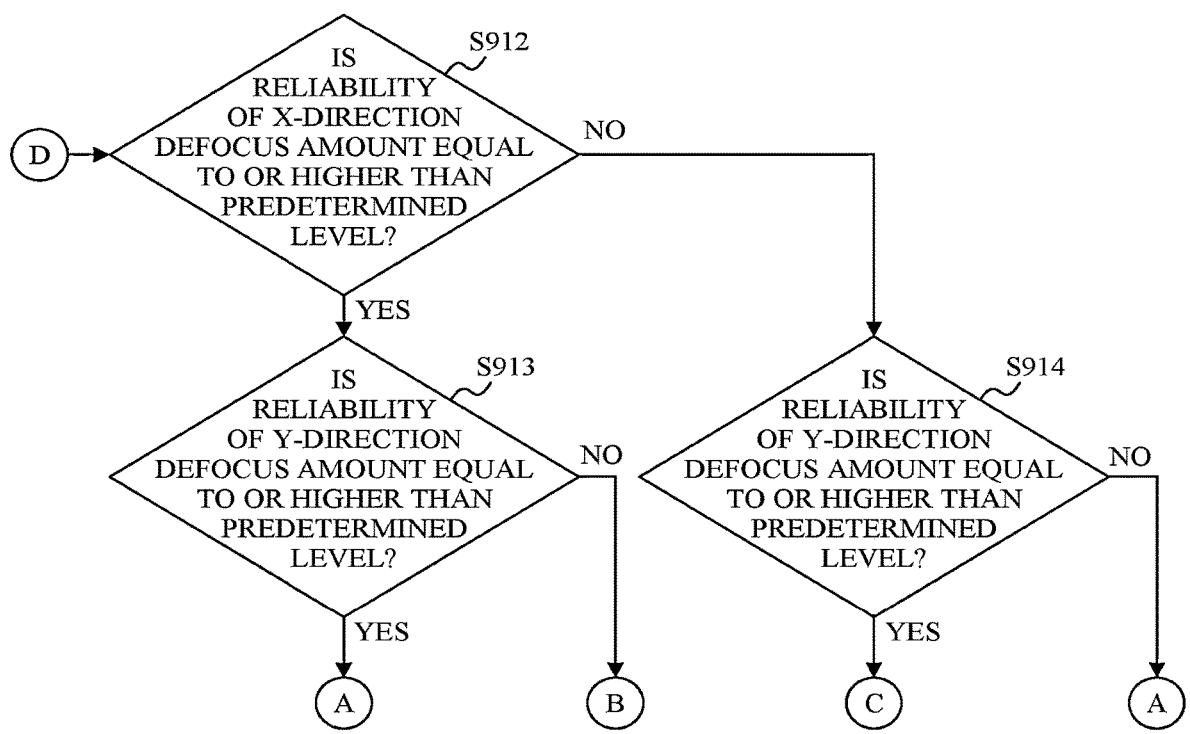

Flowcharts in FIGS. 9A and 9B illustrate the used defocus amount decision process performed by the camera MPU 125 in S706 in FIG. 7B.

In S901, the camera MPU 125 determines whether or not the state is the irradiation state of the auxiliary light. If the state is the irradiation state of the auxiliary light, the process proceeds to S902, and if the state is not the irradiation state, the process proceeds to S903.

In S902, the camera MPU 125 decides to use the x-direction defocus amount. Then the camera MPU 125 ends the used defocus amount decision process.

Figure 13:
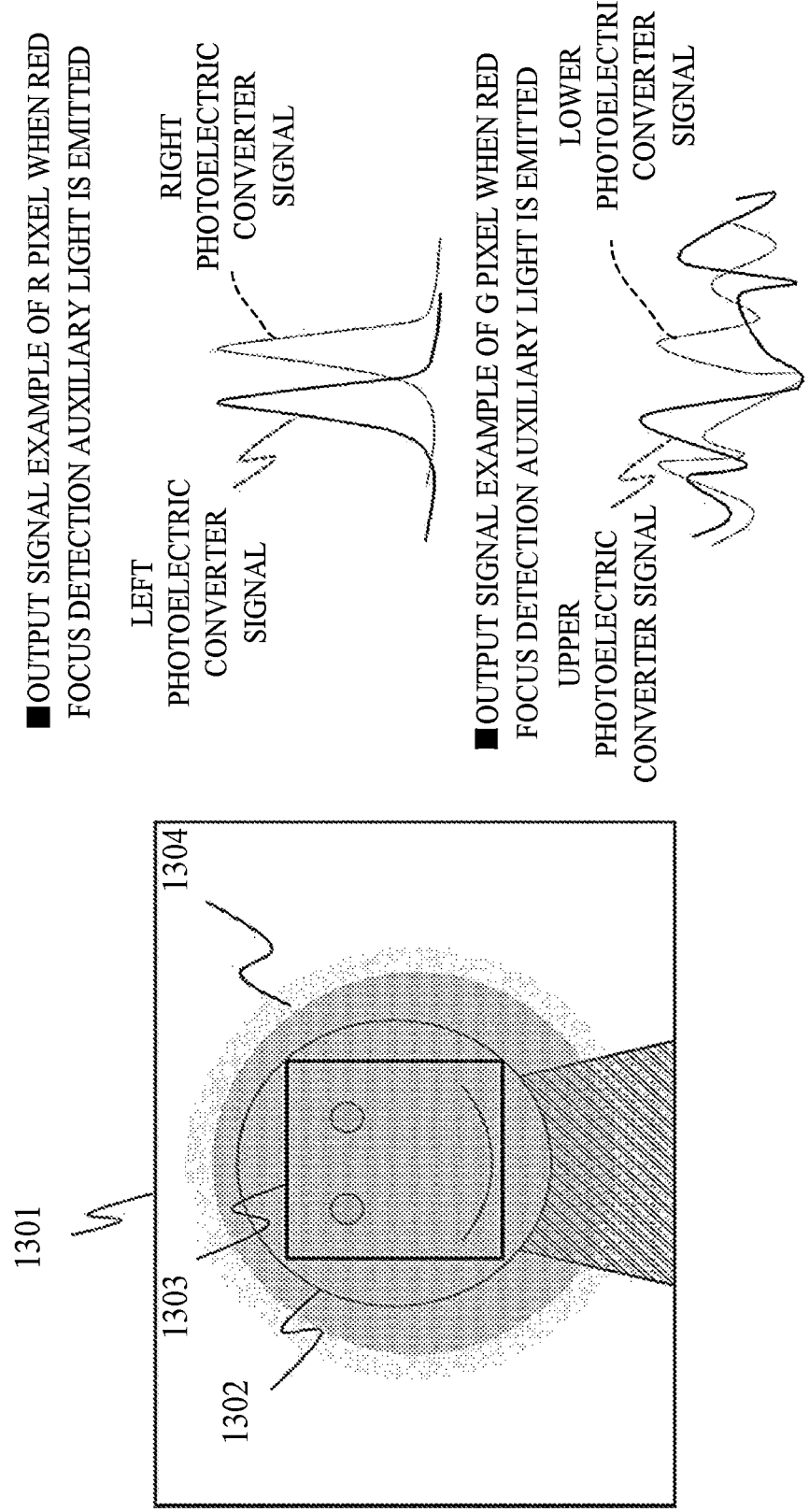
FIG. 13 is a diagram illustrating an example of an imaging scene in an auxiliary light irradiation state and an example of output signals from photoelectric converters.

With reference to FIG. 13, a description is given why the x-direction defocus amount is used in S902 if the state is the irradiation state of the auxiliary light in S901. A left side in FIG. 13 illustrates an example of an imaging scene in which an object 1302 in an imaging frame 1301 is irradiated with red auxiliary light 1304, and an AF area 1303 is set on part (face) of the object 1302. A right side in FIG. 13 illustrates an example of the A-image and B-image signals acquired from the pixels (left and right photoelectric converters) 211R on the image sensor 122 illustrated in FIG. 2B and an example of the C-image and D-image signals acquired from the pixels (upper and lower photoelectric converters) 211Gb on the image sensor 122 illustrated in FIG. 2C.

When the red auxiliary light 1304 is emitted, the A-image and B-image signals with a high matching level can be acquired and a phase difference can be acquired with high accuracy from the pixel 211R that detects the phase difference in the x direction. On the other hand, from the pixel 211Gb that detects the phase difference in the y direction, only the C-image and D-image signals with low signal levels and low matching levels are acquired, and an erroneous phase difference may be detected from the C-image and D-image signals. If AF is performed based on the defocus amount calculated from the erroneously detected phase difference, the in-focus state may not be acquired or the focus lens 104 may be driven in a wrong direction.

Therefore, in this embodiment, when the auxiliary light 1304 is emitted, AF is performed using the defocus amount calculated from the phase difference detected by the pixels of the same color as the auxiliary light color among the pixels 211R and 211Gb. That is, when the red auxiliary light 1304 is emitted, the y-direction defocus amount acquired from the green pixel 211Gb is not used, but the x-direction defocus amount acquired from the red pixel 211R is used.

Figure 14A:
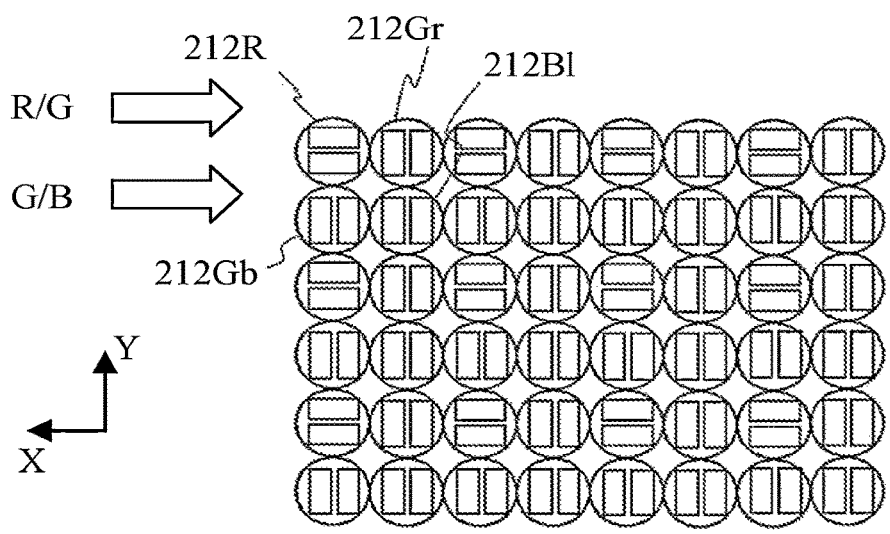
FIGS. 14A to 14C are the other diagrams illustrating the light-receiving pixels.
Figure 14B:
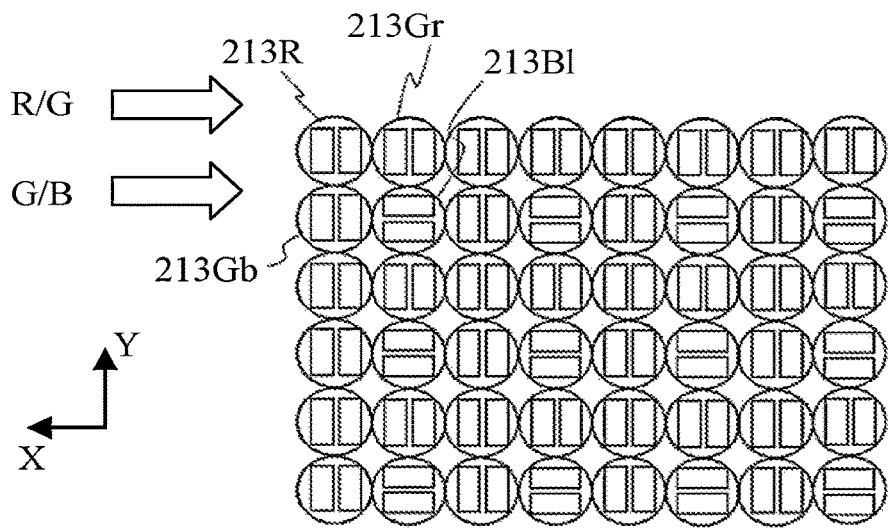
Figure 14C:
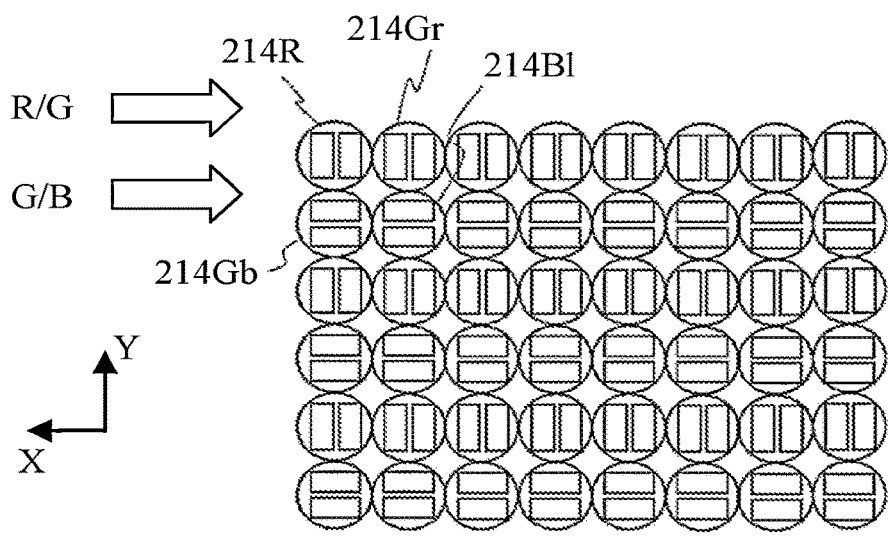

The color of the auxiliary light may be blue or green. Further, the combinations of the pixel colors and the division directions of the photoelectric converters may be different from the combinations illustrated in FIGS. 2A to 2C. For example, as illustrated in FIG. 14A, the photoelectric converters in the red pixels 212R may be divided in the y direction, and the photoelectric converters in the green pixels 212Gr and 212Gb and the blue pixels 212Bl may be divided in the x direction. In this case, if the color of the auxiliary light is red, the y-direction defocus amount acquired from the pixel 212R is used for AF. Alternatively, as illustrated in FIG. 14B, the photoelectric converters in the red pixels 213R and the green pixels 213Gr and 213Gb may be divided in the x direction, and the photoelectric converters in the blue pixels 213Bl may be divided in the y direction. Alternatively, as illustrated in FIG. 14C, the photoelectric converters in the red pixels 214R and green pixels 214Gr may be divided in the x direction, and the photoelectric converters in the green pixel 214Gb and blue pixel 214Bl may be divided in the y direction.

In S903, the camera MPU 125 determines whether or not the object detector 130 detects an object (hereinafter referred to as "horizontal caged object") over a cage that is an object extending in the horizontal direction (x direction: straight line direction) of the frame. If the horizontal caged object is detected, the camera MPU 125 causes the process to proceed to S902 and decides to use the x-direction defocus amount, and if the horizontal caged object is not detected, the process proceeds to S904.

In S904, the camera MPU 125 determines whether or not the object detector 130 detects an object (hereinafter referred to as "vertical caged object") over a cage extending in the vertical direction (y direction: straight line direction) of the frame. If the vertical caged object is detected, the process proceeds to S905, and if the vertical caged object is not detected, the process proceeds to S906.

In S905, the camera MPU 125 decides to use the y-direction defocus amount. Then, the camera MPU 125 ends the used defocus amount decision process.

Figure 15A:
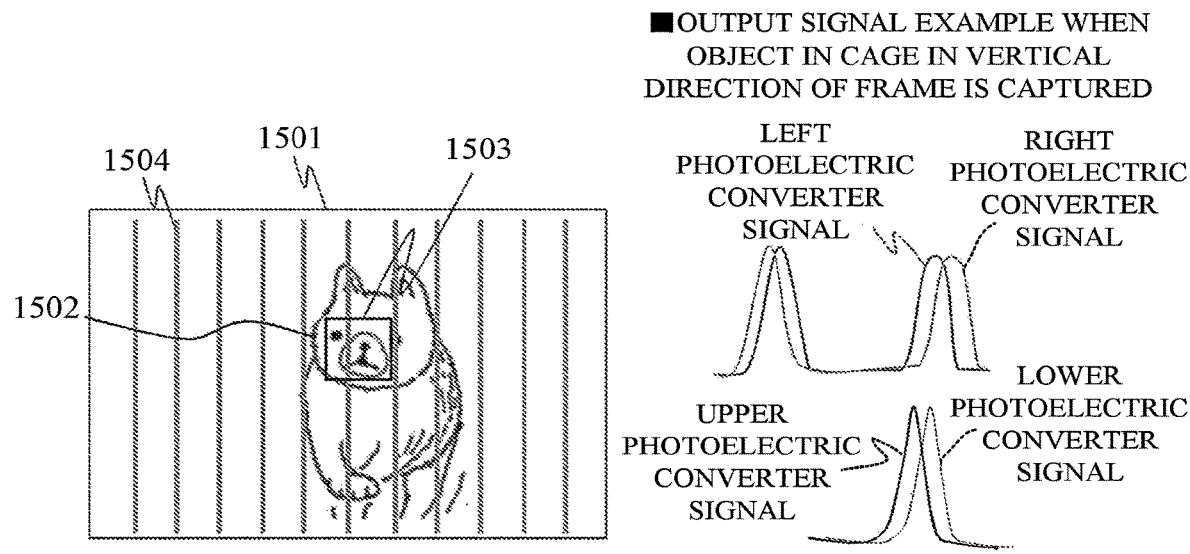
FIGS. 15A and 15B are diagrams illustrating an example of an imaging scene over a cage and an example of output signals from the photoelectric converters.
Figure 15B:
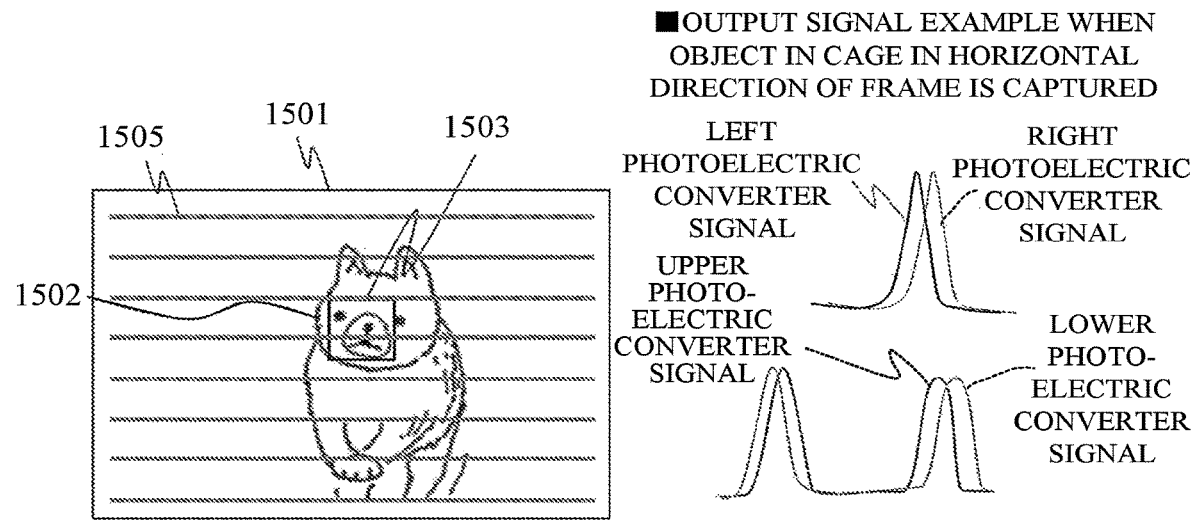

With reference to FIGS. 15A and 15B, a description is given of why the x-direction defocus amount is used in S902 when a horizontal caged object is detected in S903, and why the y-direction defocus amount is used in S905 when a vertical caged object is detected in S904.

A left side in FIG. 15A illustrates an imaging scene in which an object 1502 is captured behind a cage 1504 extending in the vertical direction in an imaging frame 1501, and an AF area 1503 is set on part (face) of the object 1502. A right side in FIG. 15A illustrates an example of the A-image and B-image signals acquired from the pixels (left and right photoelectric converters) 211R on the image sensor 122 illustrated in FIG. 2B and an example of the C-image and D-image signals acquired from the pixels (upper and lower photoelectric converters) 211Gb on the image sensor 122 illustrated in FIG. 2C.

In this imaging scene, the AF area 1503 includes not only the object 1502 but also the cage 1504 extending in the vertical direction. Therefore, the A-image and B-image signals acquired from the pixels 211R include not only a change component caused by the object 1502 but also a change component caused by the cage 1504, and a state is such that the object 1502 on the far side and the cage 1504 on the near side are in conflict with each other. Even when AF is performed using the defocus amount acquired from the phase difference between the A-image and B-image signals in such a state, the result may be such that the object 1502 is out of focus and the cage 1504 is in focus or that neither the object 1502 nor the cage 1502 is in focus. On the other hand, the C-image and D-image signals acquired from the pixels 211Gb include a change component caused by the object 1502 but do not include a change component caused by the cage 1504, and therefore from the C-image and D-image signals, the phase difference and the defocus amount of the object 1502 can be acquired and good AF can be performed. Therefore, in a case where a vertical caged object is detected in S904, it is decided in S905 to use the y-direction defocus amount.

A left side in FIG. 15B illustrates an imaging scene in which the object 1502 is captured behind a cage 1505 extending in the horizontal direction in the imaging frame 1501, and the AF area 1503 is set on part (face) of the object 1502. A right side in FIG. 15B illustrates an example of the A-image and B-image signals acquired from the pixels (left and right photoelectric converters) 211R and an example of the C-image and D-image signals acquired from the pixels (upper and lower photoelectric converters) 211Gb.

In this imaging scene, the AF area 1503 includes not only the object 1502 but also the cage 1505 extending in the horizontal direction. Therefore, the C-image and D-image signals acquired from the pixels 211Gb include not only a change component caused by the object 1502 but also a change component caused by the cage 1505, a state is such that the object 1502 on the far side and the cage 1504 on the near side are in conflict with each other, and a problem similar to the problem described with reference to FIG. 15A occurs. On the other hand, the A-image and B-image signals acquired from the pixels 211R include a change component caused by the object 1502 but do not include a change component caused by the cage 1505, and therefore from the A-image and B-image signals, the phase difference and the defocus amount of the object 1502 can be acquired. Hence, in a case where a horizontal caged object is detected in S903, it is decided in S902 to use the x-direction defocus amount.

In S906, the camera MPU 125 determines whether or not the horizon is detected as an object by the object detector 130. If the horizon is detected, the process proceeds to S907, and if the horizon is not detected, the process proceeds to S909.

In S907, the camera MPU 125 determines whether or not the reliability of the x-direction defocus amount is equal to or higher than a predetermined level. If the reliability is equal to or higher than the predetermined level, the process proceeds to S908, and if the reliability is not equal to or higher than the predetermined level, the process proceeds to S905, and the camera MPU 125 decides to use the y-direction defocus amount.

In S908, the camera MPU 125 decides to use an average of the sum at a predetermined ratio (hereinafter referred to as "weighted average") of the x-direction defocus amount and the y-direction defocus amount. Then, the camera MPU 125 ends the used defocus amount decision process.

Figure 16A:
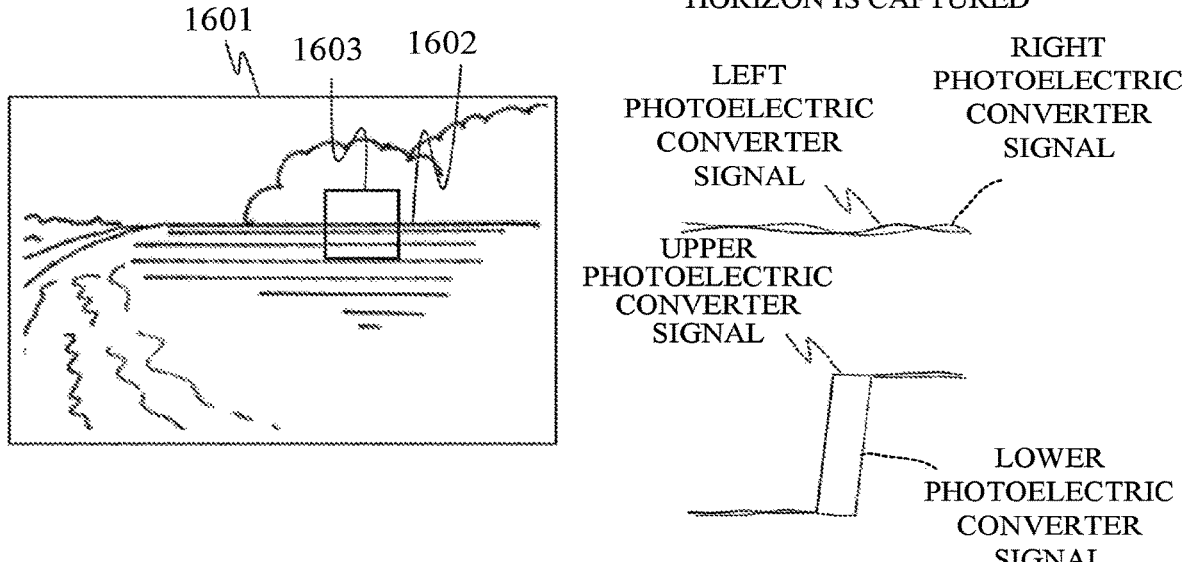
FIGS. 16A and 16B are diagrams illustrating an example of an imaging scene including the horizon and an example of output signals from the photoelectric converters.
Figure 16B:
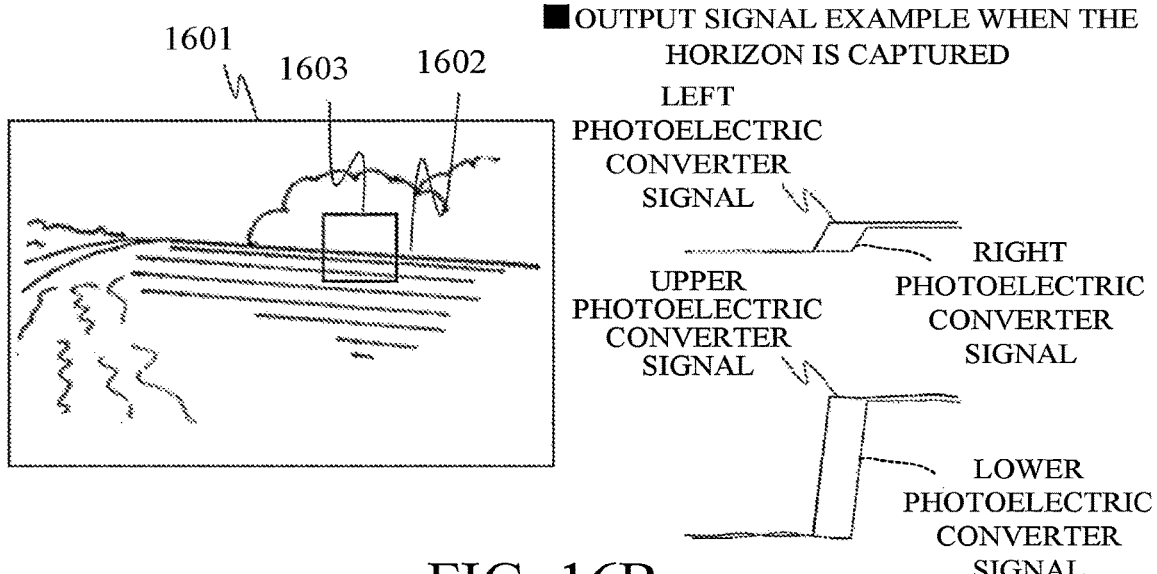

With reference to FIGS. 16A and 16B, a description is given of why the y-direction defocus amount is used in S905 or the weighted average of the x-direction and y-direction defocus amounts is used in S908, depending on the reliability of the x-direction defocus amount in S907 in a case where the horizon is detected in S906.

A left side in FIG. 16A illustrates an example of an imaging scene in which the horizon 1602 is captured in an imaging frame 1601, and an AF area 1603 is set on the horizon 1602. A right side in FIG. 16A illustrates an example of the A-image and B-image signals acquired from the pixels (left and right photoelectric converters) 211R on the image sensor 122 illustrated in FIG. 2B and an example of the C-image and D-image signals acquired from the pixels (upper and lower photoelectric converters) 211Gb on the image sensor 122 illustrated in FIG. 2C.

Since the horizon 1602 does not have a contrast in the horizontal direction of the imaging frame 1601, the signal amounts of the A-image and B-image signals acquired from the pixels 211R is small and the phase difference may not be accurately detected from the A-image and B-image signals. On the other hand, since the horizon 1602 has a contrast in the vertical direction of the imaging frame 1601, the phase difference can be accurately detected from the C-image and D-image signals acquired from the pixels 211Gb. Therefore, basically, by using the y-direction defocus amount in S905, the horizon 1602 can be accurately focused on.

However, in a case of night or a weather with a small light amount such as when it is cloudy, or in a case where a high shutter speed or a small aperture is set, a decrease in the signal amount and an increase in noise may lower detection accuracy of the defocus amount. Therefore, the x-direction defocus amount may also be used as much as possible so that the detection accuracy of the defocus amount is improved. Therefore, in a case where the reliability of the x-direction defocus amount is equal to or higher than the predetermined level in S907, the detection accuracy of the defocus amount is improved by using the weighted average of the x-direction and y-direction defocus amounts in S908.

The predetermined level as a threshold for the reliability in S907 may be set to a level at which sufficient in-focus accuracy is acquired in AF. For example, as illustrated in a left side in FIG. 16B, in a case where the imaging frame 1601 (AF area 1603) is tilted relatively to the horizon 1602, although the signal amounts of the A-image and B-image signals acquired from the pixels 211R are small as illustrated in a right side in FIG. 16B, it is possible to detect the phase difference from the A-image and B-image signals.

The process in S908 assumes such a case. The ratio of weighted addition performed in S908 may be 1:1, but may be changed depending on contrast levels of the A- to D-image signals. For example, as illustrated in FIG. 16B, in a case where the C-image and D-image signals have a higher contrast than a contrast of the A-image and B-image signals, a weight of the y-direction defocus amount acquired from the C-image and D-image signals is set to be larger than a weight of the x-direction defocus amount acquired from the A-image and B-image signals. Further, the ratio of the weighted addition may be changed depending on information on the reliability of the defocus amount (two-image matching level or steepness).

In S909, the camera MPU 125 performs a stable defocus amount use determination process. A detailed description is given below of the stable defocus amount and the stable defocus amount use determination process.

Next, in S910, the camera MPU 125 determines whether or not the state satisfies a condition for using the stable defocus amount as the defocus amount used in AF. If the state satisfies the condition, the process proceeds to S911, and if the state does not satisfy the condition, the process proceeds to S912.

In S911, the camera MPU 125 performs a used stable defocus amount decision process. A detailed description is given below of the used stable defocus amount decision process. Then the camera MPU 125 ends the used defocus amount decision process.

In S912, the camera MPU 125 determines whether or not the reliability of the x-direction defocus amount is equal to or higher than the predetermined level. If the reliability is equal to or higher than the predetermined level, the process proceeds to S913, and if the reliability is not equal to or higher than the predetermined level, the process proceeds to S914.

In S913, the camera MPU 125 determines whether or not the reliability of the y-direction defocus amount is equal to or higher than a predetermined level. If the reliability is equal to or higher than the predetermined level, the process proceeds to S908, and if the reliability is not equal to or higher than the predetermined level, the process proceeds to S902.

In S914, the camera MPU 125 determines whether or not the reliability of the y-direction defocus amount is equal to or higher than the predetermined level as in S913. If the reliability is equal to or higher than the predetermined level, the process proceeds to S905, and if the reliability is not equal to or higher than the predetermined level, the process proceeds to S908.

In the processes in S912, S913, and S914, the defocus amount to be used is decided depending on the reliability of the x-direction and y-direction defocus amounts. The predetermined level as a threshold for the reliability in S912, S913 and S914 may be set to a level at which sufficient in-focus accuracy is acquired in AF, as in S907. In S912 and S913, in a case where the reliability of both the x-direction and y-direction defocus amounts are equal to or higher than the predetermined level, that is, in a case where the defocus amounts in both directions satisfies the conditions for using them in AF, it is decided in S908 to use the weighted average of the x-direction and y-direction defocus amounts. As a result, a highly accurate defocus amount can be used in AF.

In a case where the reliability of the x-direction defocus amount is equal to or higher than the predetermined level in S912 but the reliability of the y-direction defocus amount is not equal to or higher than the predetermined level in S913, it is decided in S902 to use the x-direction defocus amount. In a case where the reliability of the x-direction defocus amount is not equal to or higher than the predetermined level in S912 but the reliability of the y-direction defocus amount is equal to or higher than the predetermined level in S914, it is decided in S905 to use the y-direction defocus amount. In a case where the reliability of both the x-direction and y-direction defocus amounts are not equal to or higher than the predetermined level in S912 and S914, it is decided in S908 to use the weighted average of x-direction and y-direction defocus amounts. The ratio of the weighted addition in S908 may be 1:1, or may be changed depending on the contrast levels of the A- to D-image signals.

Figure 10:
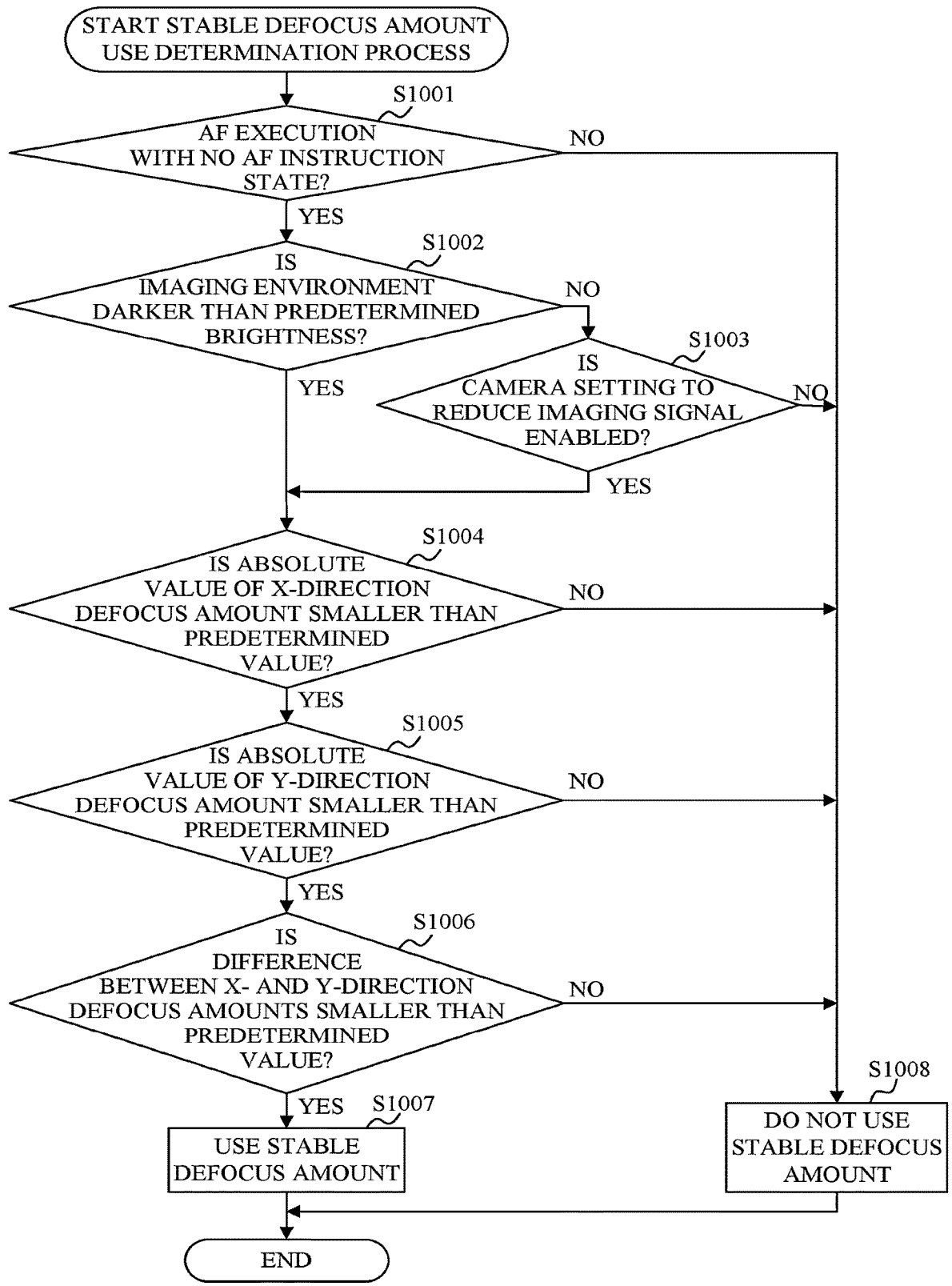
FIG. 10 is a flowchart illustrating a stable defocus amount use determination process according to the first to fifth embodiments.

A flowchart in FIG. 10 illustrates the stable defocus amount use determination process performed by the camera MPU 125 in S909.

In S1001, the camera MPU 125 determines whether or not the state is the AF execution with no AF instruction state. If the state is the AF execution with no AF instruction state, the process proceeds to S1002, and if the state is not the AF execution with no AF instruction state, the process proceeds to S1008.

In S1002, based on the luminance information acquired from the luminance determination image data generated by the image processing circuit 124, the camera MPU 125 determines whether or not the brightness of the imaging environment is darker than predetermined brightness. A determination criterion for determining whether or not the imaging environment is in the dark state may be whether or not the luminance is such that the variation in the detection accuracy of the defocus amount is larger than a predetermined amount. If the imaging environment is in the dark state, the process proceeds to S1004, and if the imaging environment is not in the dark state, the process proceeds to S1003.

In S1003, the camera MPU 125 determines whether or not a setting to reduce a signal amount of the imaging signal is enabled in the camera body 120. The case where the setting to reduce the signal amount of the imaging signal is enabled is, for example, a case where via the operation switches 127, an exposure correction is set to be darker than a proper exposure, or a case where Log imaging is set. If the setting to reduce the signal amount of the imaging signal is enabled, the process proceeds to S1004, and if this setting is not enabled, the process proceeds to S1008.

In S1004, the camera MPU 125 determines whether or not an absolute value of the x-direction defocus amount is smaller than a predetermined value. If the absolute value is smaller than the predetermined value, the process proceeds to S1005, and if the absolute value is not smaller than the predetermined value, the process proceeds to S1008.

In S1005, the camera MPU 125 determines whether or not an absolute value of the y-direction defocus amount is smaller than a predetermined value. If the absolute value is smaller than the predetermined value, the process proceeds to S1006, and if the absolute value is not smaller than the predetermined value, the process proceeds to S1008.

In S1006, the camera MPU 125 determines whether or not a difference between the x-direction and y-direction defocus amounts is smaller than a predetermined value. If the difference is smaller than the predetermined value, the process proceeds to S1007, and if the difference is not smaller than the predetermined value, the process proceeds to S1008.

In S1007, the camera MPU 125 determines to use the stable defocus amount. Then the camera MPU 125 ends the stable defocus amount use determination process.

In S1008, the camera MPU 125 determines not to use the stable defocus amount. Then, the camera MPU 125 ends the stable defocus amount use determination process.

Depending on the result of the above-described stable defocus amount use determination process, the camera MPU 125 determines in S910 in FIG. 9A whether or not the state satisfies the condition for using the stable defocus amount. If the state satisfies the condition for using the stable defocus amount, the used stable defocus amount decision process is performed in S911. A detailed description is given below of why such determinations are made in the processes in FIG. 10 after a detailed description of the used stable defocus amount decision process given next.

Figure 11:
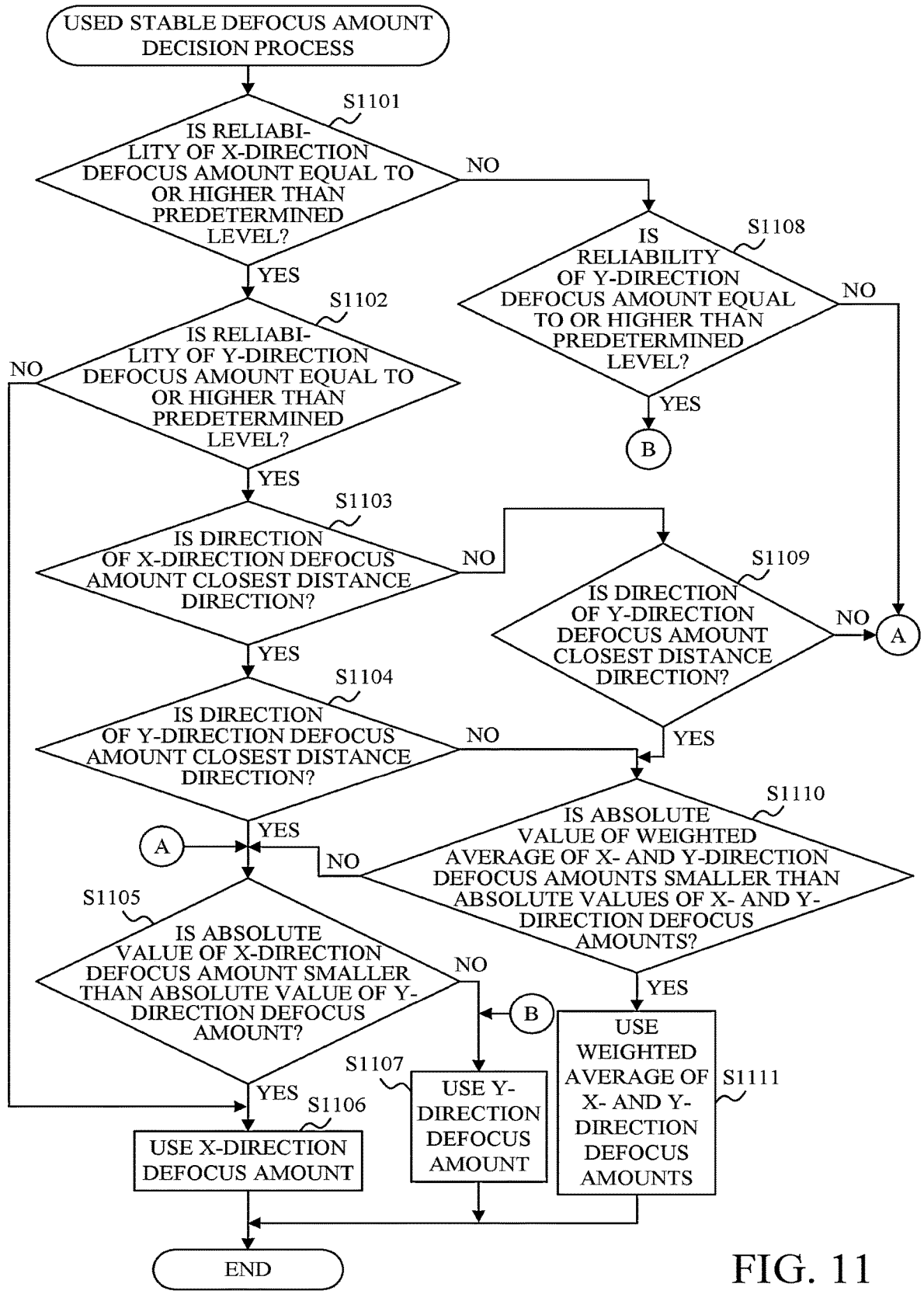
FIG. 11 is a flowchart illustrating a used stable defocus amount decision process according to the first to fifth embodiments.

A flowchart in FIG. 11 illustrates the used stable defocus amount decision process performed by the camera MPU 125 in S911.

In S1101, the camera MPU 125 determines whether or not the reliability of the x-direction defocus amount is equal to or higher than a predetermined level. If the reliability is equal to or higher than the predetermined level, the process proceeds to S1102, and if the reliability is not equal to or higher than the predetermined level, the process proceeds to S1108.

In S1102, the camera MPU 125 determines whether or not the reliability of the y-direction defocus amount is equal to or higher than a predetermined level. If the reliability is equal to or higher than the predetermined level, the process proceeds to S1103, and if the reliability is not equal to or higher than the predetermined level, the process proceeds to S1106. The predetermined level as a threshold for the reliability in S1101 and S1102 may be set to a level at which sufficient in-focus accuracy is acquired in AF, as in S907 and S912 to S914.

In S1103, the camera MPU 125 determines whether or not a defocus direction of the x-direction defocus amount (hereinafter simply referred to as "direction of defocus amount") is a closest distance direction. If the direction is the closest distance direction, the process proceeds to S1104, and if the direction is not the closest distance direction, that is, defocus amount direction is an infinite distance direction, the process proceeds to S1109.

In S1104, the camera MPU 125 determines whether or not a direction of the y-direction defocus amount is the closest distance direction. If the direction is the closest distance direction, the process proceeds to S1105, and if the direction is the infinite distance direction, the process proceeds to S1110.

In S1105, the camera MPU 125 determines whether or not the absolute value of the x-direction defocus amount is smaller than the absolute value of the y-direction defocus amount. If the absolute value of the x-direction defocus amount is smaller than the absolute value of the y-direction defocus amount, the process proceeds to S1106, and if the absolute value of the x-direction defocus amount is not smaller than the absolute value of the y-direction defocus amount, the process proceeds to S1107.

In S1106, the camera MPU 125 decides to use the x-direction defocus amount as the stable defocus amount. Then, the camera MPU 125 ends the used stable defocus amount decision process.

In S1107, the camera MPU 125 decides to use the y-direction defocus amount as the stable defocus amount. Then, the camera MPU 125 ends the used stable defocus amount decision process.

In S1108, similarly to S1102, the camera MPU 125 determines whether or not the reliability of the y-direction defocus amount is equal to or higher than a predetermined level. If the reliability is equal to or higher than the predetermined level, the process proceeds to S1107, and if the reliability is not equal to or higher than the predetermined level, the process proceeds to S1105. The predetermined level as a threshold for the reliability in S1108 may also be set to a level at which sufficient in-focus accuracy is acquired in AF, as in S1102.

In S1109, similarly to S1104, the camera MPU 125 determines whether or not the direction of the y-direction defocus amount is the closest distance direction. If the direction is the closest distance direction, the process proceeds to S1110, and if the direction is the infinite distance direction, the process proceeds to S1105.

In S1110, the camera MPU 125 determines whether or not the absolute value of the weighted average of the x-direction and y-direction defocus amounts is smaller than the absolute values of the x-direction and y-direction defocus amounts. If the absolute value of the weighted average is smaller than the absolute value of each defocus amount, the process proceeds to S1111, and if the absolute value of the weighted average is not smaller than the absolute value of each defocus amount, the process proceeds to S1105.

In S1111, the camera MPU 125 decides to use the weighted average of the x-direction and y-direction defocus amounts as the stable defocus amount. Then, the camera MPU 125 ends the used stable defocus amount decision process.

Figure 17:
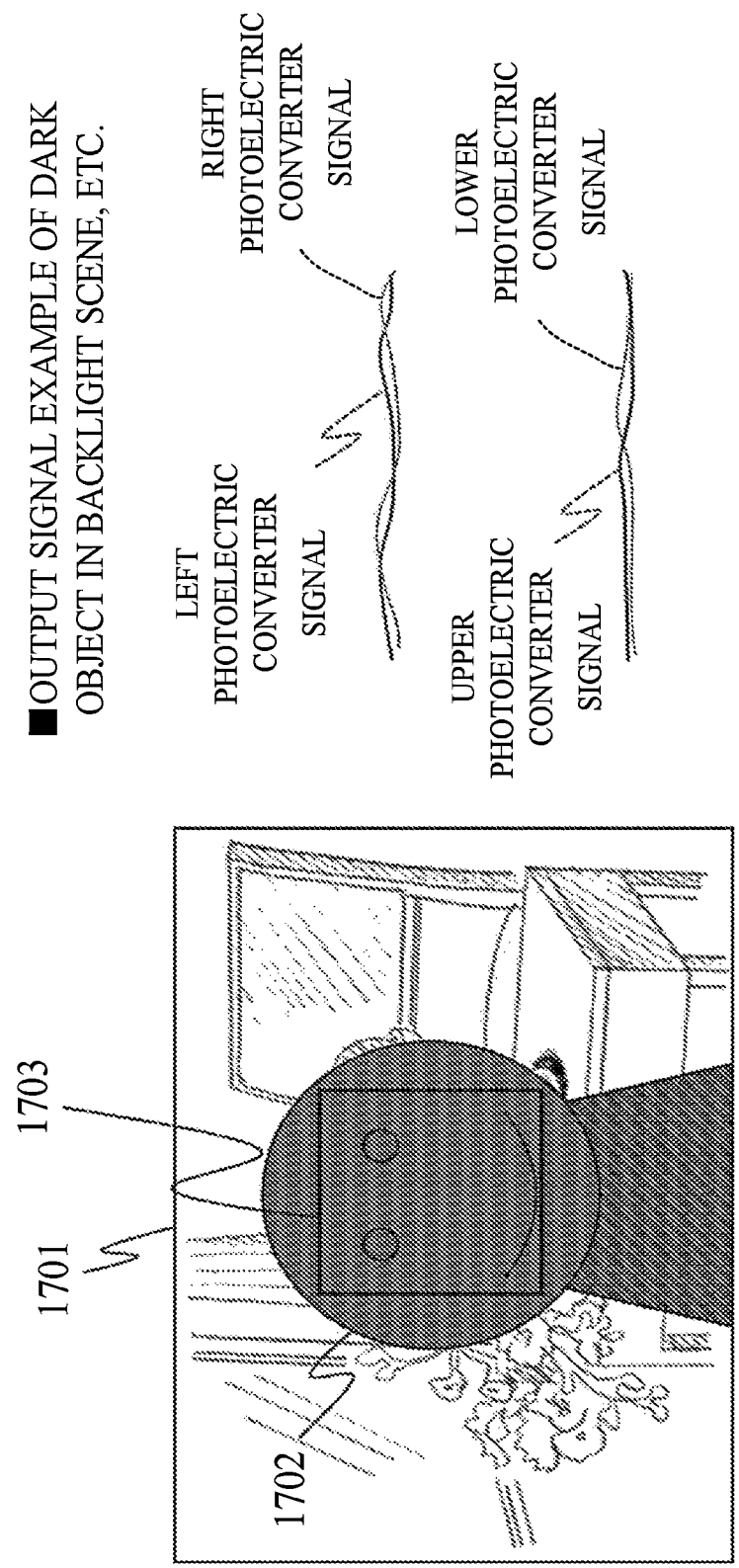
FIG. 17 is a diagram illustrating an example of a dark imaging scene and an example of output signals from the photoelectric converters.
Figure 18:
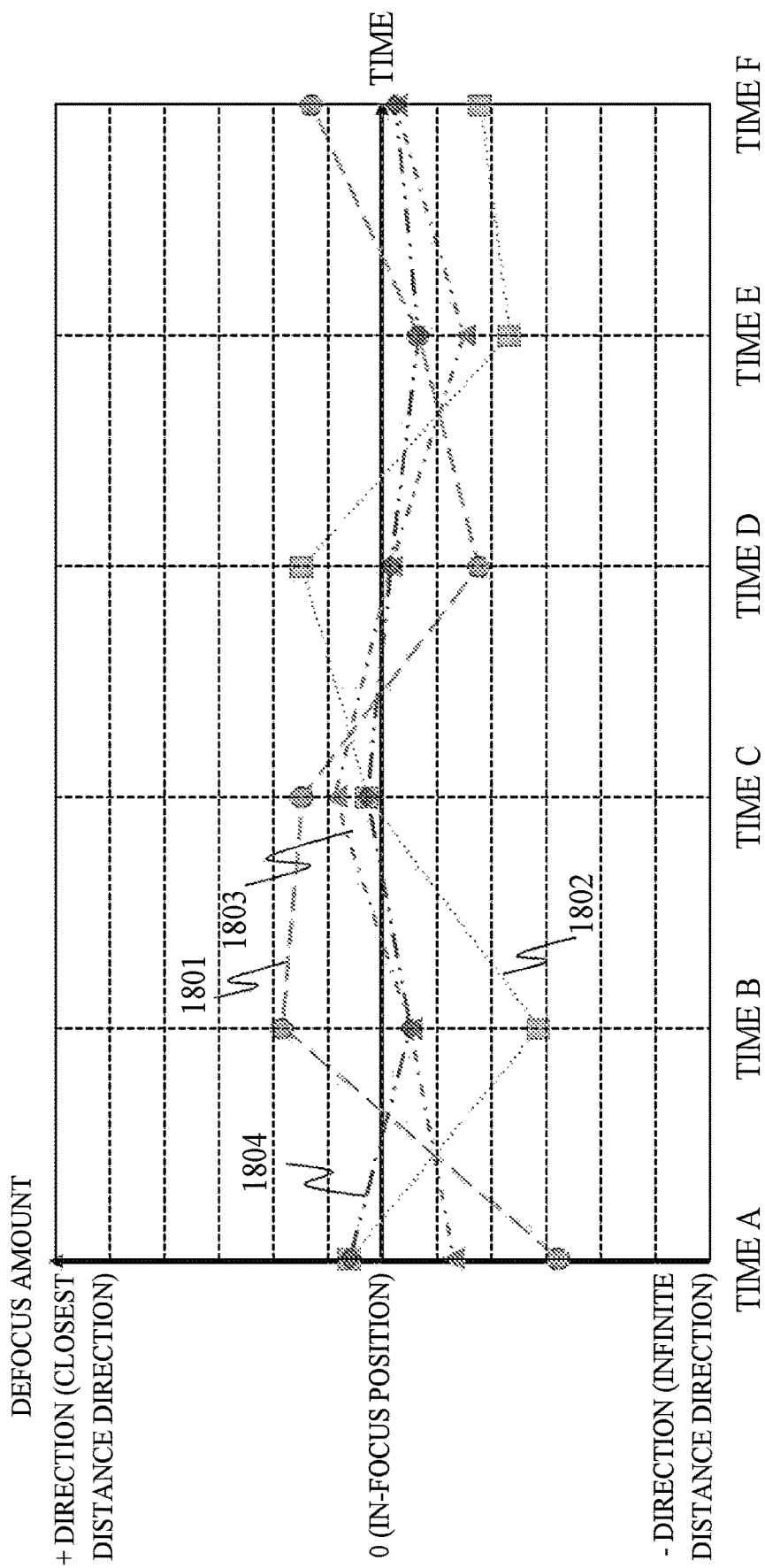
FIG. 18 is a graph illustrating an example of defocus amounts detected when the signal amount is small.

With reference to FIGS. 17 and 18, a detailed description is given of the stable defocus amount use determination process described with reference to FIG. 10 and the used stable defocus amount decision process described with reference to FIG. 11. A left side in FIG. 17 illustrates an example of an imaging scene in which a person 1702 as an object is captured in an imaging frame 1701, and an AF area 1703 is set on part (face) of the person 1702. A right side in FIG. 17 illustrates an example of the A-image and B-image signals acquired from the pixels (left and right photoelectric converters) 211R on the image sensor 122 illustrated in FIG. 2B and an example of the C-image and D-image signals acquired from the pixels (upper and lower photoelectric converters) 211Gb on the image sensor 122 illustrated in FIG. 2C.

In this imaging scene, light enters through a window in the background, the person 1702 is backlit and dark, and the signal amount of the A- to D-image signals acquired in the AF area 1703 is small. Furthermore, in a case where the setting to reduce the signal amount such as Log imaging is enabled, the decrease in the signal amount of the A- to D-image signals becomes even more pronounced. In such a situation, the phase difference may not be detected with high accuracy using either the A-image and B-image signals or the C-image and D-image signals.

FIG. 18 illustrates a change over time of defocus amounts acquired under a backlight condition illustrated in FIG. 17 or other conditions under which the signal amount decreases. A vertical axis represents the defocus amount. Zero in the center corresponds to an in-focus state, a value above zero indicates a defocus amount in a + direction (closest distance direction), and a value below 0 indicates a defocus amount in a − direction (infinite distance direction). A horizontal axis represents time, and here the defocus amounts from a time A to a time F are illustrated. A dashed line 1801 connecting round markers at the times A to F represents the x-direction defocus amounts, and a dotted line 1802 connecting square markers represents the y-direction defocus amounts. Both the x-direction and y-direction defocus amounts greatly vary in the closest distance direction and the infinite distance direction with respect to the in-focus state over time due to changes in the light amount entering the pixels and in the contrast intensity of the object. As the defocus amounts vary in the closest distance direction and the infinite distance direction in this way, the focus lens 104 continues to move so as to follow the defocus amounts, and the in-focus state and the blurred state are repeated. In particular, in a case where the repeated in-focus state and blurred state is recorded during motion imaging, a low-quality motion image is obtained.

A one-dot chain line 1803 connecting triangular markers represents defocus amounts as the weighted averages of the x-direction and y-direction defocus amounts at 1:1. A two-dot chain line 1804 connecting rhombic markers represents the stable defocus amounts decided to be used in the used stable defocus amount decision process in FIG. 11. The stable defocus amount 1804 has less variation with respect to the in-focus state than the variations in the other defocus amounts 1801 to 1803. For this reason, by using the stable defocus amount 1804 in AF, it is possible to reduce focus variations caused by variations in the defocus amount described above.

A description is given of the stable defocus amount 1804 decided to be used at each time in FIG. 18 in the used stable defocus amount decision process in FIG. 11. The following description is given while it is assumed that the reliability of the x-direction and y-direction defocus amounts is determined to be equal to or higher than the predetermined level in S1101 and S1102 in FIG. 11.

First, in S1103 and S1104 in FIG. 11, in a case where both directions of the x-direction and y-direction defocus amounts are the closest distance direction, that is, at the time C in FIG. 18, it is determined in S1105 to use the defocus amount having the smaller absolute value of the x-direction and y-direction defocus amounts. At the time C, the absolute value of the y-direction defocus amount is smaller than the absolute value of the x-direction defocus amount, and therefore the y-direction defocus amount 1802 is decided to be used as the stable defocus amount 1804 in S1107. At the time C, the y-direction defocus amount 1802 has the smallest absolute values in the defocus amounts 1801 to 1803 and is a defocus amount with which AF is not likely to become unstable near the in-focus state.

In S1103 and S1109 in FIG. 11, in a case where both directions of the x-direction and y-direction defocus amounts are the infinite distance direction, that is, also at the time E in FIG. 18, the determination in S1105 is performed. At the time E, the absolute value of the x-direction defocus amount is smaller than the absolute value of the y-direction defocus amount, and therefore the x-direction defocus amount 1801 is decided to be used as the stable defocus amount 1804 in S1106. At the time E, the x-direction defocus amount 1801 has the smallest absolute values in the defocus amounts 1801 to 1803 and is a defocus amount with which AF is not likely to become unstable near the in-focus state.

In a case where the directions of the x-direction defocus amount and the y-direction defocus amount are the same direction as at the times C and E, the defocus amount having the smallest absolute value is decided to be used as the stable defocus amount so that AF is less unstable.

In a case where the direction of the x-direction defocus amount is the closest distance direction in S1103 in FIG. 11 and the direction of the y-direction defocus amount is the infinite distance direction in S1104 in FIG. 11, that is, at the times B and F in FIG. 18, it is determined in S1110 whether or not the absolute value of the weighted average 1803 of the x-direction and y-direction defocus amounts is smaller than the absolute values of the x-direction and y-direction defocus amounts 1801 and 1802. At the times B and F, the absolute value of the weighted average 1803 is smaller than the absolute values of the x-direction and y-direction defocus amounts 1801 and 1802 and it is decided in S1111 to use the weighted average 1803 as the stable defocus amount 1804.

In a case where the x-direction defocus amount is in the infinite distance direction in S1103 in FIG. 11 and the y-direction defocus amount is in the closest distance direction in S1109 in FIG. 11, that is, also at the times A and D in FIG. 18, the determination in S1110 is performed as in the times B and F. At the time D, the absolute value of the weighted average 1803 is smaller than the absolute values of the x-direction and y-direction defocus amounts 1801 and 1802 as at the times B and F, and therefore the weighted average 1803 is decided to be used as the stable defocus amount 1804 in S1111. At the times B, D, and F, the weighted average 1803 has the smallest absolute value in the defocus amounts 1801 to 1803 and is a defocus amount with which AF is not likely to become unstable near the in-focus state.

On the other hand, at the time A, the absolute value of the y-direction defocus amount 1802 is smaller than the absolute value of the weighted average 1803, and therefore the determination in S1105 is performed. At the time A, the absolute value of the y-direction defocus amount is smaller than the absolute value of the x-direction defocus amount, and therefore the y-direction defocus amount 1802 is decided to be used as the stable defocus amount 1804 in S1107. At the time A, the y-direction defocus amount 1802 has the smallest absolute value in the defocus amounts 1801 to 1803 and is a defocus amount with which AF is not likely to become unstable near the in-focus state.

In a case where the directions of the x-direction defocus amount and the y-direction defocus amount are opposite to each other as in the times A, B, D, and F, not only the x-direction and y-direction defocus amounts but also their weighted average is set to be candidates for the stable defocus amount. By deciding on the defocus amount having the smallest absolute value in these defocus amounts for the stable defocus amount, the AF can be less unstable.

In a case where it is determined in S1101, S1102, and S1108 in FIG. 11 that the reliability of the x-direction or y-direction defocus amount is not equal to or higher than the predetermined level, the following process is performed. If the reliability of one of the x-direction and y-direction defocus amounts is equal to or higher than the predetermined level, the defocus amount whose reliability is equal to or higher than the predetermined level is used as the stable defocus amount in S1106 or S1107. If the reliability of neither the x-direction nor y-direction defocus amount is equal to or higher than the predetermined level, after the determination in S1105, a defocus amount with the smaller absolute value of the x-direction and y-direction defocus amounts is used as the stable defocus amount.

By deciding the stable defocus amount in the used stable defocus amount decision process in FIG. 11, good AF with reduced instability can be performed even when the signal amounts of the A- to D-image signals are low as illustrated in FIG. 17. However, such a stable defocus amount deciding method also has an adverse effect. For example, in a case where an object is to be quickly focused on by AF from a state where the object is greatly blurred, if a defocus amount with a small absolute value is decided to be used as the stable defocus amount in the processes in S1105 to S1107 in FIG. 11, it may take time to focus on the object. Therefore, in the processes in S1004 and S1005 in FIG. 10, if the absolute value of the x-direction or y-direction defocus amount is not smaller than the predetermined value, that is, if the object is greatly blurred, it is decided in S1008 not to use the stable defocus amount.

Further, in a case where an AF instruction is given by the user, focusing is to be completed as soon as possible, and therefore a process that may require a long time for focusing is not to be used. Therefore, if the state is not the AF execution with no AF instruction state in S1001 in FIG. 10, it is decided in S1008 not to use the stable defocus amount.

In a state that is not the state where the object is darkened by backlight as illustrated in FIG. 17 or in a state where the setting to reduce the signal amount such as Log imaging is not enabled, there is no need to decide the stable defocus amount. In such cases, if AF is performed using a defocus amount with a small absolute value as the stable defocus amount, when, for example, AF is to track an object a distance to which changes, the tracking may be delayed. Therefore, if the imaging environment is not dark and the setting to reduce the signal amount is not enabled in S1002 and S1003 in FIG. 10, it is decided in S1008 not to use the stable defocus amount.

In S1110 and S1111 in FIG. 11, the weighted average of the x-direction and y-direction defocus amounts is decided to be used as the stable defocus amount. However, there is a case where the detection accuracy is low of a phase difference based on which one of the x-direction and y-direction defocus amounts is acquired, and in such a case, the reliability of the weighted average is low and AF using the weighted average may increase blur. Therefore, if the difference between the x-direction and y-direction defocus amounts is large (is not smaller than the predetermined value) in S1006 in FIG. 10, it is decided in S1008 not to use the stable defocus amount.

Figure 12:
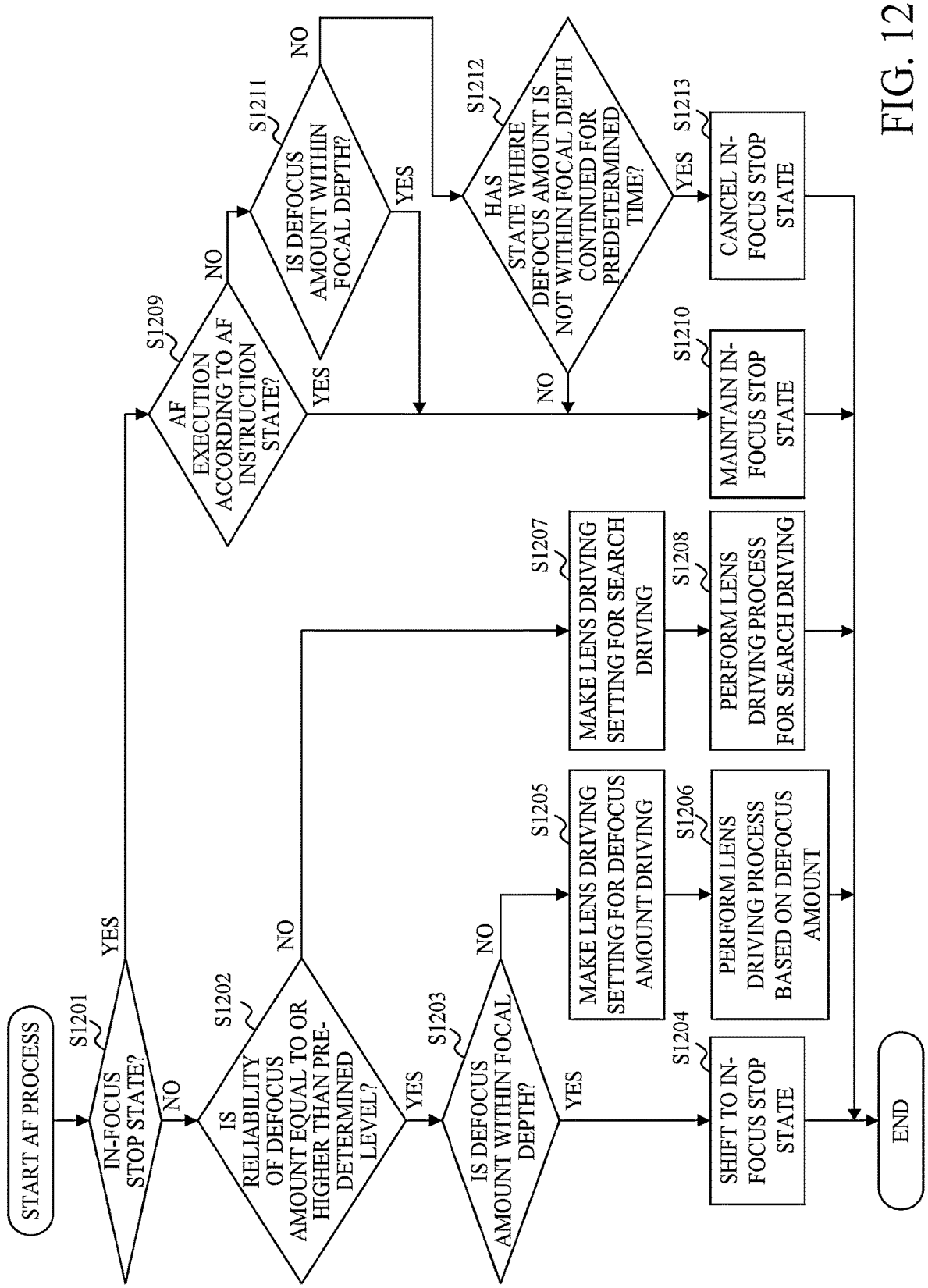
FIG. 12 is a flowchart illustrating an AF process according to the first to seventh embodiments.

A flowchart in FIG. 12 illustrates the AF process performed by the camera MPU 125 in S708 in FIG. 7B. In the AF process, AF is performed using the defocus amount decided to be used in the used defocus amount decision process in FIGS. 9A and 9B.

In S1201, the camera MPU 125 determines by AF whether or not the state is the in-focus stop state. If the state is not the in-focus stop state, the process proceeds to S1202, and if the state is the in-focus stop state, the process proceeds to step S1209.

In S1202, the camera MPU 125 determines whether or not the reliability of the defocus amount is equal to or higher than a predetermined level. If the reliability is equal to or higher than the predetermined level, the process proceeds to S1203, and if the reliability is not equal to or higher than the predetermined level, the process proceeds to S1207. The predetermined level as a threshold of the reliability in S1202 may be set to a lowest level of reliability at which not only the calculated defocus amount but also the direction of the defocus amount is reliable. The reliability of the defocus amount may be acquired by using both the two-image matching level and the steepness of the image shift amount, or may be acquired by using only one of them. Another index such as signal amount may also be used.

In S1203, the camera MPU 125 determines whether or not the defocus amount is within a focal depth. If the defocus amount is within the focal depth, the process proceeds to S1204, and if the defocus amount is not within the focal depth, the process proceeds to S1205.

In S1204, the camera MPU 125 determines that the state is the in-focus state in which the defocus amount is within the focal depth, and shifts to the in-focus stop state. Then, the camera MPU 125 ends the AF process.

In S1205, the camera MPU 125 determines that the in-focus state has not yet been acquired and makes a lens driving setting for driving the focus lens 104 based on the defocus amount. Then, the process proceeds to S1206.

In S1206, the camera MPU 125 transmits a driving instruction for the focus lens 104 to the lens MPU 117 based on the defocus amount and information on the lens driving setting made in S1205. As a result, the focus lens 104 is driven via the lens MPU 117, that is, AF is executed. Thereafter, the camera MPU 125 ends the AF process.

The defocus amount determined to have low reliability in S1202 is not to be used in AF. Therefore, in S1207, the camera MPU 125 performs search driving to calculate the defocus amount while moving the focus lens 104 toward its movable end in order to detect a position of the focus lens 104 at which the defocus amount with high reliability is acquired. The camera MPU 125 first makes a lens driving setting for search driving. The lens driving setting for search driving is a setting of a driving speed, a driving start direction, or the like of the focus lens 104.

In S1208, the camera MPU 125 transmits a driving instruction for the focus lens 104 to the lens MPU 117 based on the lens driving setting for search driving set in S1207. As a result, search driving of the focus lens 104 is executed via the lens MPU 117. Thereafter, the camera MPU 125 ends the AF process.

In step S1209, the camera MPU 125 first determines whether or not the state is the AF execution according to the AF instruction state so as to decide whether or not to maintain the in-focus stop state depending on whether the AF instruction is input. If the state is the AF execution according to the AF instruction state, the process proceeds to S1210, and if the state is not the AF execution according to the AF instruction state, that is, the state is the AF execution state during motion imaging or before the start of the AF instruction, the process proceeds to S1211.

At S1210, the camera MPU 125 maintains the in-focus stop state and ends the AF process.

In S1211, the camera MPU 125 determines whether or not the defocus amount is within the focal depth. If the defocus amount is within the focal depth, the process proceeds to S1210 and the in-focus stop state is maintained, and if the defocus amount is not within the focal depth, the process proceeds to S1212.

In S1212, the camera MPU 125 determines whether or not the state where the defocus amount is not within the focal depth has continued for a predetermined time. If it is determined to be "YES", the process proceeds to S1213, and if it is determined to be "NO", the process proceeds to S1210.

During AF in motion imaging or before the start of AF instruction, if the state where the defocus amount is not within the focal depth has continued for the predetermined time in S1211 and S1212 after the in-focus state is once acquired by AF, AF is to follow the increased defocus amount. Therefore, the camera MPU 125 cancels the in-focus stop state in S1213 and ends the AF process.

As described above, in this embodiment, at least one defocus amount to be used is decided (selected) from the x-direction and y-direction defocus amounts based on the irradiation state and the color of the auxiliary light. From pixels with colors different from the color of the auxiliary light, a sufficient image signal is not acquired in the irradiation state of the auxiliary light, and the phase difference cannot be detected with high accuracy. Therefore, by not using the defocus amount acquired by using the pixels with the colors different from the color of the auxiliary light, unstable AF can be avoided. In addition, in a case where the object detector 130 detects a cage or the horizon, highly accurate phase difference is not acquired in one direction of the x direction and the y direction in which the change in the contrast is small, and hence the use of the defocus amount in the one direction is limited. This can avoid unstable AF.

In a state where defocus amount greatly varies, such as an imaging environment where the light amount received from the object (that is, the signal amount from the pixels) is small and a state where in the camera body 120, the setting to reduce the signal amount is enabled, AF is performed using the stable defocus amount. Specifically, if the directions of the x-direction and y-direction defocus amounts are the same, the defocus amount with the smaller absolute value is used as the stable defocus amount. If the directions of the x-direction and y-direction defocus amounts are different, one with the smallest absolute value in the x-direction and y-direction defocus amounts and their weighted average is used as the stable defocus amount. Thereby, the stability of AF can be improved.

Figure 33:
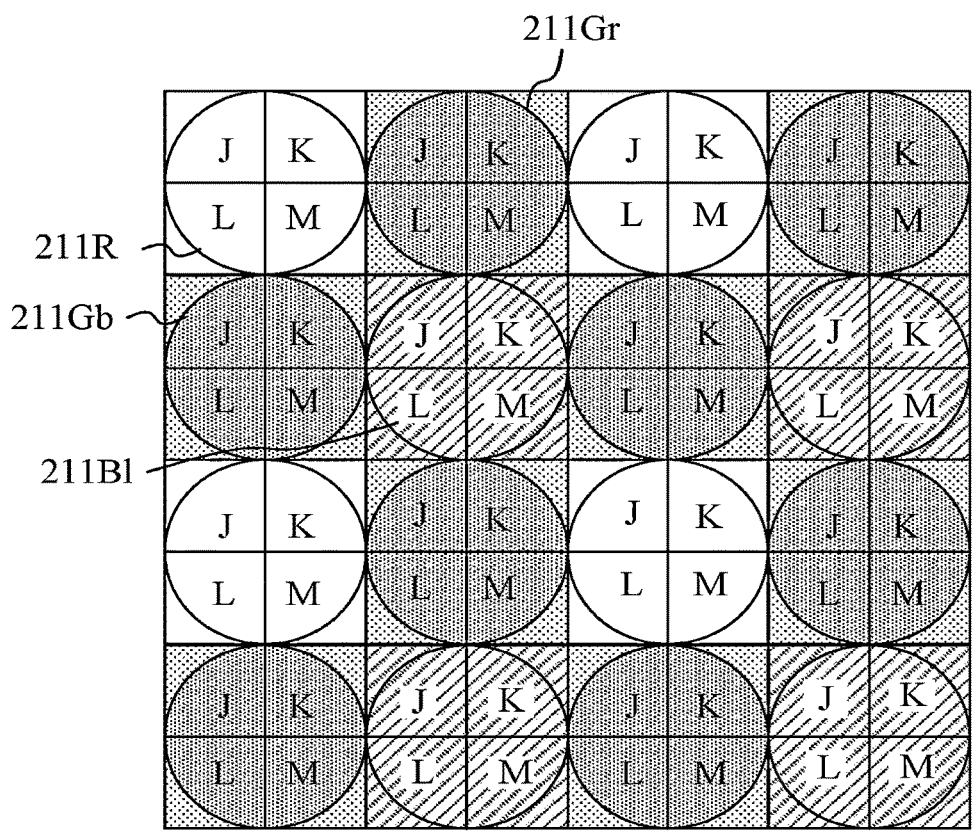
FIG. 33 is a diagram illustrating an image sensor according to a modification example.

Although the image sensor 122 in this embodiment is configured to include the pixels 211R, 211Gr, and 211Bl each including the two photoelectric converters divided in the x direction and the pixels 211Gb each including the two photoelectric converters divided in the y direction, other configurations may be used. For example, as illustrated in FIG. 33, pixels 211R, 211Gr, 211Gb, and 211Bl each including four photoelectric converters corresponding to one microlens and divided in the vertical and horizontal directions may be used for focus detection. By dividing the photoelectric converter under one microlens into four, photoelectric converters 211J, 211K, 211L, and 211M can receive light from four divided exit pupil areas, respectively. Focus detection can be performed by using signals from the four photoelectric converters that receive light from the different exit pupil areas. Here, an image signal generated from signals acquired from the photoelectric converters 211J in dividing pixels that perform pupil division on light from the lens unit 100 is referred to as a J-image signal. An image signal generated from signals acquired from the photoelectric converters 211K in dividing pixels that perform pupil division is referred to as a K-image signal. Similarly, image signals generated from signals acquired from the photoelectric converters 211L and 211M are referred to as an L-image signal and an M-image signal. Further, an image signal generated from a signal acquired by adding the signals from the photoelectric converters 211J and 211L for each unit pixel is referred to as a J+L-image signal, and an image signal generated from a signal acquired by adding the signals from the photoelectric converters 211K and 211M for each unit pixel is referred to as a K+M-image signal.

Then, focus detection is performed using the J+L-image signals and the K+M-image signals. In the focus detection, the J+L-image signals and the K+M-image signals are combined in the row direction to generate a J+L-image signal and a K+M-image signal as output of a unit pixel group of the same color, they are converted into data, and shifts between their corresponding points are acquired by performing correlation calculation. Here, correlation calculation in the horizontal direction is performed using the J+L-image signal and the K+M-image signal to detect an image shift amount in the horizontal direction. Also, correlation calculation on the J+K-image signal and the M+L-image signal is performed to detect an image shift amount in the vertical direction. Thereby, the x-direction and y-direction defocus amounts can be acquired. From these, at least one defocus amount to be used is decided (selected) from the x-direction and y-direction defocus amounts based on an irradiation state and color of the auxiliary light as described above.

Second Embodiment

Next, a description is given of the second embodiment of the present disclosure. In this embodiment, a description is omitted of the same configurations and processes as those in the first embodiment. In this embodiment, a description is given of a case where the imaging apparatus (camera body) includes the focus detection auxiliary light source 131 illustrated in FIG. 1, but the imaging apparatus may not include the focus detection auxiliary light source 131.

In this embodiment, in the image sensor 122 having the pixel array illustrated in FIG. 2A, the photoelectric converters 211D illustrated in FIG. 2C are configured to output D-image signals of red, blue, and green, respectively. Thereby, the camera MPU 125 can acquire information on the image signal of each color.

Figure 19A:
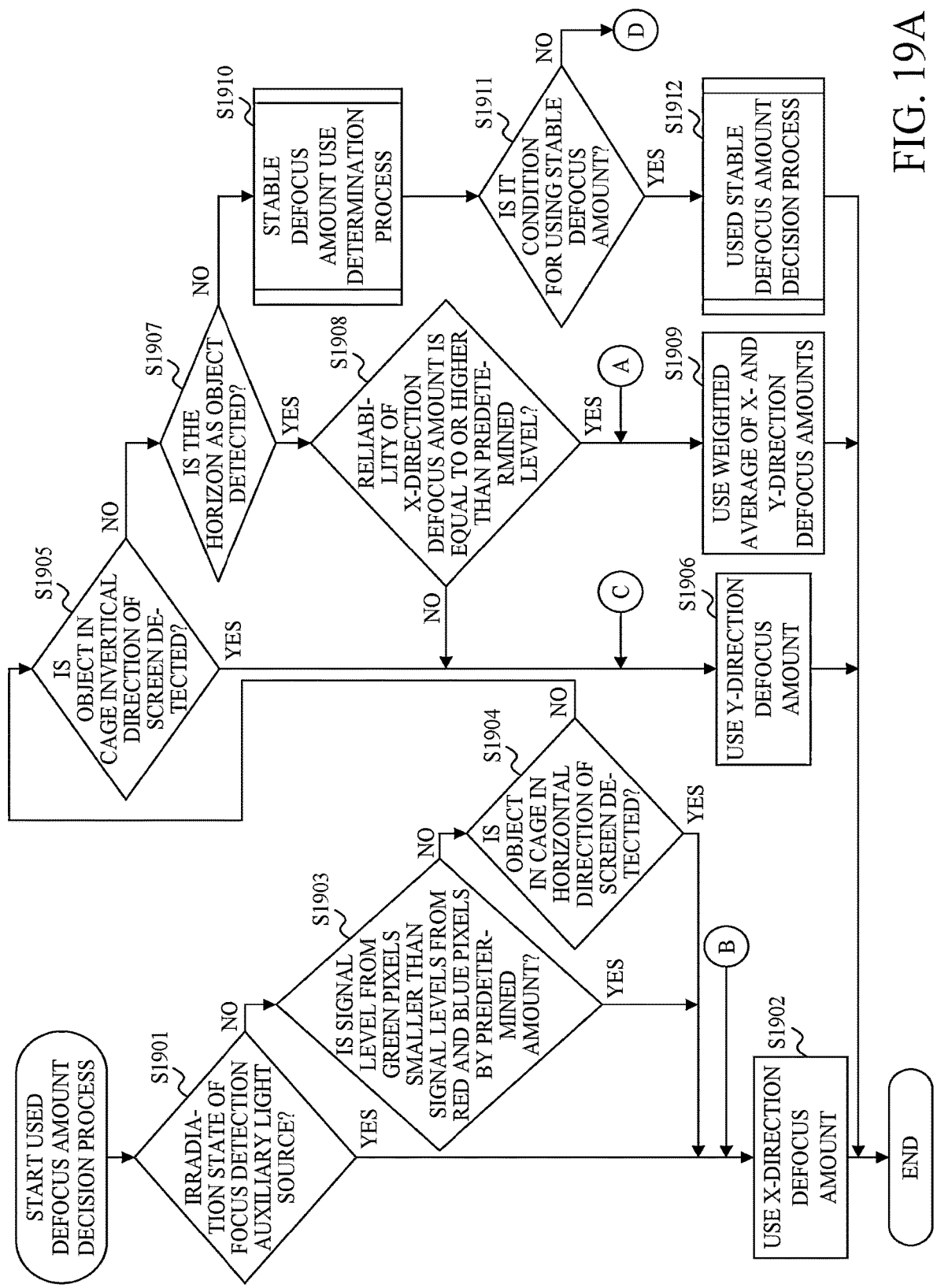
FIGS. 19A and 19B are flowcharts illustrating the used defocus amount decision process according to the second embodiment.
Figure 19B:
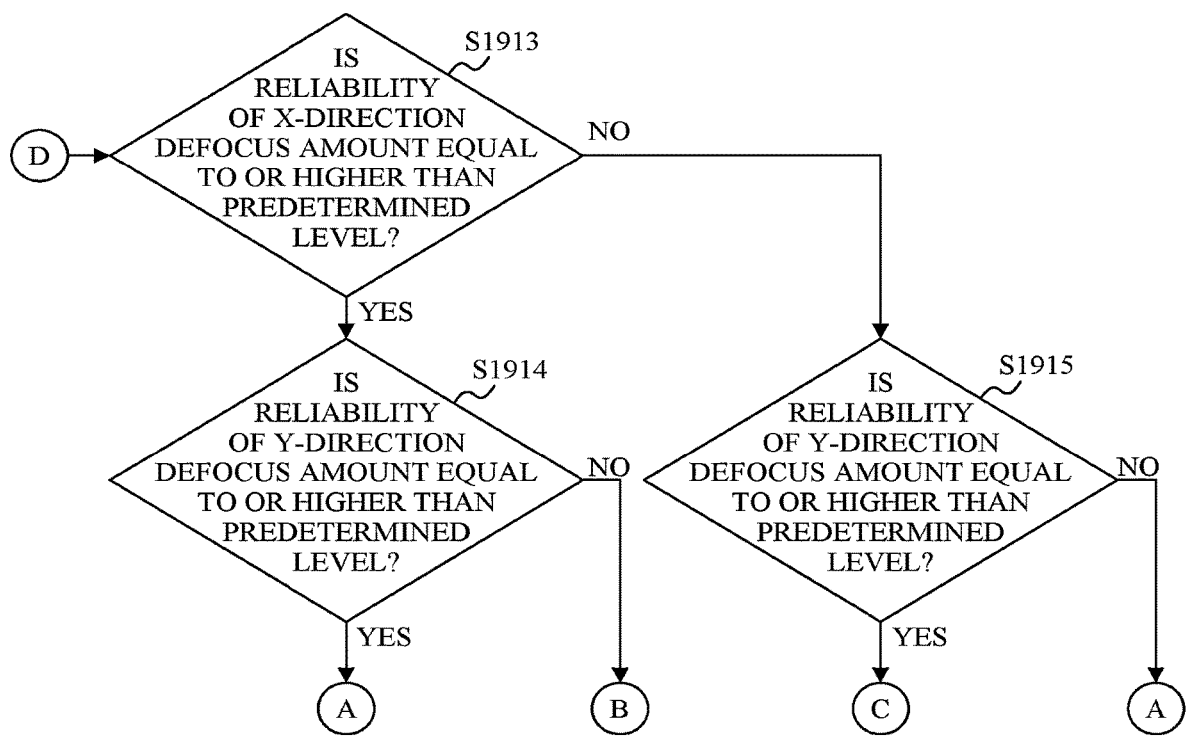

In this embodiment, a process illustrated in flowcharts in FIGS. 19A and 19B is performed as the used defocus amount decision process in S706 in FIG. 7B. The processes in S1901, S1902, and S1904 to S1915 in FIGS. 19A and 19B are the same as the processes in S901, S902, and S903 to S914 in FIGS. 9A and 9B, and thus a description thereof is omitted.

In S1903, the camera MPU 125 determines whether or not a signal amount acquired from the green pixels is smaller than signal amounts (signal levels) acquired from the red and blue pixels by a predetermined amount or more. If it is determined to be "YES", the process proceeds to S1902, and if it is determined to be "NO", the process proceeds to S1904. The predetermined amount as a threshold may be set to an amount such that whether or not the signal amount from the green pixels is extremely small as compared with the signal amounts from the red and blue pixels can be determined.

In the first embodiment, a description is given that as illustrated in FIG. 13, when the object is irradiated with the red auxiliary light, the signal amount from the green pixels is small and the phase difference cannot be detected with high accuracy with the signals from the green pixels. However, factors other than the auxiliary light, such as a color of a light source in the imaging environment and a color of the object itself, may reduce a signal amount of a specific color, making it difficult to accurately detect the phase difference.

Therefore, in this embodiment, by comparing the signal amounts respectively output from the red, blue, and green pixels in S1903 in FIG. 19, it is determined whether or not the imaging environment or the object is such that the signal amount from the green pixels is smaller than the signal amount from the red and blue pixels. As illustrated in FIG. 2C, the phase difference in the y direction is detected by the G pixels, but in a case where the signal amount from the green pixels is smaller than the signal amounts from the red and blue pixels, since the phase difference in the y direction has low detection accuracy, the x-direction defocus amount is used in S1902.

In this embodiment, a description is given of the process in a case where the image sensor 122 including the pixel array illustrated in FIG. 2A is used, but the image sensor may include other pixel arrays. For example, in a case where an image sensor including a pixel array illustrated in FIG. 14A is used, if the signal amount from the red pixels 212R is smaller than the signal amounts from the green and blue pixels 212Gr, 212Gb, and 212Bl, the x-direction defocus amount is used. If the signal amounts from the green and blue pixels 212Gr, 212Gb, and 212Bl are smaller than the signal amount from the red pixels 212R, the y-direction defocus amount is used. In a case where an image sensor including a pixel array illustrated in FIG. 14B is used, if the signal amount from the blue pixels 213Bl is smaller than the signal amounts from the green and red pixels 213Gr, 213Gb, and 213R, the x-direction defocus amount is used. If the signal amounts from the green and red pixels 213Gr, 213Gb, and 213R are smaller than the signal amount from the blue pixels 213Bl, the y-direction defocus amount is used. In a case where an image sensor including a pixel array illustrated in FIG. 14C is used, if the signal amount from the red pixels 214R is smaller than the signal amounts from the green and blue pixels 214Gb and 214Bl, the y-direction defocus amount is used. If the signal amounts from the green and blue pixels 214Gb and 214Bl are smaller than the signal amount from the red pixels 214R, the x-direction defocus amount is used.

In this embodiment, depending on the irradiation state of the auxiliary light and the signal amounts respectively output from the red, blue, and green pixels in S1901 and S1903 in FIG. 19A, the process proceeds to S1902 and the x-direction defocus amount is used, or the process proceeds to S1906 and the y-direction defocus amount is used. Alternatively, there is a case such that the weighted average of the x-direction and y-direction defocus amounts is used in S1909. In the weighted addition in S1909, the weight may be changed depending on the signal amounts respectively output from the red, blue, and green pixels. In this case, the weight may be decided depending on the maximum signal amount in the signal amounts from the red, blue, and green pixels or the sum of the signal amounts from the red, blue and green pixels, or another weight deciding method may be used.

Alternatively, the imaging surface phase difference focus detector 129 in FIG. 1 may calculate the defocus amounts respectively acquired from the red, blue, and green pixels, and then calculate the x-direction and y-direction defocus amounts. In this case, the weight for averaging the defocus amounts respectively acquired from the red, blue, and green pixels may be decided depending on the signal amounts from the red, blue, and green pixels. For example, a ratio of the maximum value in the signals from the red, blue and green pixels may be used as the weighting ratio of the defocus amounts acquired from the red, blue and green pixels when the x-direction and y-direction defocus amounts are calculated, or another weight deciding methods may be used.

Third Embodiment

Next, a description is given of the third embodiment of the present disclosure. In this embodiment, a description of the same configurations and processes as those in the first embodiment are omitted. In this embodiment, the focus detection auxiliary light source 131 can emit not only red (first color) auxiliary light but also green (second color) auxiliary light. The camera MPU 125 functions as a selecting unit and a switching unit.

Figure 20:
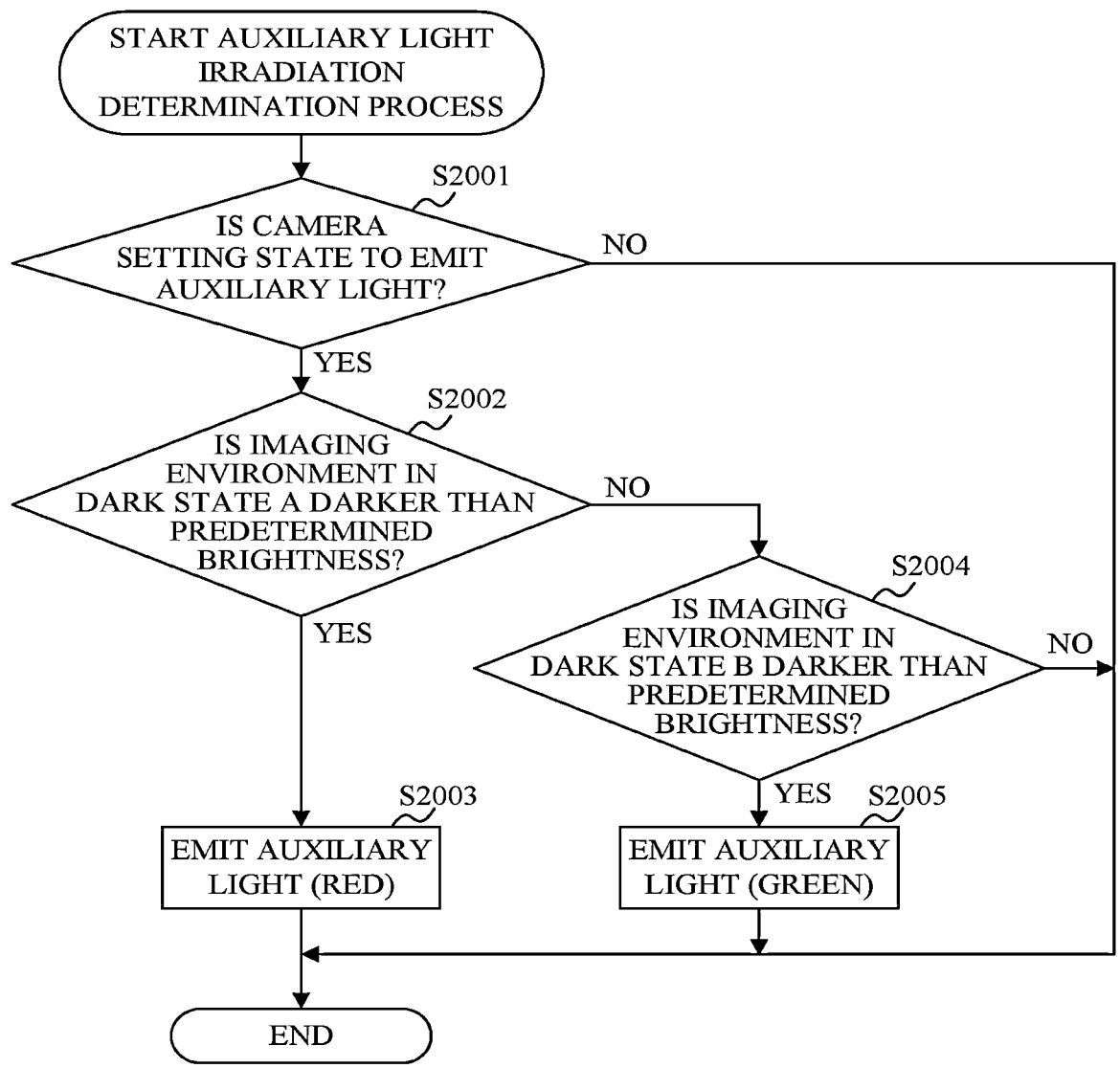
FIG. 20 is a flowchart illustrating the auxiliary light irradiation determination process according to the third embodiment.

In this embodiment, a process illustrated in a flowchart in FIG. 20 is performed as the auxiliary light irradiation determination process in S719 in FIG. 7A. Processes in S2001 and S2003 in FIG. 20 are the same as the processes in S801 and S803 in FIG. 8, and thus a description thereof is omitted.

In S2002 in FIG. 20, based on the luminance information acquired from the luminance determination image data generated by the image processing circuit 124, the camera MPU 125 determines whether or not the brightness of the imaging environment is in a dark state A darker than first predetermined brightness. A determination criterion for whether or not the state is the dark state A may include not only whether or not it is difficult to perform AF unless the auxiliary light is emitted, but also whether or not sufficient accuracy can be acquired as the detection accuracy of the phase difference in the y direction in the image sensor 122 including the pixel array illustrated in FIG. 2A. If the camera MPU 125 determines that the state is the dark state A, the process proceeds to S2003, and if the camera MPU 125 does not determine that the state is not the dark state A, the process proceeds to S2004.

In the image sensor 122 including the pixel array illustrated in FIG. 2A, the pixels 211R, 211Gr, and 211Bl for detecting the phase difference in the x direction are arranged pixel by pixel. On the other hand, the pixels 211Gr for detecting the phase difference in the y direction are arranged every two pixels and is smaller in number than the pixels for detecting the phase difference in the x direction. Therefore, a conversion coefficient multiplied by the phase difference in the calculation for the y-direction defocus amount is larger than a conversion coefficient used in the calculation for the x-direction defocus amount, and the accuracy of the y-direction defocus amount is lower than the accuracy of the x-direction defocus amount. In addition, signal noise included in the paired image signals acquired from the pixels 211Gr, which is smaller in number than the pixels 211R, 211Gr, and 211Bl, is likely to be larger, and as a result, the accuracy of the y-direction defocus amount decreases. Based on these characteristics, the determination criterion for the dark state A in S2002 also includes whether or not sufficient detection accuracy can be acquired in the detection of the phase difference in the y direction. That is, if the detection accuracy of the phase difference in the y direction is insufficient, the process proceeds to S2003, and if the accuracy of the phase difference in the y direction is sufficient, the process proceeds to S2004.

In S2003, the camera MPU 125 causes the focus detection auxiliary light source 131 to irradiate the object with red auxiliary light, as in S803 in FIG. 8. Then, the camera MPU 125 ends the auxiliary light irradiation determination process.

In S2004, based on the luminance information acquired from the luminance determination image data, the camera MPU 125 determines whether or not the brightness of the imaging environment is a dark state B darker than second predetermined brightness. A determination criterion for whether or not the state is the dark state B may include whether or not AF is difficult unless the auxiliary light is emitted. Since the detection accuracy of the phase difference in the y direction has already been determined in the process of S2002, the detection accuracy thereof is not used here as a determination criterion. If the camera MPU 125 determines that the state is the dark state B, the process proceeds to S2005, and if the camera MPU 125 determines that the state is not the dark state B, the auxiliary light irradiation determination process ends.

In S2005, the camera MPU 125 causes the focus detection auxiliary light source 131 to irradiate the object with green auxiliary light. Then, the camera MPU 125 ends the auxiliary light irradiation determination process.

In this way, in this embodiment, as in the first embodiment, if the brightness of the imaging environment is darker than the predetermined brightness, the object is irradiated with the auxiliary light so that AF accuracy is improved. However, depending on whether or not the accuracy of the y-direction defocus amount is sufficient, the color of the focus detection auxiliary light source is changed. In the dark state B where the phase difference (that is, the defocus amount) in the y direction cannot be acquired with sufficient accuracy, the red focus auxiliary light is selected, and in the dark state A where the y-direction defocus amount is acquired with sufficient accuracy, the green auxiliary light is selected.

Figure 21A:
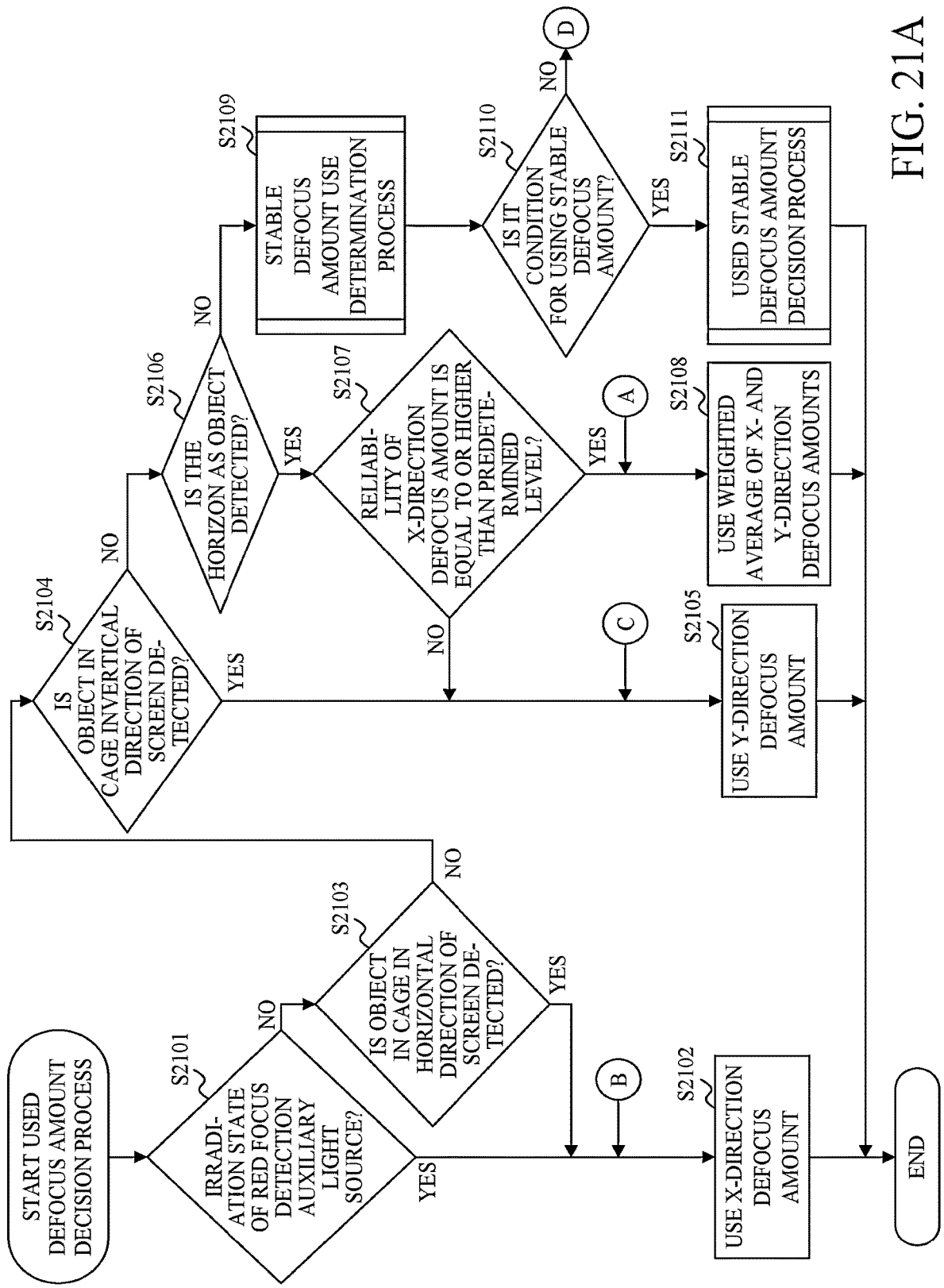
FIGS. 21A and 21B are flowcharts illustrating the used defocus amount decision process according to the third embodiment.
Figure 21B:
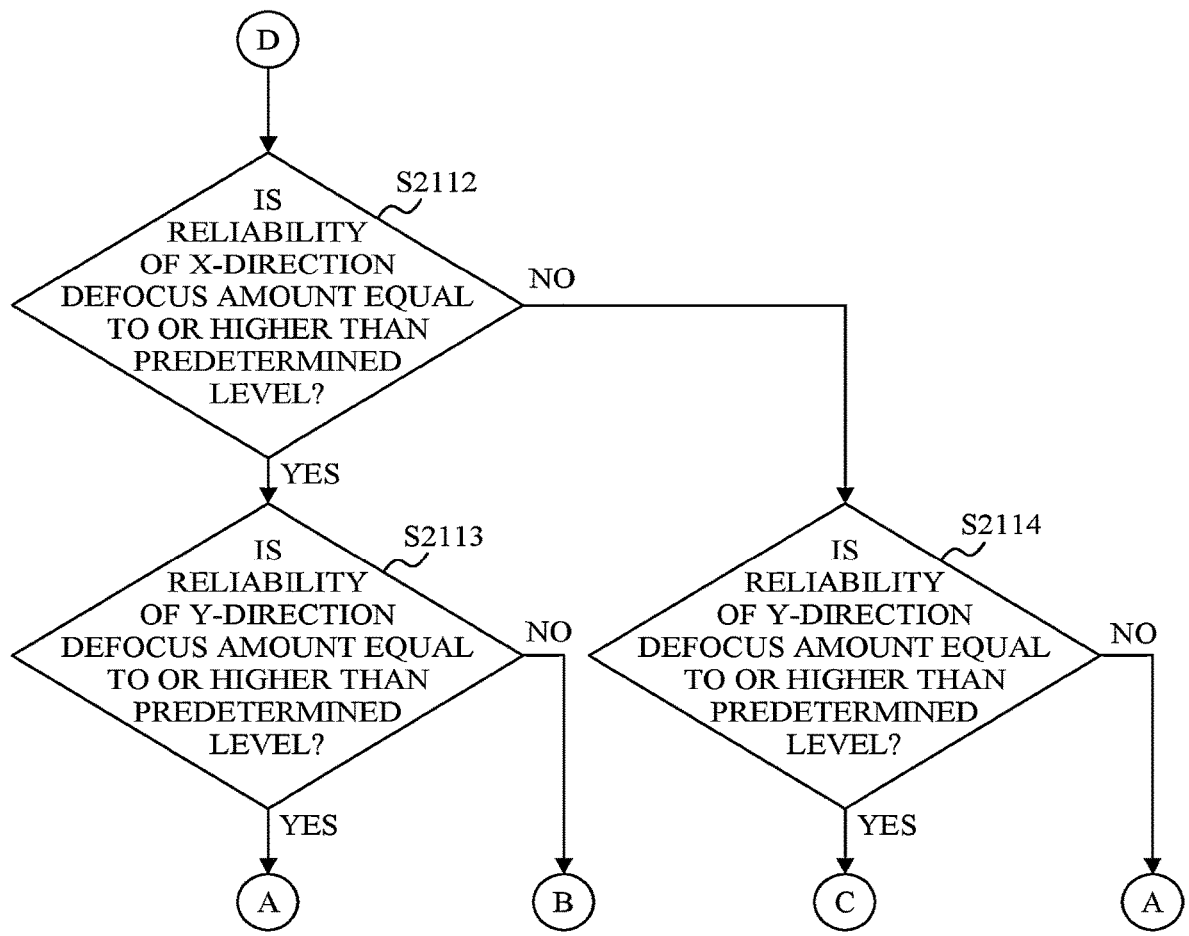

In this embodiment, a process illustrated in flowcharts in FIGS. 21A and 21B is performed as the used defocus amount decision process in S706 in FIG. 7B. Processes in S2102 to S2114 in FIGS. 21A and 21B are the same as the processes in S902 to S914 in FIGS. 9A and 9B, and thus a description thereof is omitted.

In S2101 in FIG. 21A, the camera MPU 125 determines whether or not the state is an irradiation state of the red auxiliary light selected in S2003 in FIG. 20. If the red auxiliary light is emitted, the x-direction defocus amount is selected in S2102. If the green auxiliary light is emitted or the auxiliary light is not emitted, the process proceeds to S2103. In a case where the green auxiliary light is emitted, both the x-direction and y-direction defocus amounts are used. The color of the auxiliary light may be selected based not only on the detection accuracy of the phase difference described above but also on other conditions such as object visibility, but in this embodiment, the detection accuracy of the phase difference is preferentially used.

This embodiment selects the auxiliary light of the same color as the green pixels 212Gr and 212Gb used for detecting both the phase differences in the x direction and the y direction. However, if the detection accuracy of the phase difference in the y direction is insufficient, the auxiliary light color may be selected depending on conditions other than the detection accuracy. For example, in a case where the image sensor includes the pixel array illustrated in FIG. 14A that is a pixel array different from the pixel array illustrated in FIG. 2A, the auxiliary light may be switched between green and red depending on whether or not the phase difference in the y direction is acquired with sufficient detection accuracy. Alternatively, in a case where the image sensor includes the pixel array illustrated in FIG. 14B, the color of the auxiliary light may be switched between green and blue depending on whether or not the phase difference in the y direction is acquired with sufficient detection accuracy.

Fourth Embodiment

Next, a description is given of the fourth embodiment of the present disclosure. In this embodiment, a description is omitted of the same configurations and processes as those in the first embodiment. In this embodiment, the focus detection auxiliary light source 131 can emit not only red (first color) auxiliary light but also blue (second color) auxiliary light.

A description is given of the operation of the imaging surface phase difference focus detector 129 in this embodiment. FIG. 22A illustrates a pixel array in a range of longitudinal (y direction) 6-pixel rows×lateral (x direction) 8-pixel rows on the imaging surface of the image sensor 122 viewed from the lens unit 100 side. Similarly to FIG. 2A, the imaging surface is provided with the Bayer array of the color filters, and the red (R) and green (G) color filters are alternately arranged from left for pixels on odd rows, and green (G) and blue (B) color filters are alternately arranged from left for pixels on even rows.

Similarly to FIG. 2B, a pixel 211R illustrated in FIG. 22B includes, for one on-chip microlens 211i, a pair of photoelectric converters 211A and 211B divided in the x direction. A pixel 211Bl illustrated in FIG. 22C includes, for one on-chip microlens 211i, a pair of photoelectric converters 211C and 211D divided in the y direction.

A pixel 211Gr illustrated in FIG. 22D includes, for one on-chip microlens 211i, a single photoelectric converter 211E. A pixel 211Gb is similarly configured.

Also in this embodiment, photoelectric conversion signals output from each of the paired photoelectric converters in each of the plurality of pixels are used in generating a pair of image signals and parallax image data as image data to be displayed/recorded for 3D image observation. Further, an imaging signal output by adding the paired photoelectric conversion signals from each of a plurality of pixels and an imaging signal output from each pixel including a single photoelectric converter are used in generating luminance determination image data and normal image data to be displayed/recorded. An image sensor may be used that includes a pixel arrangement different from the arrangement illustrated in FIG. 22A, such as the pixel arrangements illustrated in FIGS. 14A to 14C.

Figure 23:
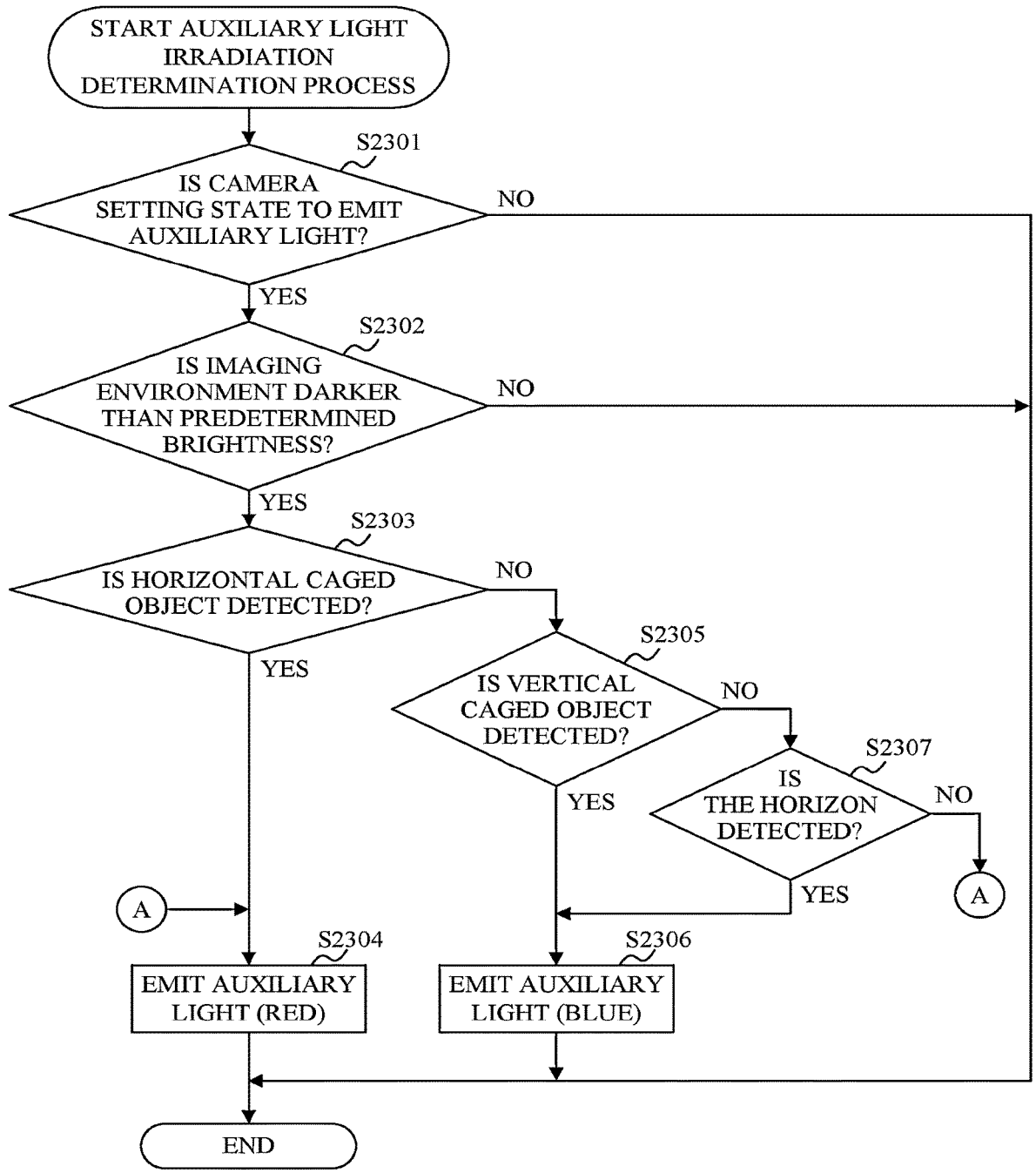
FIG. 23 is a flowchart illustrating the auxiliary light irradiation determination process according to the fourth embodiment.

In this embodiment, a process illustrated in a flowchart in FIG. 23 is performed as the auxiliary light irradiation determination process in S719 in FIG. 7A. Processes in S2301 and S2302 in FIG. 23 are the same as the processes in S801 and S802 in FIG. 8, and thus a description thereof is omitted.

In S2303 in FIG. 23, the camera MPU 125 determines whether or not the object detector 130 detects a horizontal caged object. If the horizontal caged object is detected, the process proceeds to S2304, and if the horizontal caged object is not detected, the process proceeds to S2305.

In S2304, the camera MPU 125 causes the focus detection auxiliary light source 131 to irradiate the object with the red auxiliary light. Then, the camera MPU 125 ends the auxiliary light irradiation determination process.

In S2305, the camera MPU 125 determines whether or not the object detector 130 detects a vertical caged object. If the vertical caged object is detected, the process proceeds to S2306, and if the vertical caged object is not detected, the process proceeds to S2307.

In S2306, the camera MPU 125 causes the focus detection auxiliary light source 131 to irradiate the object with the blue auxiliary light. Then, the camera MPU 125 ends the auxiliary light irradiation determination process.

In S2307, the camera MPU 125 determines whether or not the object detector 130 detects the horizon as an object. If the horizon is detected as the object, the process proceeds to S2306, and if the horizon is not detected as the object, the process proceeds to S2304.

In this embodiment, the auxiliary light color is changed depending on the object detection result by the object detector 130. In a case where the cage 1505 extending in the horizontal direction is detected as illustrated in FIG. 15, the x-direction defocus amount is to be used in AF so that the object 1502 is focused on while erroneous AF is hindered from being caused by the perspective conflict between the cage 1505 and the object 1502 behind the cage 1505. In this embodiment, the pixel 211R detects the x-direction defocus amount, and therefore the object is irradiated with the red auxiliary light in S2304.

On the other hand, in a case where the cage 1504 extending in the vertical direction is detected as illustrated in FIG. 15A, the y-direction defocus amount is to be used in AF so that the object 1502 behind the cage 1504 is focused on. In addition, in a case where the horizon 1602 is detected as illustrated in FIG. 16A, the y-direction defocus amount may be used as the defocus amount in the direction with better AF accuracy. In this embodiment, the y-direction defocus amount is detected in the pixels 211Bl, and therefore the object is irradiated with the blue auxiliary light in S2306.

In a case where the caged object or the horizon is not detected, the object is irradiated with the red auxiliary light in S2304.

Figure 24A:
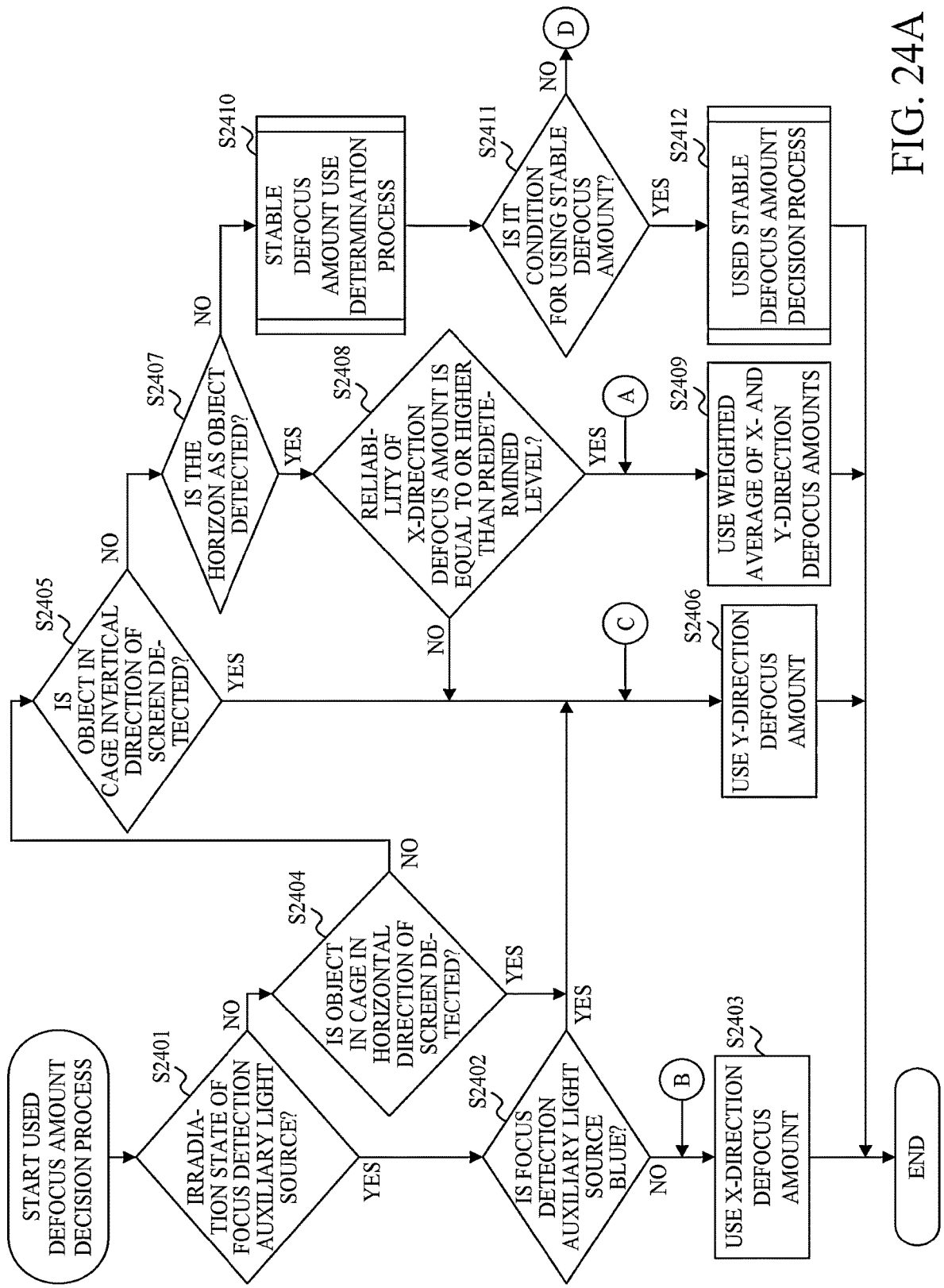
FIGS. 24A and 24B are flowcharts illustrating the used defocus amount decision process according to the fourth embodiment.
Figure 24B:
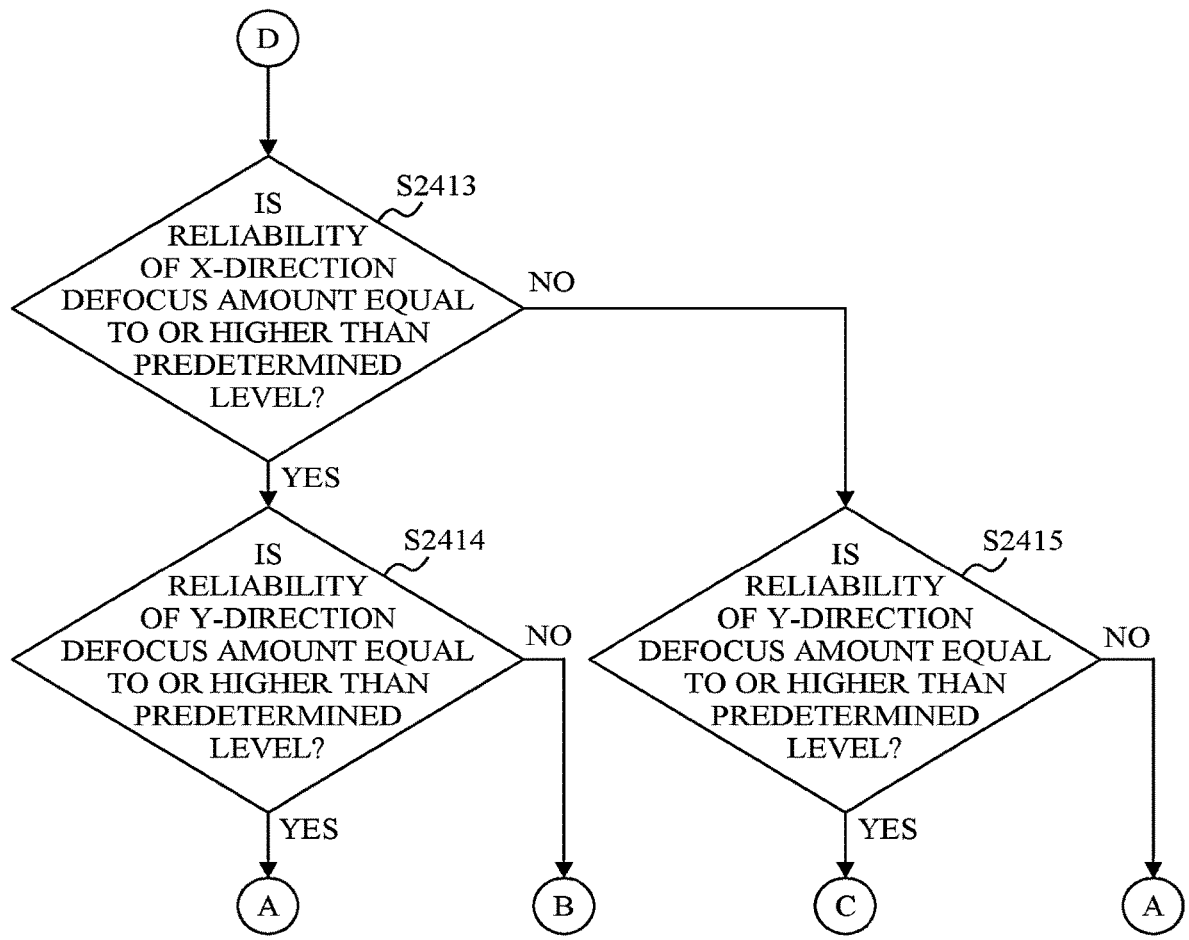

In this embodiment, a process illustrated in flowcharts in FIGS. 24A and 24B is performed as the used defocus amount decision process in S706 in FIG. 7B. Processes in S2401 and S2403 to S2415 in FIGS. 24A and 24B are the same as the processes in S901 and S902 to S914 in FIGS. 9A and 9B, and thus a description thereof is omitted.

In S2402 in FIG. 24A, the camera MPU 125 determines whether or not the blue auxiliary light selected in S2306 in FIG. 23 is emitted. If the blue auxiliary light is emitted, the process proceeds to S2406, and it is decided to use the y-direction defocus amount detected by the pixels 211Bl. If the red auxiliary light selected in S2304 in FIG. 23 is emitted, the process proceeds to S2403, and it is decided to use the x-direction defocus amount detected by the pixels 211R.

In this embodiment, the x-direction and y-direction defocus amount are switched depending on the color of the auxiliary light, but in a case such that the imaging frame 1601 is tilted with respect to the horizon 1602 as illustrated in FIG. 16B, both the x-direction and y-direction defocus amounts can be used. In such a case, a weighted average of the x-direction and y-direction defocus amounts is used in S2409 instead of only one of the x-direction and y-direction defocus amounts. At this time, the object may be simultaneously irradiated with the red and blue auxiliary light.

In this embodiment described above, the AF accuracy can be improved by changing the color of the auxiliary light based on the object detection result.

Fifth Embodiment

Next, a description is given of the fifth embodiment of the present disclosure. In this embodiment, a description is omitted of the same configurations and processes as those in the first embodiment.

Figure 25A:
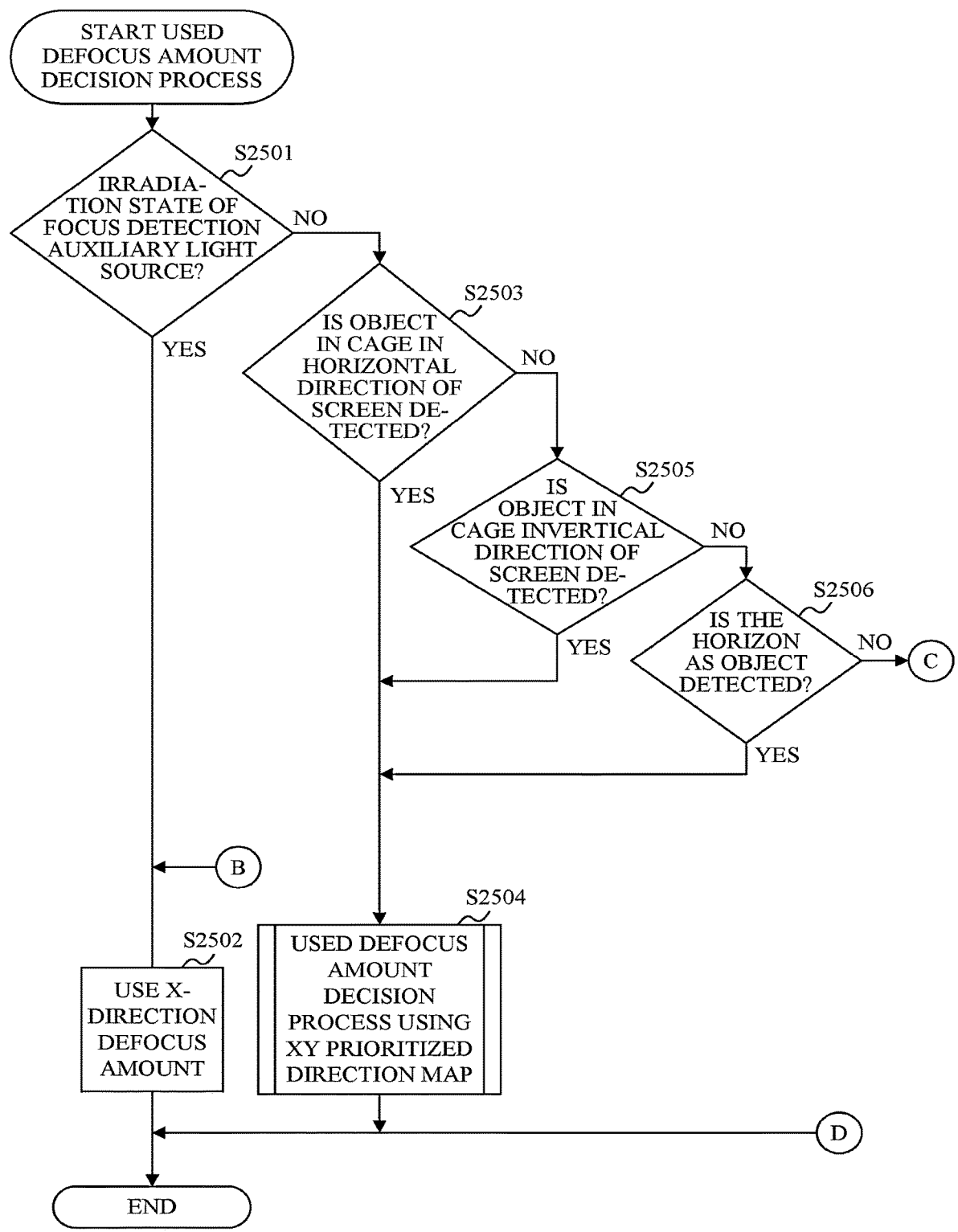
FIGS. 25A and 25B are flowcharts illustrating the used defocus amount decision process according to the fifth embodiment.
Figure 25B:
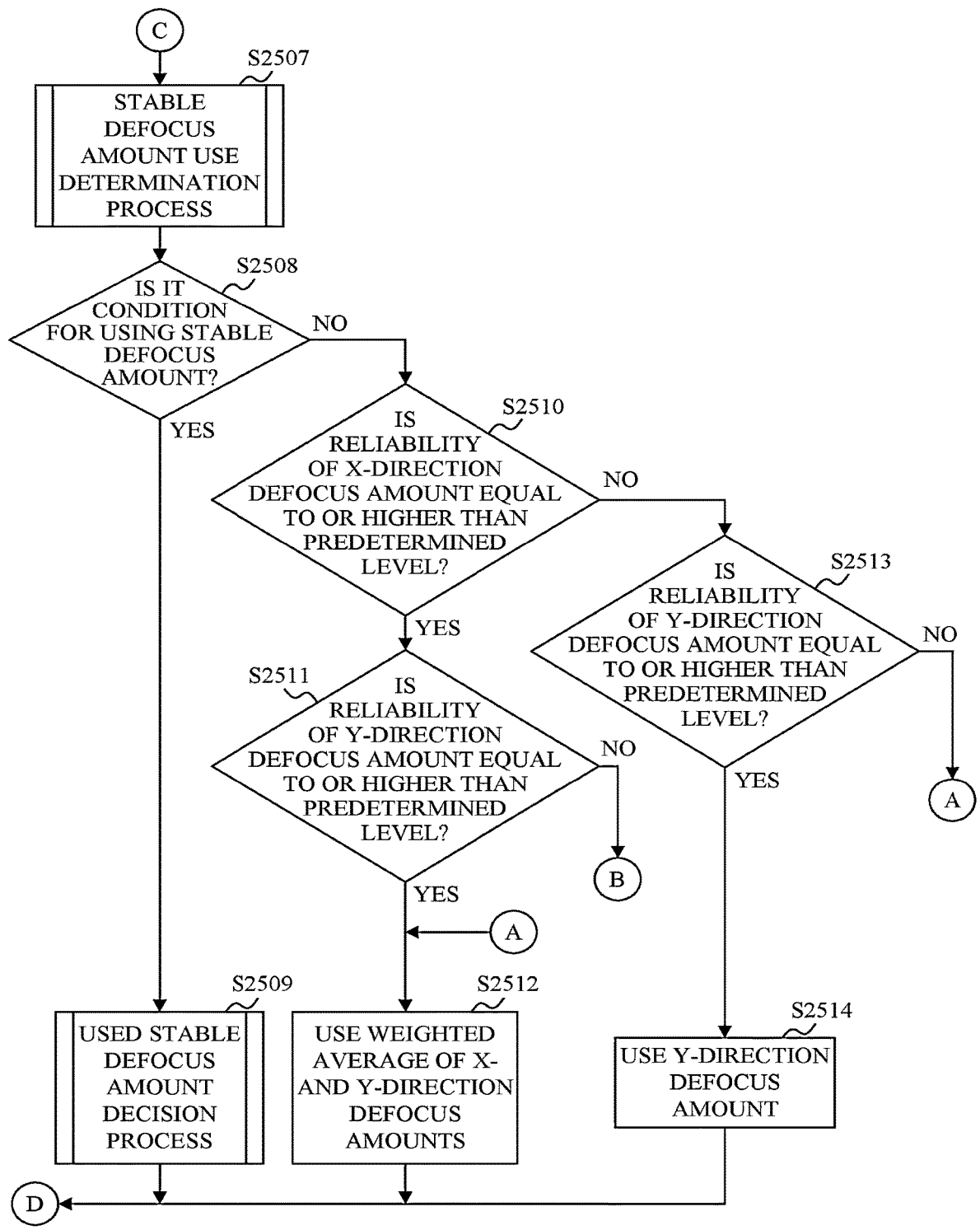

In this embodiment, a process illustrated in flowcharts in FIGS. 25A and 25B is performed as the used defocus amount decision process in S706 in FIG. 7B. Processes in S2501 to S2503 in FIG. 25A is the same as the processes in S901 to S903 in FIG. 9A, and processes in S2505 and S2506 in FIG. 25A are the same as the processes in S904 and S906 in FIG. 9A. Processes in S2507 to S2511 in FIG. 25B are the same as the processes of S909 to S913 in FIGS. 9A and 9B, and processes in S2512, S2513, and S2514 in FIG. 25B are the same as the processes in S908, S914, and S905 in FIGS. 9A and 9B. Therefore, a description of these processes is omitted.

If the object detector 130 detects a horizontal caged object, a vertical caged object, or the horizon in S2503, S2505, or 2506, the camera MPU 125 performs a used defocus amount decision process using an xy prioritized direction map in S2504. The xy prioritized direction map is information representing which of the x-direction and y-direction defocus amounts is to be preferentially used (in other words, which of them is usable) in each of a plurality of areas in the imaging frame. A detailed description thereof is given below.

Figure 26:
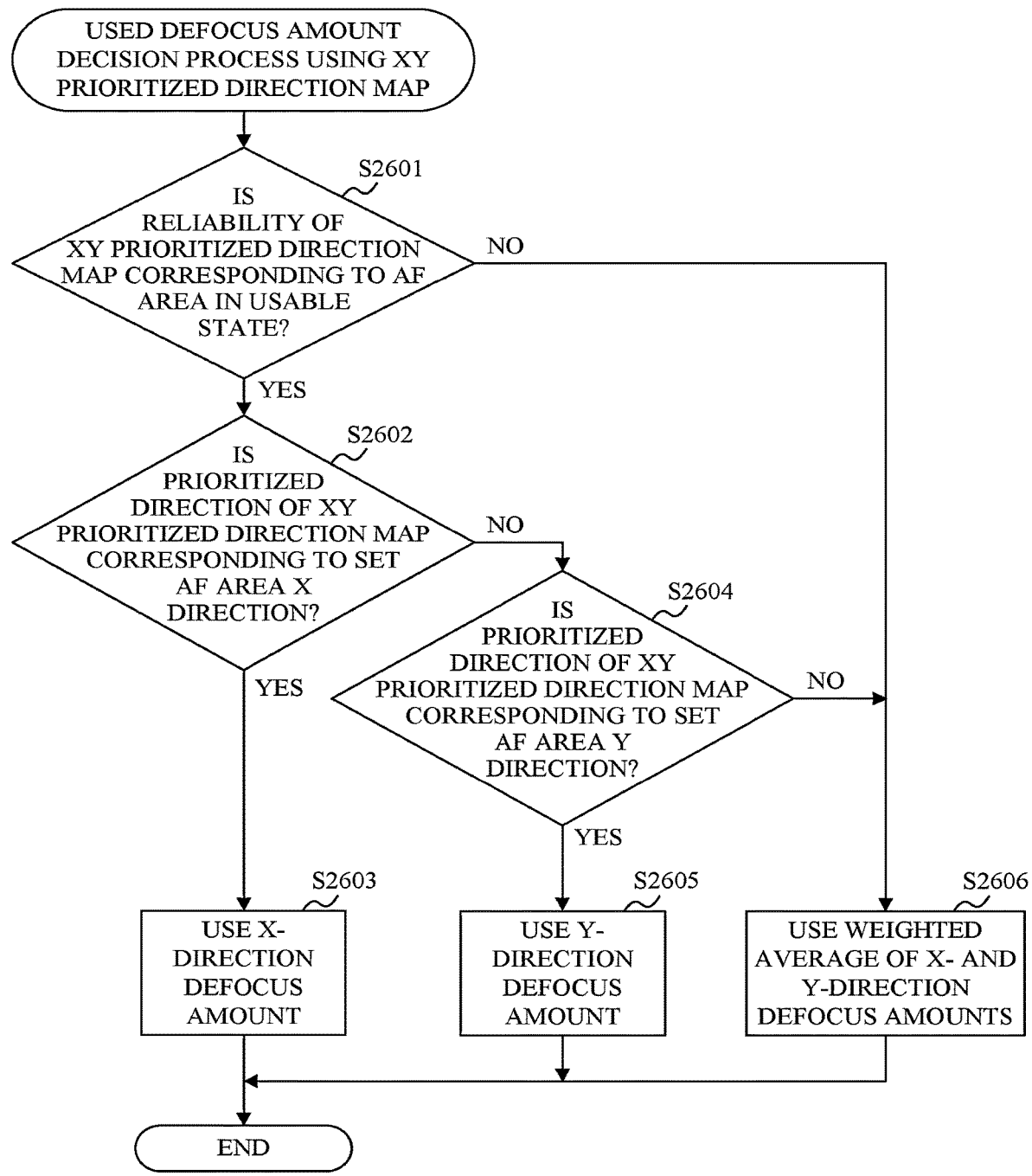
FIG. 26 is a flowchart illustrating a used defocus amount decision process using an xy prioritized direction map according to the fifth embodiment.

A flowchart in FIG. 26 illustrates the used defocus amount decision process using the xy prioritized direction map.

In S2601, the camera MPU 125 determines whether or not reliability of a map area corresponding to a set AF area in the xy prioritized direction map (hereinafter referred to as "AF map area") is in a usable state. If the reliability is in the usable state, the process proceeds to S2602, and if the reliability is not in the usable state, the process proceeds to S2606.

In S2602, the camera MPU 125 determines whether or not a prioritized direction in the AF map area is the x direction. If the prioritized direction is the x direction, the process proceeds to S2603, and if the prioritized direction is not the x direction, the process proceeds to S2604.

In S2603, the camera MPU 125 decides to use the x-direction defocus amount. Then, the camera MPU 125 ends the used defocus amount decision process using the xy prioritized direction map.

In S2604, the camera MPU 125 determines whether or not the prioritized direction in the AF map area is the y direction. If the prioritized direction is the y direction, the process proceeds to S2605, and if the prioritized direction is not the y direction, the process proceeds to S2606. A case where the reliability of the AF map area is in the usable state and the prioritized direction in the AF map area is neither the x direction nor the y direction is a case where both the x direction and the y direction have good reliability, and a detailed description thereof is given below.

In S2605, the camera MPU 125 decides to use the y-direction defocus amount. Then, the camera MPU 125 ends the used defocus amount decision process using the xy prioritized direction map.

In S2606, the camera MPU 125 decides to use the weighted average of the x-direction and y-direction defocus amounts. A weighted addition ratio at this time may be 1:1, or may be decided depending on a contrast level of the A- to D-image signals or the like. The camera MPU 125 ends the used defocus amount decision process using the xy prioritized direction map.

As described above, in this embodiment, if a caged object or the horizon is detected as an object, the xy prioritized direction map is used in deciding the defocus amount used in AF. In the first embodiment, the object detection result is output as the output result of the CNN machine learning, but in this embodiment, the xy prioritized direction map based on the object detection result is output as the output result of CNN machine learning. The xy prioritized direction map is acquired by learning a direction in which an effect of an obstacle becomes smaller in the first and second defocus amounts. The xy prioritized direction map may be acquired by learning reliability of binary or multiclass as to whether or not the first or second defocus amount is usable based on an obstacle effect degree. Alternatively, a predetermined computer such as a server may make the CNN perform machine learning, and the camera body 120 may acquire the trained CNN from the predetermined computer. For example, the predetermined computer performs supervised learning using image data for learning as input and an xy prioritized direction corresponding to the image data for learning as training data, and thereby the CNN learns the xy prioritized direction map.

The xy prioritized direction map includes prioritized direction information representing that, in each of the plurality of areas in the imaging frame, which of the x-direction and y-direction defocus amounts is preferentially used or both the x-direction and y-direction defocus amounts are usable. The xy prioritized direction map also includes low reliability information representing that the reliability of the defocus amount in an area of divided areas is not at a usable level.

Figure 27A:
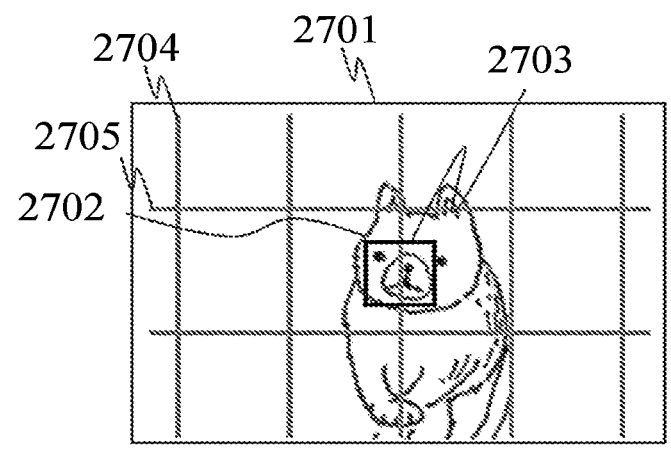
FIGS. 27A to 27D are diagrams illustrating an example of the xy prioritized direction map in a caged object imaging scene.

FIG. 27A illustrates an imaging scene in which an object 2702 is captured behind a vertical cage 2704 extending in the vertical direction and a horizontal cage 2705 extending in the horizontal direction in an imaging frame 2701. An AF area 2703 is set on part (face) of the object 2702. In this imaging scene as well, either the x-direction or y-direction defocus amount is to be selected depending on the direction in which the cages 2704 or 2705 extends so that AF is hindered from erroneously performed due to perspective conflicts between the object 2702 and the cages 2704 and 2705.

Figure 27B:
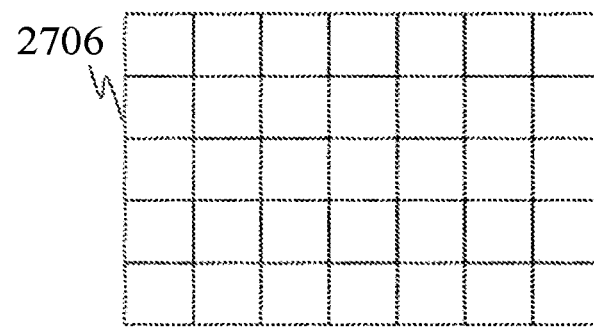
Figure 27C:
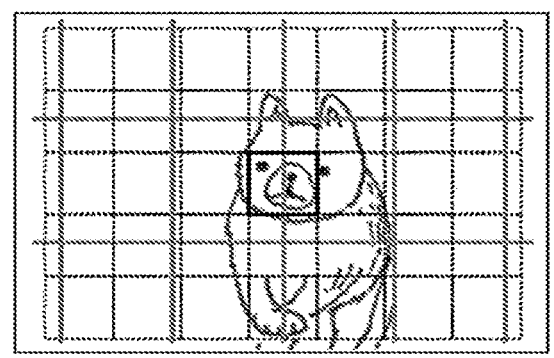
Figure 27D:
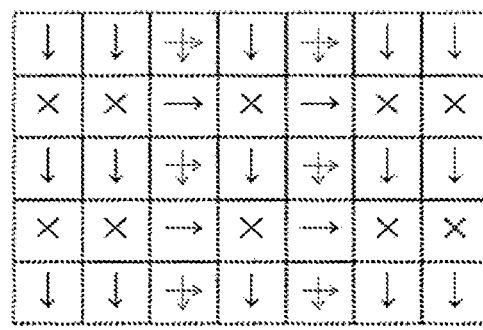

FIG. 27B illustrates an example in which the imaging frame 2701 is divided into 7×5 areas 2706 around the AF area 2703 illustrated in FIG. 27A. The number of the divided areas may be a number other than 7×5. FIG. 27C illustrates a state in which the divided areas 2706 in FIG. 27B are superimposed on the imaging frame 2701 in FIG. 27A. FIG. 27D is an example of the xy prioritized direction map generated for the imaging scene in FIG. 27A and including the prioritized direction information or the low reliability information for each divided area.

→ in FIG. 27D is prioritized direction information representing that the x-direction defocus amount has usable reliability and the x direction is the prioritized direction. Specifically, as can be seen from FIG. 27C, the prioritized direction information → is placed in a divided area that includes the horizontal cage 2705 and causes the perspective conflict in the y direction but does not cause the perspective conflict in the x direction. When the AF area is set in this divided area, it is decided in S2603 to use the x-direction defocus amount through S2602 in FIG. 26.

↓ in FIG. 27D is prioritized direction information representing that the y-direction defocus amount has usable reliability and the y direction is the prioritized direction. Specifically, as can be seen from FIG. 27C, the prioritized direction information ↓ is placed in a divided area that includes the vertical cage 2704 and causes the perspective conflict in the x-direction but does not cause the perspective conflict in the y-direction. When the AF area is set in this divided area, it is decided in S2605 to use the y-direction defocus amount through S2603 and S2604 in FIG. 26.

Crossed arrows of → and ↓ in FIG. 27D are prioritized direction information indicating that both the x-direction and y-direction defocus amounts have usable reliability. Specifically, as can be seen from FIG. 27C, this prioritized direction information is placed in a divided area that does not include any of the vertical and horizontal cages 2704 and 2705. When the AF area is set in this divided area, it is decided in S2606 to use the weighted average of the x-direction and y-direction defocus amounts through S2603 and S2604 in FIG. 26.

Thus, in this embodiment, the defocus amount used in AF is decided depending on the prioritized direction information included in the xy prioritized direction map. Since the prioritized direction information in the divided area corresponding to the AF area 2703 illustrated in FIG. 27A (AF map area) is ↓, the y-direction defocus amount is used.

x in FIG. 27D is low reliability information representing that both the x-direction and y-direction defocus amounts have low reliability and cannot be used. Specifically, as can be seen from FIG. 27C, the low reliability information x is placed in a divided area that includes both the vertical and horizontal cages 2704 and 2705 and causes the perspective conflicts in both the x direction and the y direction. When the AF area is set in this divided area, the reliability is determined to be a non-usable state in S2601 in FIG. 26, and it is decided in S2606 to use the weighted average of the x-direction and y-direction defocus amounts. Since the reliability of the x-direction and y-direction defocus amounts is low, search driving is performed in S1207 and S1208 in the AF process illustrated in FIG. 12.

However, if search driving is performed, the time required for AF may become longer. Hence, in a case where the AF area is set in the divided area in which the low reliability information x is placed in the xy prioritized direction map, the defocus amount to be used may be decided based on the prioritized direction in a divided area that is as close as possible as the divided area with the AF area and in which a defocus amount with usable reliability can be acquired.

In a case where a plurality of AF areas can be set as the AF area, the defocus amount to be used may be selected depending on the prioritized direction information in a plurality of divided areas corresponding to the plurality of AF areas in the xy prioritized direction map. For example, in the case illustrated in FIGS. 27C and 27D, first, the divided areas in each of which the low reliability information x is placed are excluded from the xy prioritized direction map. Then, in the divided areas with prioritized direction information (→, ↓ or crossed arrows), for example, a defocus amount in a divided area in which a defocus amount closest to the closest distance direction is acquired may be used or an average of defocus amounts acquired in the plurality of divided areas may be used. Alternatively, a defocus amount in a divided area in which the crossed arrows are placed as the prioritized direction information and in which the effect of the perspective conflict is smallest may be preferentially used.

Sixth Embodiment

Next, a description is given of the sixth embodiment of the present disclosure. In this embodiment, a description is omitted of the same configurations and processes as those in the first embodiment.

Figure 28:
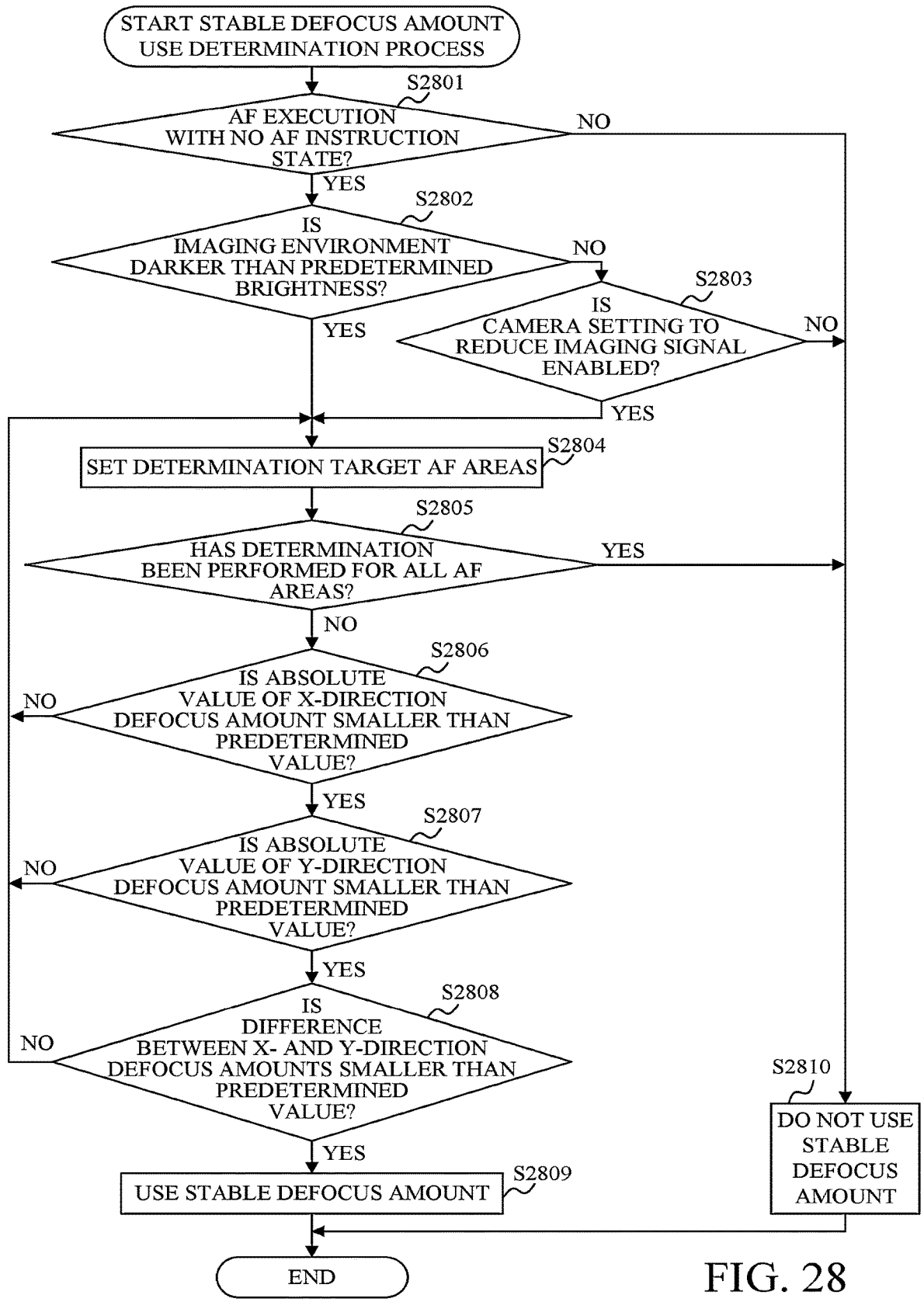
FIG. 28 is a flowchart illustrating the stable defocus amount use determination process according to the sixth and seventh embodiments.

In this embodiment, a process illustrated in a flowchart in FIG. 28 is performed as the stable defocus amount use determination process in S909 in FIG. 9A. Processes in S2801 to S2803 in FIG. 28 are the same as the processes in S1001 to S1003 in FIG. 10, and processes in S2809 and S2810 in FIG. 28 are the same as the processes in S1007 and S1008 in FIG. 10, and thus a description thereof is omitted.

In S2804 in FIG. 28, the camera MPU 125 sets an AF area for determining whether or not to use the stable defocus amount, and the process proceeds to S2805. This embodiment describes a case where a plurality of AF areas are set as the AF area.

Figure 31:
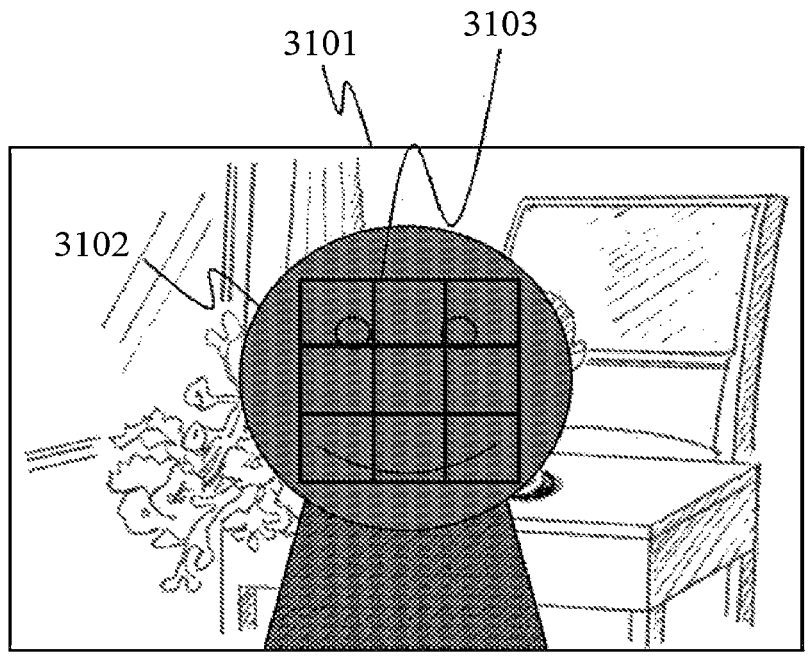
FIG. 31 is a diagram illustrating a setting example of an AF area for a dark imaging scene.

FIG. 31 illustrates an imaging scene in which a person 3102 as an object is captured in an imaging frame 3101, and a plurality of AF areas 3103 are set on part (face) of the person 3102. The plurality of AF areas 3103 here are 3 horizontal areas×3 vertical areas.

In S2805, the camera MPU 125 determines whether or not determination, which is described below, has been performed for all the AF areas 3103. If the determination has not been performed yet for all the AF areas 3103, the process proceeds to S2806 and the camera MPU 125 performs the below-described determination in S2804 and S2805 while updating the AF areas for which the determination has not yet been performed. On the other hand, if the determination has been performed for all the AF areas 3103, the process proceeds to S2810.

In S2806, the camera MPU 125 determines whether or not the absolute value of the x-direction defocus amount is smaller than a predetermined value. If the absolute value is smaller than the predetermined value, the process proceeds to S2807, and if the absolute value is not smaller than the predetermined value, the process proceeds to S2804.

In S2807, the camera MPU 125 determines whether or not the absolute value of the y-direction defocus amount is smaller than a predetermined value. If the absolute value is smaller than the predetermined value, the process proceeds to S2808, and if the absolute value is not smaller than the predetermined value, the process proceeds to S2804.

In S2808, the camera MPU 125 determines whether or not the difference between the x-direction and y-direction defocus amounts is smaller than a predetermined value. If the difference is smaller than the predetermined value, the process proceeds to S2809, and if the difference is not smaller than the predetermined value, the process proceeds to S2804.

The processes in S2806, S2807, and S2808 are the same as the processes in S1004, S1005, and S1006 in FIG. 10, but are different in that the process returns to S2804 if the respective values are not smaller than the predetermined values. In a case where a determination result in one AF area is "NO" in any one of S2806, S2807, and S2808, the process returns to S2804 and the camera MPU 125 performs the same determination for each of the other target AF areas, instead of immediately determining not to use the stable defocus amount as illustrated in FIG. 10. In a case where any of the determination results in S2806 to S2808 is "NO" in each of all the AF areas, it is determined in S2810 not to use the stable defocus amount. On the other hand, in a case where all the determination results in S2806 to S2808 are "YES" in any of the AF areas, it is determined in S2809 to use the stable defocus amount.

Figure 29A:
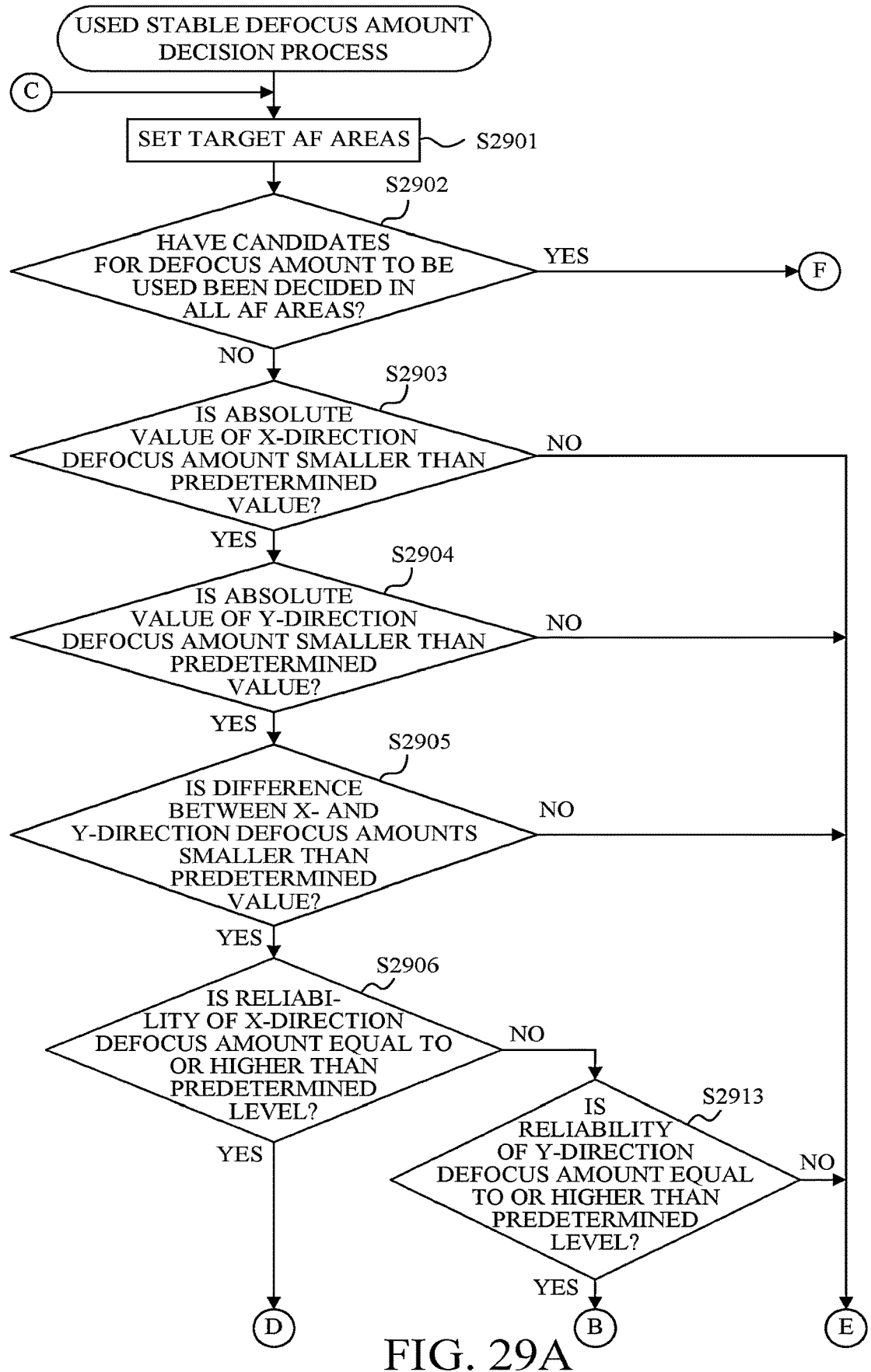
FIGS. 29A and 29B are flowcharts illustrating the used defocus amount decision process according to the sixth and seventh embodiments.
Figure 29B:
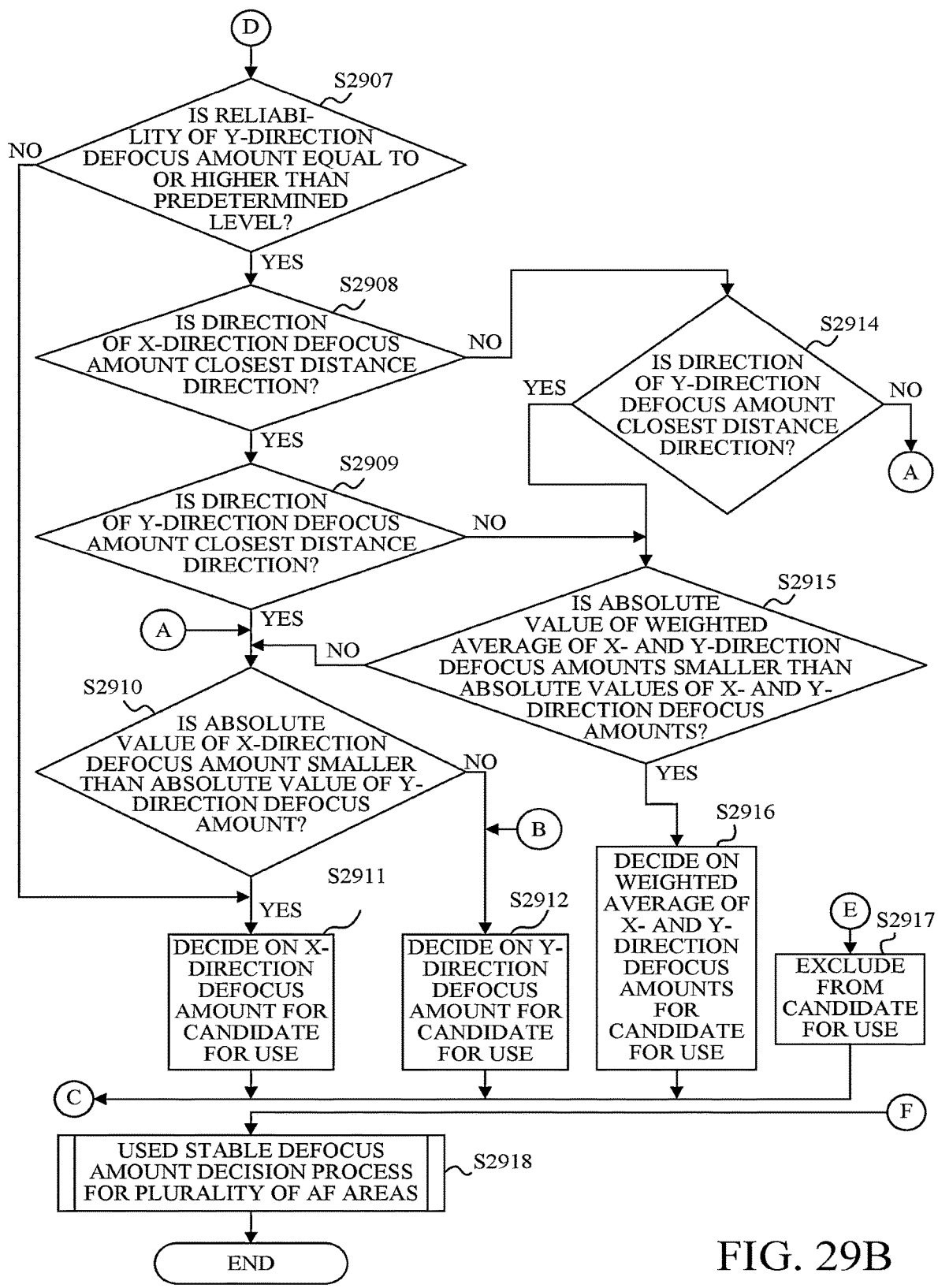

In this embodiment, a process illustrated in flowcharts in FIGS. 29A and 29B is performed as the used stable defocus amount decision process in S911 in FIG. 9A. Processes in S2906 to S2910 in FIGS. 29A and 29B are the same as the processes in S1101 to S1105 in FIG. 11, and processes in S2913 to S2915 in FIGS. 29A and 29B are the same as the processes in S1108 to S1110 in FIG. 11, and thus a description thereof is omitted.

In S2901 in FIG. 29A, the camera MPU 125 sets a plurality of AF areas in each of which the determination on the defocus amount to be used is performed. Then, the process proceeds to S2902.

In S2902, the camera MPU 125 determines whether or not candidates for the defocus amount to be used have been decided in all the AF areas as the determination target. If the candidates have not yet been decided in all the AF areas, the process proceeds to S2903, and if the candidates have been decided in all the AF areas, the process proceeds to S2918. In S2901 and S2902, the camera MPU 125 performs processes for each AF area while updating the AF areas as in S2804 and S2805 in FIG. 28.

In S2903, the camera MPU 125 determines whether or not the absolute value of the x-direction defocus amount is smaller than a predetermined value. If the absolute value is smaller than the predetermined value, the process proceeds to S2904, and if the absolute value is not smaller than the predetermined value, the process proceeds to S2917.

In S2904, the camera MPU 125 determines whether or not the absolute value of the y-direction defocus amount is smaller than a predetermined value. If the absolute value is smaller than the predetermined value, the process proceeds to S2905, and if the absolute value is not smaller than the predetermined value, the process proceeds to S2917.

In S2905, the camera MPU 125 determines whether or not the difference between the x-direction and y-direction defocus amounts is smaller than a predetermined value. If the difference is smaller than the predetermined value, the process proceeds to S2906, and if the difference is not smaller than the predetermined value, the process proceeds to S2917.

The processes in S2903 to S2905 are the same as the processes in S2806 to S2808 in FIG. 28. In a case where the determination result in any one of S2903 to S2905 is "NO", the below-described process in S2917 is performed. In a case where the determination results in S2906 and S2913 are "NO", that is, in a case where the reliability of both the x-direction and y-direction defocus amounts are smaller than a predetermined level, the process proceeds to S2917.

In S2911, the camera MPU 125 decides on the x-direction defocus amount for a candidate for the stable defocus amount to be used (candidate for use), and the process returns to S2901.

In S2912, the camera MPU 125 decides on the y-direction defocus amount for a candidate for the stable defocus amount to be used, and the process returns to S2901.

In S2916, the camera MPU 125 decides on the weighted average of the x-direction and y-direction defocus amounts for a candidate for the stable defocus amount to be used, and the process returns to S2901.

The processes in S2911, S2912, and S2916 are similar to the processes in S1106, S1107, and S1111 in FIG. 11. However, in this embodiment, instead of immediately deciding the determination result as the stable defocus amount to be used, the camera MPU 125 decides candidates for use for each AF area, and then finally decides the stable defocus amount to be used in a later process.

In S2917, the camera MPU 125 excludes the defocus amount in the set AF area from the candidates for use, and the process proceeds to S2901. In this embodiment, if a defocus amount is not preferable to be used as the stable defocus amount, the defocus amount is excluded from the candidates for use.

In S2918, since the camera MPU 125 has determined in S2902 that the candidates for the defocus amount to be used have been decided for all the AF areas, the camera MPU 125 performs a process for finally deciding the stable defocus amount to be used (used stable defocus amount decision process for a plurality of AF areas). Then, the camera MPU 125 ends the used stable defocus amount decision process.

Figure 30:
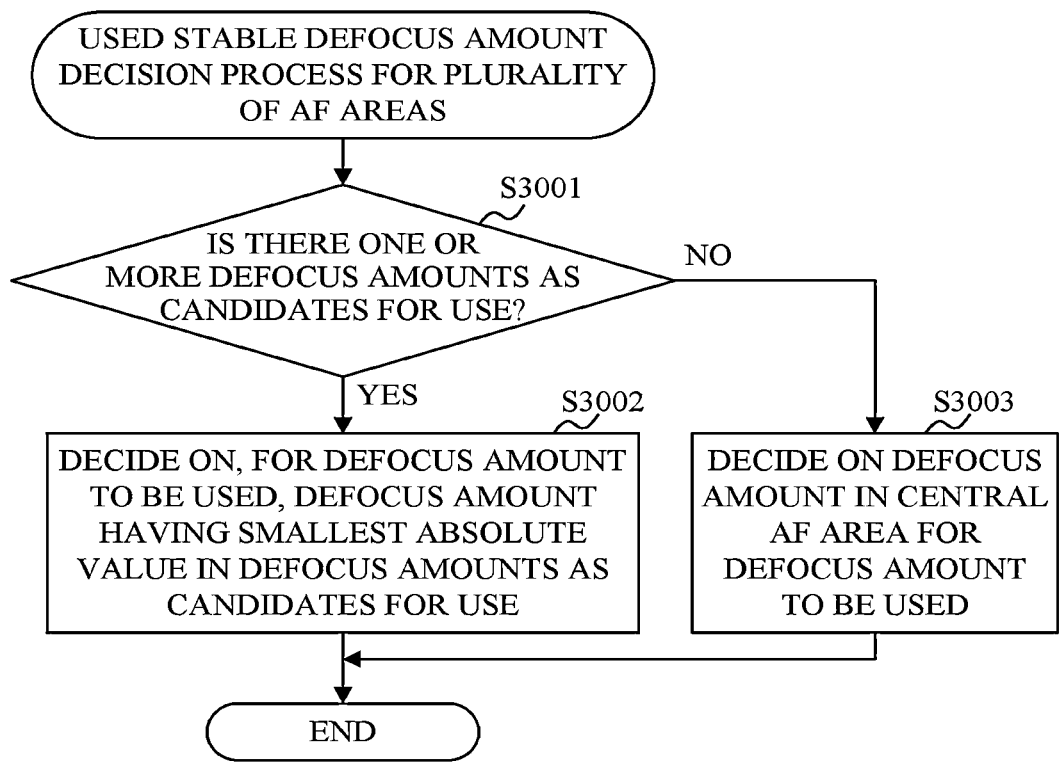
FIG. 30 is a flow chart illustrating the used defocus amount decision process according to the sixth embodiment.

A flowchart in FIG. 30 illustrates the used stable defocus amount decision process for the plurality of AF areas performed by the camera MPU 125 in S2918 in FIG. 29B.

In S3001, the camera MPU 125 determines whether or not there is one or more defocus amounts as the candidates for use. If there are one or more candidates, the process proceeds to S3002, and if there is no candidate, the process proceeds to S3003.

In S3002, the camera MPU 125 decides on, for the defocus amount to be used, a defocus amount having the smallest absolute value in the defocus amounts as the candidates for use. Then, the camera MPU 125 ends the used stable defocus amount decision process for the plurality of AF areas.

In S3003, the camera MPU 125 decides on the defocus amount in the central AF area for the defocus amount to be used. Then, the camera MPU 125 ends the used stable defocus amount decision process for the plurality of AF areas.

In this way, in this embodiment, the candidates for the stable defocus amount to be used are decided in all the AF areas, and the defocus amount having the smallest absolute value in the candidates is used as the stable defocus amount. Thereby, after the variations are reduced in the defocus amount in one AF area as described with reference to FIG. 18, it is possible to further reduce the variations in the defocus amount by using the defocus amounts acquired in the plurality of AF areas. As a result, it is possible to improve the stability of AF near the in-focus state. In this embodiment, if there is no candidate for the stable defocus amount to be used in all the AF areas, it is decided in S3003 to use the defocus amount in the central AF area as the stable defocus amount, but an average of the defocus amounts in all the AF area may be used as the stable defocus amount.

Seventh Embodiment

Next, a description is given of the seventh embodiment of the present disclosure. This embodiment is a modification example of the sixth embodiment.

Figure 32:
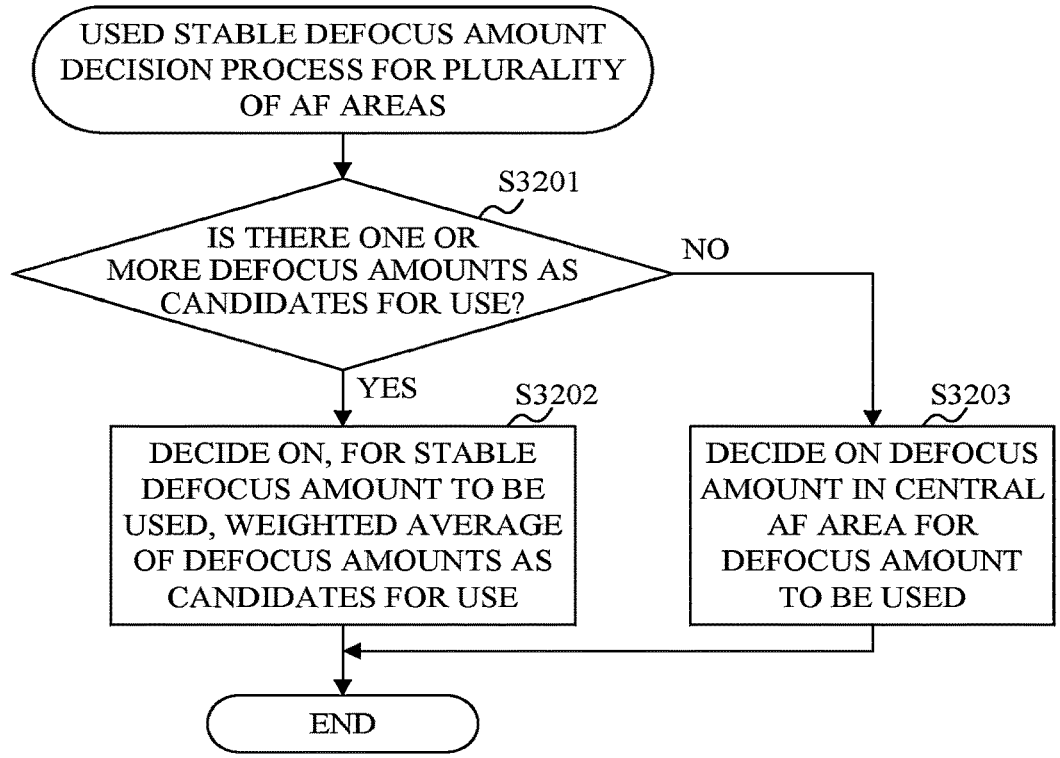
FIG. 32 is a flowchart illustrating the used defocus amount decision process according to the seventh embodiment.

A flowchart in FIG. 32 illustrates the used stable defocus amount decision process for the plurality of AF areas performed by the camera MPU 125 in S2918 in FIG. 29B. Processes in S3201 and S3203 in FIG. 32 are the same as the processes in S3001 and S3003 in FIG. 30, and thus a description thereof is omitted.

In S3202 in FIG. 32, after determining the candidates for the stable defocus amount to be used in all the AF areas in the process in FIGS. 29A and 29B, the camera MPU 125 calculates an average of the sum at a predetermined ratio of the defocus amounts as the candidates for use. Then, the camera MPU 125 decides on the average for the stable defocus amount to be used and ends this process.

As the ratio of adding the defocus amounts in S3202, the same ratio may be used for the defocus amounts in all the AF areas, or the ratio may be changed depending on the size of the signal amount in each AF area.

In this embodiment, as in the sixth embodiment, after the variations are reduced in the defocus amount in one AF area, it is possible to further reduce variations in the defocus amount by using the defocus amounts acquired in the plurality of AF areas. As a result, it is possible to improve the stability of AF near the in-focus state.

According to the above-described embodiments, highly accurate focus detection using an image sensor can be stably performed.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-202941, filed on Dec. 14, 2021, which is hereby incorporated by reference herein in its entirety.

What is claimed is:

1. An imaging apparatus comprising:
an image sensor configured to be capable of acquiring, from an imaging surface that captures an object image formed by an optical system, first paired signals acquired by pupil division in a first direction and second paired signals acquired by pupil division in a second direction different from the first direction;
an acquiring unit configured to acquire a first defocus amount from a phase difference between the first paired signals and to acquire a second defocus amount from a phase difference between the second paired signals;
a memory storing instructions; and
a processor configured to execute the instructions to:
detect an imaging object in an imaging frame; and
decide, based on the detected imaging object, at least one defocus amount to be used in focus control for the optical system from the first and second defocus amounts,
wherein, in a case where the processor detects a first object behind a second object extending in one direction,
when the one direction is a horizontal direction, the processor decides to use the defocus amount acquired from, of the first and second paired signals, one paired signals acquired by the pupil division in the horizontal direction, and
when the one direction is a vertical direction, the processor decides to use the defocus amount obtained from the other one paired signals acquired by the pupil division in the vertical direction.

2. The imaging apparatus according to claim 1, wherein the image sensor includes, in the imaging surface, first paired photoelectric converters divided in the first direction and second paired photoelectric converters divided in the second direction, and
wherein the acquiring unit acquires the first defocus amount from the phase difference between the first paired signals generated by using outputs from the first paired photoelectric converters, and acquires the second defocus amount from the phase difference between the second paired signals generated by using outputs from the second paired photoelectric converters.

3. The imaging apparatus according to claim 1, wherein the processor decides on, for the defocus amount to be used in the focus control, (a) the first defocus amount, (b) the second defocus amount, or (c) an average of a sum at a predetermined ratio of the first and second defocus amounts.

4. An imaging apparatus comprising:
an image sensor configured to be capable of acquiring, from an imaging surface that captures an object image formed by an optical system, first paired signals acquired by pupil division in a first direction and second paired signals acquired by pupil division in a second direction different from the first direction;
an acquiring unit configured to acquire a first defocus amount from a phase difference between the first paired signals and to acquire a second defocus amount from a phase difference between the second paired signals;
a memory storing instructions; and
a processor configured to execute the instructions to:
detect an imaging object in an imaging frame; and
decide, based on the detected imaging object, at least one defocus amount to be used in focus control for the optical system from the first and second defocus amounts,
wherein the image sensor includes a pixel including four photoelectric converters that correspond to one microlens and are divided vertically and horizontally, and
wherein the acquiring unit acquires the first and second defocus amounts from phase differences of the first and second paired signals that are generated by adding different combinations of outputs from the four divided photoelectric converters.

5. An imaging apparatus comprising:
an image sensor configured to be capable of acquiring, from an imaging surface that captures an object image formed by an optical system, first paired signals acquired by pupil division in a first direction and second paired signals acquired by pupil division in a second direction different from the first direction;
an acquiring unit configured to acquire a first defocus amount from a phase difference between the first paired signals and to acquire a second defocus amount from a phase difference between the second paired signals;
a memory storing instructions; and
a processor configured to execute the instructions to:
detect an imaging object in an imaging frame; and
decide, based on the detected imaging object, at least one defocus amount to be used in focus control for the optical system from the first and second defocus amounts,
wherein the processor configured to execute the instructions to generate, by using a learning model generated based on machine learning, information representing which of the first and second defocus amounts is preferentially used for each of a plurality of areas in the imaging frame and performs the focus control using the defocus amount represented by the information.

6. The imaging apparatus according to claim 5, wherein the processor configured to execute the instructions to generate the information by using machine learning that has learned a direction in which an effect of an obstacle becomes smaller of the first and second defocus amounts.

7. The imaging apparatus according to claim 5, wherein the processor configured to execute the instructions to divide the imaging frame into the plurality of areas by using machine learning that has learned reliability of binary or multiclass as to whether or not the first or second defocus amount is usable based on a degree of an effect an obstruct.

8. An imaging apparatus comprising:
an image sensor configured to be capable of acquiring first paired signals acquired by pupil division in a first direction from a pixel of a first color and second paired signals acquired by pupil division in a second direction from a pixel of a second color different from the first color, wherein the second direction is different from the first direction, and wherein the pixel of the first color and the pixel of the second color are included in an imaging surface that captures an imaging object image formed by an optical system;
an acquiring unit configured to acquire a first defocus amount from a phase difference between the first paired signals and to acquire a second defocus amount from a phase difference between the second paired signals; and a memory storing instructions; and a processor configured to execute the instructions to:
- select one color from the first color and the second colors; and
- decide, based on the selected color, at least one defocus amount to be used in focus control for the optical system from the first and second defocus amounts.

9. The imaging apparatus according to claim 8, wherein the processor decides on, for the defocus amount to be used in the focus control, (a) the first defocus amount, (b) the second defocus amount, or (c) an average of a sum at a predetermined ratio of the first and second defocus amounts.

10. The imaging apparatus according to claim 8, wherein the processor selects a color of a pixel that outputs a larger signal amount of the pixels of the first and second colors.

11. The imaging apparatus according to claim 8, wherein the processor selects a same color as a color of auxiliary light emitted from an auxiliary light source to an imaging object.

12. The imaging apparatus according to claim 11, wherein the processor configured to execute the instructions to switch, based on the selected color, the color of the auxiliary light emitted from the auxiliary light source between the first color and the second color.

13. The imaging apparatus according to claim 12, wherein the processor selects a color of a pixel of which the number used to acquire the defocus amount is smaller from the pixels of the first and second colors, and
- wherein the processor sets the color of the auxiliary light to the color selected from the first and second colors.

14. The imaging apparatus according to claim 12, wherein the processor selects a color based on darkness of an imaging environment, and
- wherein the processor sets the color of the auxiliary light to the color selected from the first and second colors.

15. The imaging apparatus according to claim 12, wherein the processor configured to execute the instructions to detect an imaging object,
- wherein the processor selects the color based on the detected imaging object, and
- wherein the processor sets the color of the auxiliary light to the color selected from the first and second colors.

16. A control method of an imaging apparatus including an image sensor configured to be capable of acquiring, from an imaging surface that captures an object image formed by an optical system, first paired signals acquired by pupil division in a first direction and second paired signals acquired by pupil division in a second direction different from the first direction, the control method comprising:
- acquiring a first defocus amount from a phase difference between the first paired signals and to acquire a second defocus amount from a phase difference between the second paired signals;
- detecting an imaging object in an imaging frame; and
- deciding, based on the detected imaging object, at least one defocus amount to be used in focus control for the optical system from the first and second defocus amounts,
- wherein, in a case where a first object behind a second object extending in one direction is detected,
- when the one direction is a horizontal direction, the method decides to use the defocus amount acquired from, of the first and second paired signals, one paired signals acquired by the pupil division in the horizontal direction, and
- when the one direction is a vertical direction, the method decides to use the defocus amount obtained from the other one paired signals acquired by the pupil division in the vertical direction.

17. A control method of an imaging apparatus including an image sensor configured to be capable of acquiring first paired signals acquired by pupil division in a first direction from a pixel of a first color and second paired signals acquired by pupil division in a second direction from a pixel of a second color different from the first color, wherein the second direction is different from the first direction, and wherein the pixel of the first color and the pixel of the second color are included in an imaging surface that captures an imaging object image formed by an optical system, the control method comprising:
- acquiring a first defocus amount from a phase difference between the first paired signals and to acquire a second defocus amount from a phase difference between the second paired signals; and
- selecting one color from the first color and the second colors; and
- deciding, based on the selected color, at least one defocus amount to be used in focus control for the optical system from the first and second defocus amounts.

* * * * *